(12) United States Patent
Sahraei et al.

(10) Patent No.: US 12,431,988 B2
(45) Date of Patent: Sep. 30, 2025

(54) TECHNIQUES FOR SUCCESSIVE TUNING USING A RECONFIGURABLE SURFACE

(71) Applicant: QUALCOMM INCORPORATED, San Diego, CA (US)

(72) Inventors: Saeid Sahraei, San Diego, CA (US); Yu Zhang, San Diego, CA (US); Hung Dinh Ly, San Diego, CA (US); Krishna Kiran Mukkavilli, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 18/547,473

(22) PCT Filed: Apr. 8, 2021

(86) PCT No.: PCT/CN2021/085876
§ 371 (c)(1),
(2) Date: Aug. 22, 2023

(87) PCT Pub. No.: WO2022/213312
PCT Pub. Date: Oct. 13, 2022

(65) Prior Publication Data
US 2024/0137134 A1 Apr. 25, 2024

(51) Int. Cl.
*H04B 17/10* (2015.01)
*H04W 52/14* (2009.01)
*H04W 52/42* (2009.01)

(52) U.S. Cl.
CPC ........ *H04B 17/103* (2015.01); *H04W 52/146* (2013.01); *H04W 52/42* (2013.01)

(58) Field of Classification Search
CPC ...... H04B 17/10; H04B 17/103; H04B 17/12; H04W 52/146; H04W 52/42; H04W 52/325
See application file for complete search history.

(56) References Cited

U.S. PATENT DOCUMENTS

| 11,570,629 B2 * | 1/2023 | Haija | ................... H04L 5/0048 |
| 2022/0014935 A1 * | 1/2022 | Haija | ................... H04L 5/0048 |

OTHER PUBLICATIONS

Changsheng Y., et al., "Channel Estimation and Passive Beamforming for Intelligent Reflecting Surface: Discrete Phase Shift and Progressive Refinement", IEEE Journal on Selected Areas in Communications, IEEE Service Center, Piscatway, US, vol. 38, No. 11, Jul. 2, 2020 (Jul. 2, 2020), pp. 2604-2620, XP011815043, 17 Pages, ISSN: 0733-8716, DOI: 10.1109/JSAC. 2020. 3007056. [Retrieved on Oct. 15, 2020] Sections I and IV.

(Continued)

*Primary Examiner* — Jimmy T Vu
(74) *Attorney, Agent, or Firm* — Paul M. McAdams; Holland & Hart LLP

(57) ABSTRACT

Methods, systems, and devices for wireless communications are described. A user equipment (UE) may be configured to transmit, to a base station via a reconfigurable surface at a first transmission occasion, a first reference signal associated with a first reflection matrix configuration used by the reconfigurable surface to reflect signals, the first reflection matrix configuration included within a set of reflection matrix configurations. The UE may then transmit, to the base station via the reconfigurable surface at a second transmission occasion, a second reference signal associated with a second reflection matrix configuration used by the reconfigurable surface to reflect signals, the second reflection matrix configuration included within the set of reflection matrix configurations. The may then communicate with the base (Continued)

station via the reconfigurable surface based on transmitting the first reference signal, the second reference signal, or both.

30 Claims, 16 Drawing Sheets

(56) References Cited

OTHER PUBLICATIONS

International Search Report and Written Opinion—PCT/CN2021/085876—ISA/EPO—Sep. 24, 2021.

Shiqi G, et al., "Beamforming Optimization for Intelligent Reflecting Surface-Aided Swipt IoT Networks Relying on Discrete Phase Shifts", IEEE Internet of Things Journal, IEEE, USA, vol. 8, No. 10, Dec. 23, 2020 (Dec. 23, 2020), pp. 8585-8602, XP011853493, 18 Pages, DOI: 10.1109/JIOT.2020.3046929, [Retrieved on May 6, 2021]. Sections I and III.

Wanming H., et al., "Robust Design for Intelligent Reflecting Surface-Assisted MIMO-OFDMA Terahertz IoT Networks", IEEE Internet of Things Journal, IEEE, USA, vol. 8, No. 16, Mar. 5, 2021, (Mar. 5, 2021), pp. 13052-13064, XP011870509, 12 Pages, DOI: 10.1109/JIOT.2021.3064069. [Retrieved on Aug. 4, 2021] Sections I, III and IV.

* cited by examiner

TECHNIQUES FOR SUCCESSIVE TUNING USING A RECONFIGURABLE SURFACE

FIELD OF TECHNOLOGY

The present application is a 371 national stage filing of International PCT Application No. PCT/CN2021/085876 by SAHRAEI et al. entitled "TECHNIQUES FOR SUCCESSIVE TUNING USING A RECONFIGURABLE SURFACE," filed Apr. 8, 2021, which is assigned to the assignee hereof, and which is expressly incorporated by reference in its entirety herein.

FIELD OF TECHNOLOGY

The following relates to wireless communications, including techniques for successive tuning using a reconfigurable surface.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems have attempted to use active antenna units (AAUs), reconfigurable intelligent surfaces (RISs), or both, in order to increase throughput and increase quantities of wireless devices (e.g., user equipments (UEs)) which are able to connect with the network. In some cases, AAUs and RISs may be communicatively coupled to a base station, and may relay (e.g., reflect) transmissions between the base station and UEs. However, AAUs may result in high power consumption, and may therefore be undesirable for widespread use. Additionally, due to the fact that RISs are passive devices, conventional techniques used to generate beamforming configurations for AAUs may not be used in the context of RISs.

SUMMARY

The described techniques relate to improved methods, systems, devices, and apparatuses that support techniques for successive tuning using a reconfigurable surface. Generally, the described techniques provide for successive, iterative signaling between a base station and a user equipment (UE) via a reconfigurable intelligent surface (RIS), which enables for efficient RIS reflection matrix configuration selection. For example, to configure a RIS for uplink communications, a UE may transmit a first reference signal to a base station via a RIS, where the first reference signal is associated with a first reflection matrix configuration of the RIS. The first reflection matrix configuration may be selected from a set of pre-configured reflection matrix configurations associated with the RIS (e.g., codebook of reflection matrix configurations). Upon receiving the first reference signal, the base station may perform measurements on the reference signal, and may adjust (e.g., tune) a reflection matrix configuration of the RIS. Subsequently, the UE may transmit a second reference signal to the base station via the RIS, where the second reference signal is associated with a second reflection matrix configuration of the RIS (e.g., second reflection matrix configuration from the set of pre-configured reflection matrix configurations). This iterative process of transmitting/receiving reference signals and adjusting the reflection matrix configuration of the RIS may be repeated any quantity of iterations until signals reflected by the RIS exhibit sufficient performance.

A method for wireless communication at a UE is described. The method may include transmitting, to a base station via a reconfigurable surface at a first transmission occasion, a first reference signal associated with a first reflection matrix configuration used by the reconfigurable surface to reflect signals, the first reflection matrix configuration included within a set of reflection matrix configurations, transmitting, to the base station via the reconfigurable surface at a second transmission occasion, a second reference signal associated with a second reflection matrix configuration used by the reconfigurable surface to reflect signals, the second reflection matrix reflection matrix configuration different from the first reflection matrix configuration and included within the set of reflection matrix configurations, and communicating with the base station via the reconfigurable surface based on transmitting the first reference signal, the second reference signal, or both.

An apparatus for wireless communication at a UE is described. The apparatus may include a processor, memory coupled with the processor, and instructions stored in the memory. The instructions may be executable by the processor to cause the apparatus to transmit, to a base station via a reconfigurable surface at a first transmission occasion, a first reference signal associated with a first reflection matrix configuration used by the reconfigurable surface to reflect signals, the first reflection matrix configuration included within a set of reflection matrix configurations, transmit, to the base station via the reconfigurable surface at a second transmission occasion, a second reference signal associated with a second reflection matrix configuration used by the reconfigurable surface to reflect signals, the second reflection matrix reflection matrix configuration different from the first reflection matrix configuration and included within the set of reflection matrix configurations, and communicate with the base station via the reconfigurable surface based on transmitting the first reference signal, the second reference signal, or both.

Another apparatus for wireless communication at a UE is described. The apparatus may include means for transmitting, to a base station via a reconfigurable surface at a first transmission occasion, a first reference signal associated with a first reflection matrix configuration used by the reconfigurable surface to reflect signals, the first reflection matrix configuration included within a set of reflection matrix configurations, means for transmitting, to the base station via the reconfigurable surface at a second transmission occasion, a second reference signal associated with a second reflection matrix configuration used by the reconfigurable surface to reflect signals, the second reflection matrix reflection matrix configuration different from the first reflection matrix configuration and included within the set of reflection matrix configurations, and means for communicating with the base station via the reconfigurable surface based on transmitting the first reference signal, the second reference signal, or both.

A non-transitory computer-readable medium storing code for wireless communication at a UE is described. The code may include instructions executable by a processor to transmit, to a base station via a reconfigurable surface at a first transmission occasion, a first reference signal associated with a first reflection matrix configuration used by the reconfigurable surface to reflect signals, the first reflection matrix configuration included within a set of reflection matrix configurations, transmit, to the base station via the reconfigurable surface at a second transmission occasion, a second reference signal associated with a second reflection matrix configuration used by the reconfigurable surface to reflect signals, the second reflection matrix reflection matrix configuration different from the first reflection matrix configuration and included within the set of reflection matrix configurations, and communicate with the base station via the reconfigurable surface based on transmitting the first reference signal, the second reference signal, or both.

Some examples of the method, apparatuses, and non-transitory computer-readable medium described herein may further include operations, features, means, or instructions for receiving, from the base station, a control message including a set of resources associated with a configuration procedure for configuring the reconfigurable surface, where transmitting the first reference signal at the first transmission occasion, transmitting the second reference signal at the second transmission occasion, or both, may be based on receiving the control message.

In some examples of the method, apparatuses, and non-transitory computer-readable medium described herein, the first reference signal may be transmitted to the base station via the reconfigurable surface with a first transmission power metric, and and the second reference signal may be transmitted to the base station via the reconfigurable surface with a second transmission power metric which may be less than the first transmission power metric.

Some examples of the method, apparatuses, and non-transitory computer-readable medium described herein may further include operations, features, means, or instructions for receiving, from the base station, a control message indicating one or more transmission power metrics associated with transmission of reference signals during a configuration procedure for configuring the reconfigurable surface, where transmitting the first reference signal with the first transmission power metric, transmitting the second reference signal with the second transmission power metric, or both, may be based may be based on receiving the control message.

In some examples of the method, apparatuses, and non-transitory computer-readable medium described herein, communicating with the base station via the reconfigurable surface may include operations, features, means, or instructions for transmitting, to the base station via the reconfigurable surface, an uplink transmission reflected by the reconfigurable surface using a third reflection matrix configuration different from the first reflection matrix configuration and the second reflection matrix configuration, the third reflection matrix configuration included within the set of reflection matrix configurations.

Some examples of the method, apparatuses, and non-transitory computer-readable medium described herein may further include operations, features, means, or instructions for receiving, from the base station via the reconfigurable surface based on transmitting the second reference signal, an indication of a third reflection matrix configuration different from the first reflection matrix configuration and the second reflection matrix configuration, where the third reflection matrix configuration may be included within the set of reflection matrix configurations, where communicating with the base station via the reconfigurable surface may be based on receiving the indication of the third reflection matrix configuration.

Some examples of the method, apparatuses, and non-transitory computer-readable medium described herein may further include operations, features, means, or instructions for receiving, from the base station, a control message indicating a position of the reconfigurable surface, an orientation of the reconfigurable surface, or both, where transmitting the first reference signal, transmitting the second reference signal, or both, may be based on receiving the control message.

In some examples of the method, apparatuses, and non-transitory computer-readable medium described herein, the reconfigurable surface includes a set of multiple reflective surface elements, and and each of the first reflection matrix configuration and the second reflection matrix configuration includes a set of multiple precoders associated with the set of multiple reflective surface elements.

In some examples of the method, apparatuses, and non-transitory computer-readable medium described herein, the reconfigurable surface may be configured to modify an angle of reflection of signals incident on the reconfigurable surface based on the set of multiple precoders associated with the set of multiple reflective surface elements.

In some examples of the method, apparatuses, and non-transitory computer-readable medium described herein, the reconfigurable surface may be configured to modify an angle of reflection of signals incident on the reconfigurable surface by modifying a reflection matrix configuration of the set of reflection matrix configurations, transitioning from the first reflection matrix configuration to the second reflection matrix configuration, or both.

In some examples of the method, apparatuses, and non-transitory computer-readable medium described herein, the first reference signal, the second reference signal, or both, includes a first format which may be different than a second format associated with a third reference signal transmitted by the UE to the base station without reflection by the reconfigurable surface.

In some examples of the method, apparatuses, and non-transitory computer-readable medium described herein, the first reference signal, the second reference signal, or both, may be transmitted by the UE with a first spatial filtering metric, and and the third reference signal may be transmitted by the UE with a second spatial filtering metric different from the first spatial filtering metric.

In some examples of the method, apparatuses, and non-transitory computer-readable medium described herein, the first reference signal, the second reference signal, or both, includes a sounding reference signal.

A method for wireless communication at a base station is described. The method may include receiving, from a UE via a reconfigurable surface at a first transmission occasion, a first reference signal reflected by the reconfigurable surface using a first reflection matrix configuration, the first reflection matrix configuration included within a set of reflection matrix configurations, configuring the reconfigurable surface with a second reflection matrix configuration based on receiving the first reference signal, the second reflection matrix configuration included within the set of reflection matrix configurations, receiving, from the UE via the reconfigurable surface at a second transmission occasion, a second reference signal reflected by the reconfigurable surface using the second reflection matrix configuration, configuring the reconfigurable surface with a third reflection matrix configuration based on receiving the second reference signal, the third reflection matrix configuration included within the set of reflection matrix configurations, and communicating with the UE via the reconfigurable surface based on the third reflection matrix configuration.

An apparatus for wireless communication at a base station is described. The apparatus may include a processor, memory coupled with the processor, and instructions stored in the memory. The instructions may be executable by the processor to cause the apparatus to receive, from a UE via a reconfigurable surface at a first transmission occasion, a first reference signal reflected by the reconfigurable surface using a first reflection matrix configuration, the first reflection matrix configuration included within a set of reflection matrix configurations, configure the reconfigurable surface with a second reflection matrix configuration based on receiving the first reference signal, the second reflection matrix configuration included within the set of reflection matrix configurations, receive, from the UE via the reconfigurable surface at a second transmission occasion, a second reference signal reflected by the reconfigurable surface using the second reflection matrix configuration, configure the reconfigurable surface with a third reflection matrix configuration based on receiving the second reference signal, the third reflection matrix configuration included within the set of reflection matrix configurations, and communicate with the UE via the reconfigurable surface based on the third reflection matrix configuration.

Another apparatus for wireless communication at a base station is described. The apparatus may include means for receiving, from a UE via a reconfigurable surface at a first transmission occasion, a first reference signal reflected by the reconfigurable surface using a first reflection matrix configuration, the first reflection matrix configuration included within a set of reflection matrix configurations, means for configuring the reconfigurable surface with a second reflection matrix configuration based on receiving the first reference signal, the second reflection matrix configuration included within the set of reflection matrix configurations, means for receiving, from the UE via the reconfigurable surface at a second transmission occasion, a second reference signal reflected by the reconfigurable surface using the second reflection matrix configuration, means for configuring the reconfigurable surface with a third reflection matrix configuration based on receiving the second reference signal, the third reflection matrix configuration included within the set of reflection matrix configurations, and means for communicating with the UE via the reconfigurable surface based on the third reflection matrix configuration.

A non-transitory computer-readable medium storing code for wireless communication at a base station is described. The code may include instructions executable by a processor to receive, from a UE via a reconfigurable surface at a first transmission occasion, a first reference signal reflected by the reconfigurable surface using a first reflection matrix configuration, the first reflection matrix configuration included within a set of reflection matrix configurations, configure the reconfigurable surface with a second reflection matrix configuration based on receiving the first reference signal, the second reflection matrix configuration included within the set of reflection matrix configurations, receive, from the UE via the reconfigurable surface at a second transmission occasion, a second reference signal reflected by the reconfigurable surface using the second reflection matrix configuration, configure the reconfigurable surface with a third reflection matrix configuration based on receiving the second reference signal, the third reflection matrix configuration included within the set of reflection matrix configurations, and communicate with the UE via the reconfigurable surface based on the third reflection matrix configuration.

Some examples of the method, apparatuses, and non-transitory computer-readable medium described herein may further include operations, features, means, or instructions for transmitting, to the UE, a control message including a set of resources associated with a configuration procedure for configuring the reconfigurable surface, where receiving the first reference signal at the first transmission occasion, receiving the second reference signal at the second transmission occasion, or both, may be based on transmitting the control message.

In some examples of the method, apparatuses, and non-transitory computer-readable medium described herein, the first reference signal may be received from the UE via the reconfigurable surface with a first transmission power metric, and and the second reference signal may be received from the UE via the reconfigurable surface with a second transmission power metric which may be less than the first transmission power metric.

Some examples of the method, apparatuses, and non-transitory computer-readable medium described herein may further include operations, features, means, or instructions for transmitting, to the UE, a control message indicating one or more transmission power metrics associated with transmission of reference signals during a configuration procedure for configuring the reconfigurable surface, where receiving the first reference signal with the first transmission power metric, receiving the second reference signal with the second transmission power metric, or both, may be based may be based on transmitting the control message.

In some examples of the method, apparatuses, and non-transitory computer-readable medium described herein, communicating with the UE via the reconfigurable surface may include operations, features, means, or instructions for receiving, from the UE via the reconfigurable surface, an uplink transmission reflected by the reconfigurable surface using the third reflection matrix configuration different from the first reflection matrix configuration and the second reflection matrix configuration.

Some examples of the method, apparatuses, and non-transitory computer-readable medium described herein may further include operations, features, means, or instructions for transmitting, to the UE via the reconfigurable surface based on receiving the second reference signal, an indication of the third reflection matrix configuration different from the first reflection matrix configuration and the second reflection matrix configuration, where communicating with the UE via the reconfigurable surface may be based on transmitting the indication of the third reflection matrix configuration.

Some examples of the method, apparatuses, and non-transitory computer-readable medium described herein may further include operations, features, means, or instructions for transmitting, to the UE, a control message indicating a position of the reconfigurable surface, an orientation of the reconfigurable surface, or both, where receiving the first reference signal, receiving the second reference signal, or both, may be based on transmitting the control message.

In some examples of the method, apparatuses, and non-transitory computer-readable medium described herein, the reconfigurable surface includes a set of multiple reflective surface elements, and and each of the first reflection matrix configuration and the second reflection matrix configuration includes a set of multiple precoders associated with the set of multiple reflective surface elements.

In some examples of the method, apparatuses, and non-transitory computer-readable medium described herein, the reconfigurable surface may be configured to modify an angle of reflection of signals incident on the reconfigurable surface based on the set of multiple precoders associated with the set of multiple reflective surface elements.

In some examples of the method, apparatuses, and non-transitory computer-readable medium described herein, the reconfigurable surface may be configured to modify an angle of reflection of signals incident on the reconfigurable surface by modifying a reflection matrix configuration of the set of reflection matrix configurations, transitioning from the first reflection matrix configuration to the second reflection matrix configuration, or both.

In some examples of the method, apparatuses, and non-transitory computer-readable medium described herein, the first reference signal, the second reference signal, or both, includes a first format which may be different than a second format associated with a third reference signal transmitted by the UE to the base station without reflection by the reconfigurable surface.

In some examples of the method, apparatuses, and non-transitory computer-readable medium described herein, the first reference signal, the second reference signal, or both, includes a sounding reference signal.

A method for wireless communication at a UE is described. The method may include receiving, from a base station via a reconfigurable surface at a first transmission occasion, a first reference signal reflected by the reconfigurable surface using a first reflection matrix configuration, the first reflection matrix configuration included within a set of reflection matrix configurations, transmitting, to the base station based on receiving the first reference signal, a first feedback message indicating a first set of parameters associated with the first reference signal received at the UE, receiving, from the base station via the reconfigurable surface at a second transmission occasion, a second reference signal reflected by the reconfigurable surface using a second reflection matrix configuration, the second reflection matrix configuration included within the set of reflection matrix configurations, transmitting, to the base station based on receiving the second reference signal, a second feedback message indicating a second set of parameters associated with the second reference signal received at the UE, and communicating with the base station via the reconfigurable surface based on transmitting the second feedback message.

An apparatus for wireless communication at a UE is described. The apparatus may include a processor, memory coupled with the processor, and instructions stored in the memory. The instructions may be executable by the processor to cause the apparatus to receive, from a base station via a reconfigurable surface at a first transmission occasion, a first reference signal reflected by the reconfigurable surface using a first reflection matrix configuration, the first reflection matrix configuration included within a set of reflection matrix configurations, transmit, to the base station based on receiving the first reference signal, a first feedback message indicating a first set of parameters associated with the first reference signal received at the UE, receive, from the base station via the reconfigurable surface at a second transmission occasion, a second reference signal reflected by the reconfigurable surface using a second reflection matrix configuration, the second reflection matrix configuration included within the set of reflection matrix configurations, transmit, to the base station based on receiving the second reference signal, a second feedback message indicating a second set of parameters associated with the second reference signal received at the UE, and communicate with the base station via the reconfigurable surface based on transmitting the second feedback message.

Another apparatus for wireless communication at a UE is described. The apparatus may include means for receiving, from a base station via a reconfigurable surface at a first transmission occasion, a first reference signal reflected by the reconfigurable surface using a first reflection matrix configuration, the first reflection matrix configuration included within a set of reflection matrix configurations, means for transmitting, to the base station based on receiving the first reference signal, a first feedback message indicating a first set of parameters associated with the first reference signal received at the UE, means for receiving, from the base station via the reconfigurable surface at a second transmission occasion, a second reference signal reflected by the reconfigurable surface using a second reflection matrix configuration, the second reflection matrix configuration included within the set of reflection matrix configurations, means for transmitting, to the base station based on receiving the second reference signal, a second feedback message indicating a second set of parameters associated with the second reference signal received at the UE, and means for communicating with the base station via the reconfigurable surface based on transmitting the second feedback message.

A non-transitory computer-readable medium storing code for wireless communication at a UE is described. The code may include instructions executable by a processor to receive, from a base station via a reconfigurable surface at a first transmission occasion, a first reference signal reflected by the reconfigurable surface using a first reflection matrix configuration, the first reflection matrix configuration included within a set of reflection matrix configurations, transmit, to the base station based on receiving the first reference signal, a first feedback message indicating a first set of parameters associated with the first reference signal received at the UE, receive, from the base station via the reconfigurable surface at a second transmission occasion, a second reference signal reflected by the reconfigurable surface using a second reflection matrix configuration, the second reflection matrix configuration included within the set of reflection matrix configurations, transmit, to the base station based on receiving the second reference signal, a second feedback message indicating a second set of parameters associated with the second reference signal received at the UE, and communicate with the base station via the reconfigurable surface based on transmitting the second feedback message.

Some examples of the method, apparatuses, and non-transitory computer-readable medium described herein may further include operations, features, means, or instructions for receiving, from the base station, a control message including a set of resources associated with a configuration procedure for configuring the reconfigurable surface, where receiving the first reference signal at the first transmission occasion, receiving the second reference signal at the second transmission occasion, or both, may be based on receiving the control message.

In some examples of the method, apparatuses, and non-transitory computer-readable medium described herein, the first feedback message may be transmitted to the base station via the reconfigurable surface with a first transmission power metric, and and the second feedback message may be transmitted to the base station via the reconfigurable surface with a second transmission power metric which may be less than the first transmission power metric.

Some examples of the method, apparatuses, and non-transitory computer-readable medium described herein may further include operations, features, means, or instructions for receiving, from the base station, a control message indicating one or more transmission power metrics associated with transmission of feedback messages during a configuration procedure for configuring the reconfigurable surface, where transmitting the first feedback message with the first transmission power metric, transmitting the second feedback message with the second transmission power metric, or both, may be based may be based on receiving the control message.

In some examples of the method, apparatuses, and non-transitory computer-readable medium described herein, communicating with the base station via the reconfigurable surface may include operations, features, means, or instructions for receiving, from the base station via the reconfigurable surface, a downlink transmission reflected by the reconfigurable surface using a third reflection matrix configuration different from the first reflection matrix configuration and the second reflection matrix configuration, the third reflection matrix configuration included within the set of reflection matrix configurations.

Some examples of the method, apparatuses, and non-transitory computer-readable medium described herein may further include operations, features, means, or instructions for receiving, from the base station via the reconfigurable surface based on transmitting the second feedback message, an indication of a third reflection matrix configuration different from the first reflection matrix configuration and the second reflection matrix configuration, where the third reflection matrix may be included within the set of reflection matrix configurations, where communicating with the base station via the reconfigurable surface may be based on receiving the indication of the third reflection matrix configuration.

Some examples of the method, apparatuses, and non-transitory computer-readable medium described herein may further include operations, features, means, or instructions for receiving, from the base station, a control message indicating a position of the reconfigurable surface, an orientation of the reconfigurable surface, or both, where receiving the first reference signal, receiving the second reference signal, or both, may be based on receiving the control message.

In some examples of the method, apparatuses, and non-transitory computer-readable medium described herein, the reconfigurable surface includes a set of multiple reflective surface elements, and and each of the first reflection matrix configuration and the second reflection matrix configuration includes a set of multiple precoders associated with the set of multiple reflective surface elements.

In some examples of the method, apparatuses, and non-transitory computer-readable medium described herein, the reconfigurable surface may be configured to modify an angle of reflection of signals incident on the reconfigurable surface based on the set of multiple precoders associated with the set of multiple reflective surface elements.

In some examples of the method, apparatuses, and non-transitory computer-readable medium described herein, the reconfigurable surface may be configured to modify an angle of reflection of signals incident on the reconfigurable surface by modifying a reflection matrix configuration of the set of reflection matrix configurations, transitioning from the first reflection matrix configuration to the second reflection matrix configuration, or both.

In some examples of the method, apparatuses, and non-transitory computer-readable medium described herein, the first reference signal, the second reference signal, or both, includes a first format which may be different than a second format associated with a third reference signal transmitted by the base station to the UE without reflection by the reconfigurable surface.

In some examples of the method, apparatuses, and non-transitory computer-readable medium described herein, the first reference signal, the second reference signal, or both, includes a channel state information reference signal.

A method for wireless communication at a base station is described. The method may include transmitting, to a UE via a reconfigurable surface at a first transmission occasion, a first reference signal reflected by the reconfigurable surface using a first reflection matrix configuration, the first reflection matrix configuration included within a set of reflection matrix configurations, receiving, from the UE based on transmitting the first reference signal, a first feedback message indicating a first set of parameters associated with the first reference signal received at the UE, transmitting, to the UE via the reconfigurable surface at a second transmission occasion, a second reference signal reflected by the reconfigurable surface using a second reflection matrix configuration, the second reflection matrix configuration included within the set of reflection matrix configurations, receiving, from the UE based on transmitting the second reference signal, a second feedback message indicating a second set of parameters associated with the second reference signal received at the UE, and communicating with the UE via the reconfigurable surface based on receiving the second feedback message.

An apparatus for wireless communication at a base station is described. The apparatus may include a processor, memory coupled with the processor, and instructions stored in the memory. The instructions may be executable by the processor to cause the apparatus to transmit, to a UE via a reconfigurable surface at a first transmission occasion, a first reference signal reflected by the reconfigurable surface using a first reflection matrix configuration, the first reflection matrix configuration included within a set of reflection matrix configurations, receive, from the UE based on transmitting the first reference signal, a first feedback message indicating a first set of parameters associated with the first reference signal received at the UE, transmit, to the UE via the reconfigurable surface at a second transmission occasion, a second reference signal reflected by the reconfigurable surface using a second reflection matrix configuration, the second reflection matrix configuration included within the set of reflection matrix configurations, receive, from the UE based on transmitting the second reference signal, a second feedback message indicating a second set of parameters associated with the second reference signal received at the UE, and communicate with the UE via the reconfigurable surface based on receiving the second feedback message.

Another apparatus for wireless communication at a base station is described. The apparatus may include means for transmitting, to a UE via a reconfigurable surface at a first transmission occasion, a first reference signal reflected by the reconfigurable surface using a first reflection matrix configuration, the first reflection matrix configuration included within a set of reflection matrix configurations, means for receiving, from the UE based on transmitting the first reference signal, a first feedback message indicating a first set of parameters associated with the first reference signal received at the UE, means for transmitting, to the UE via the reconfigurable surface at a second transmission occasion, a second reference signal reflected by the reconfigurable surface using a second reflection matrix configuration, the second reflection matrix configuration included within the set of reflection matrix configurations, means for receiving, from the UE based on transmitting the second reference signal, a second feedback message indicating a second set of parameters associated with the second reference signal received at the UE, and means for communicating with the UE via the reconfigurable surface based on receiving the second feedback message.

A non-transitory computer-readable medium storing code for wireless communication at a base station is described. The code may include instructions executable by a processor to transmit, to a UE via a reconfigurable surface at a first transmission occasion, a first reference signal reflected by the reconfigurable surface using a first reflection matrix configuration, the first reflection matrix configuration included within a set of reflection matrix configurations, receive, from the UE based on transmitting the first reference signal, a first feedback message indicating a first set of parameters associated with the first reference signal received at the UE, transmit, to the UE via the reconfigurable surface at a second transmission occasion, a second reference signal reflected by the reconfigurable surface using a second reflection matrix configuration, the second reflection matrix configuration included within the set of reflection matrix configurations, receive, from the UE based on transmitting the second reference signal, a second feedback message indicating a second set of parameters associated with the second reference signal received at the UE, and communicate with the UE via the reconfigurable surface based on receiving the second feedback message.

Some examples of the method, apparatuses, and non-transitory computer-readable medium described herein may further include operations, features, means, or instructions for transmitting, to the UE, a control message including a set of resources associated with a configuration procedure for configuring the reconfigurable surface, where transmitting the first reference signal at the first transmission occasion, transmitting the second reference signal at the second transmission occasion, or both, may be based on transmitting the control message.

In some examples of the method, apparatuses, and non-transitory computer-readable medium described herein, the first feedback message may be received from the UE via the reconfigurable surface with a first transmission power metric, and and the second feedback message may be received from the UE via the reconfigurable surface with a second transmission power metric which may be less than the first transmission power metric.

Some examples of the method, apparatuses, and non-transitory computer-readable medium described herein may further include operations, features, means, or instructions for transmitting, to the UE, a control message indicating one or more transmission power metrics associated with transmission of reference signals during a configuration procedure for configuring the reconfigurable surface, where receiving the first reference signal with the first transmission power metric, receiving the second reference signal with the second transmission power metric, or both, may be based may be based on transmitting the control message.

In some examples of the method, apparatuses, and non-transitory computer-readable medium described herein, communicating with the UE via the reconfigurable surface may include operations, features, means, or instructions for transmitting, to the UE via the reconfigurable surface, a downlink transmission reflected by the reconfigurable surface using a third reflection matrix configuration different from the first reflection matrix configuration and the second reflection matrix configuration, the third reflection matrix configuration included within the set of reflection matrix configurations.

Some examples of the method, apparatuses, and non-transitory computer-readable medium described herein may further include operations, features, means, or instructions for transmitting, to the UE via the reconfigurable surface based on receiving the second feedback message, an indication of a third reflection matrix configuration different from the first reflection matrix configuration and the second reflection matrix configuration, where the third reflection matrix may be included within the set of reflection matrix configurations, where communicating with the UE via the reconfigurable surface may be based on transmitting the indication of the third reflection matrix configuration.

Some examples of the method, apparatuses, and non-transitory computer-readable medium described herein may further include operations, features, means, or instructions for transmitting, to the UE, a control message indicating a position of the reconfigurable surface, an orientation of the reconfigurable surface, or both, where transmitting the first reference signal, transmitting the second reference signal, or both, may be based on transmitting the control message.

In some examples of the method, apparatuses, and non-transitory computer-readable medium described herein, the reconfigurable surface includes a set of multiple reflective surface elements, and and each of the first reflection matrix configuration and the second reflection matrix configuration includes a set of multiple precoders associated with the set of multiple reflective surface elements.

In some examples of the method, apparatuses, and non-transitory computer-readable medium described herein, the reconfigurable surface may be configured to modify an angle of reflection of signals incident on the reconfigurable surface based on the set of multiple precoders associated with the set of multiple reflective surface elements.

In some examples of the method, apparatuses, and non-transitory computer-readable medium described herein, the reconfigurable surface may be configured to modify an angle of reflection of signals incident on the reconfigurable surface by modifying a reflection matrix configuration of the set of reflection matrix configurations, transitioning from the first reflection matrix configuration to the second reflection matrix configuration, or both.

In some examples of the method, apparatuses, and non-transitory computer-readable medium described herein, the first reference signal, the second reference signal, or both, includes a first format which may be different than a second format associated with a third reference signal transmitted by the UE to the base station without reflection by the reconfigurable surface.

In some examples of the method, apparatuses, and non-transitory computer-readable medium described herein, the first reference signal, the second reference signal, or both, includes a channel state information reference signal.

DETAILED DESCRIPTION

Figure 1:
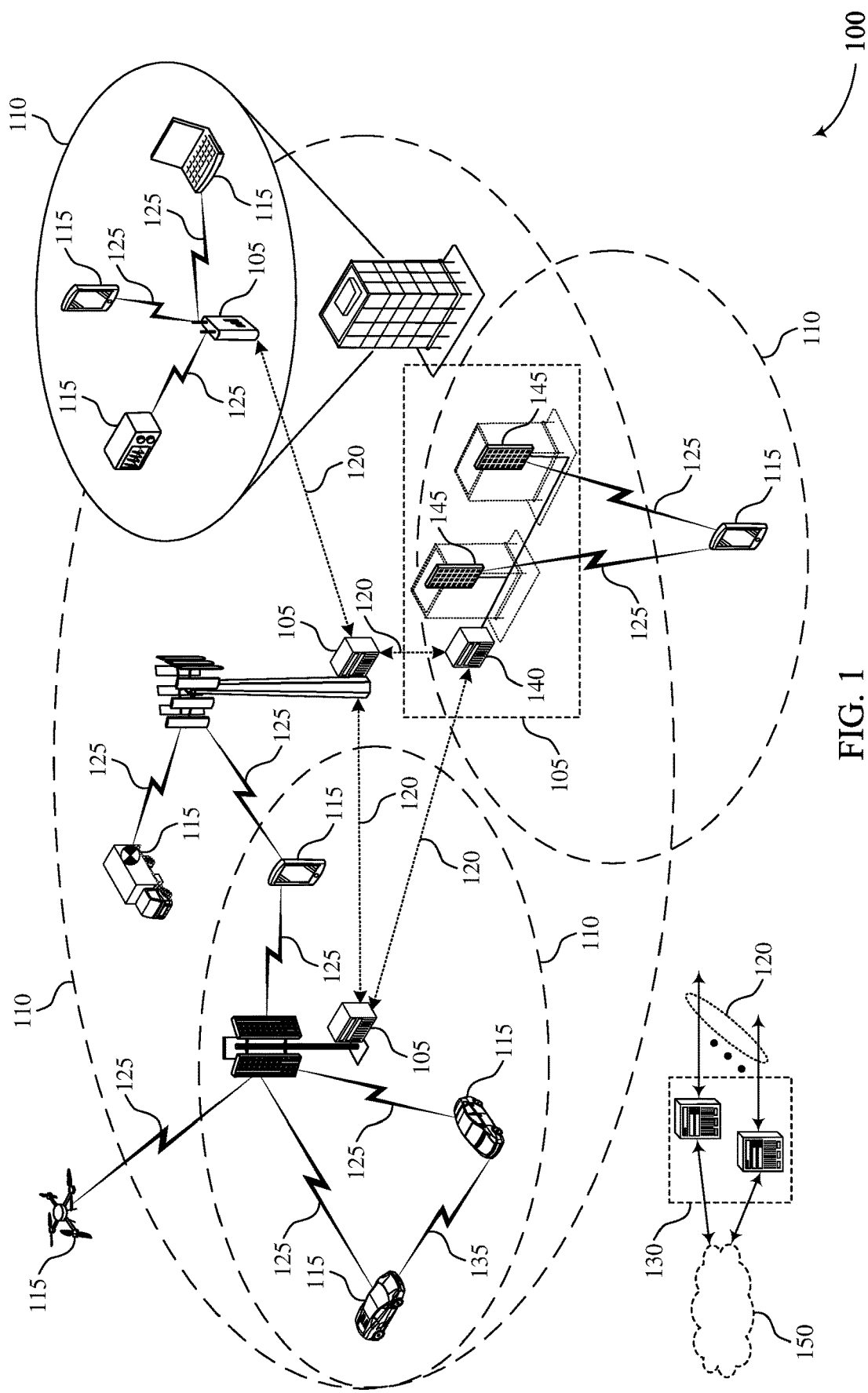
FIG. 1 illustrates an example of a wireless communications system that supports techniques for successive tuning using a reconfigurable surface in accordance with aspects of the present disclosure.

Some wireless communications systems have attempted to use active antenna units (AAUs) in order to increase throughput and increase quantities of wireless devices (e.g., user equipments (UEs)) which are able to connect with the network. In some cases, AAUs may be communicatively coupled to a base station, and may relay (e.g., reflect) transmissions between the base station and UEs. In this regard, AAUs may provide for high beamforming gain for communications within the wireless communications system, and may enable a base station to circumvent obstructions that would otherwise interrupt wireless communications. However, AAUs may result in high power consumption, and may therefore be undesirable for widespread use. One alternative to AAUs which has been explored is reconfigurable intelligent surfaces (RISs). In some aspects, RISs may relay (e.g., reflect) transmissions between base stations and UEs via one or more reflective surface elements. As compared to AAUs, RISs are passive devices, so may result in little to no power consumption, thereby improving power efficiency of the network. However, as passive devices, conventional techniques used to generate beamforming configurations for AAUs may not be used in the context of RISs. For example, as passive devices, RISs may be unable to perform coherent combining in order to focus a beam.

Accordingly, techniques for reflection matrix configuration selection usable by reconfigurable surfaces (e.g., RISs) are described. In some cases, these techniques may enable higher throughput and reduced power consumption within a wireless communications system. The techniques described herein are directed to successive, iterative signaling between a base station and a UE via a RIS, which enables for efficient RIS reflection matrix configuration selection from a set of reflection matrix configurations associated with the RIS (e.g., codebook of reflection matrix configurations). As will be described in further detail herein, the terms "reflection matrix configuration," "precoder configuration," and like terms, may be used interchangeably for the purposes of the present disclosure.

For example, to configure a RIS for uplink communications, a UE may transmit a first reference signal to a base station via a RIS, where the first reference signal is associated with a first reflection matrix configuration of the RIS. Upon receiving the first reference signal, the base station may perform measurements on the reference signal, and may adjust (e.g., tune) a reflection matrix configuration of the RIS. Subsequently, the UE may transmit a second reference signal to the base station via the RIS, where the second reference signal is associated with a second reflection matrix configuration of the RIS. The base station may select a reflection matrix configuration based on the information received from the UE and may cause the reconfigurable surface to be configured to use the selected reflection matrix configuration. Subsequently, the base station and the UE may communicate with one another via the reconfigurable surface using the selected reflection matrix configuration.

Such an iterative (e.g., successive) process of transmitting/receiving reference signals and adjusting the reflection matrix configuration of the RIS may be repeated any quantity of iterations until signals reflected by the RIS exhibit sufficient performance. In some aspects, the UE may be configured with the time and frequency resources used for transmitting the reference signals. In some aspects, because the RIS may become more accurately tuned or configured after each iteration of reference signals, the UE may also be configured to sequentially decrease a transmit power of each successive reference signal.

Aspects of the disclosure are initially described in the context of wireless communications systems. Additional aspects of the disclosure are described in the context of example process flows. Aspects of the disclosure are further illustrated by and described with reference to apparatus diagrams, system diagrams, and flowcharts that relate to techniques for successive tuning using a reconfigurable surface.

FIG. 1 illustrates an example of a wireless communications system 100 that supports techniques for successive tuning using a reconfigurable surface in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The quantity of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured quantity of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), highest signal-to-interference-plus-noise ratio (SINR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, the UEs 115 and the base stations 105 of the wireless communications system 100 may be configured to communicate with one another via one or more reconfigurable surfaces (e.g., RISs). Moreover, the wireless communications system 100 may support techniques for successive, iterative signaling between a base station 105 and a UE 115 via a reconfigurable surface which enables for efficient RIS reflection matrix configuration selection from a codebook of reflection matrix configurations for the reconfigurable surface. By enabling efficient precoder selection in the context of reconfigurable surfaces, techniques described herein may provide for improved throughput and improved beamforming gain while simultaneously reducing power consumption associated with other reflective devices (e.g., AAUs).

For example, to configure a reconfigurable surface of the wireless communications system 100 for uplink communications, a UE 115 may transmit a first reference signal to a base station 105 via the reconfigurable surface, where the first reference signal is associated with a first reflection matrix configuration of the reconfigurable surface. The first reflection matrix configuration may be included within a set of reflection matrix configurations (e.g., pre-configured reflection matrix configurations, codebook of reflection matrix configurations). Upon receiving the first reference signal, the base station 105 may perform measurements on the reference signal, and may adjust (e.g., tune) a reflection matrix configuration of the reconfigurable surface. Subsequently, the UE 115 may transmit a second reference signal to the base station 105 via the reconfigurable surface, where the second reference signal is associated with a second reflection matrix configuration from the set of reflection matrix configurations of the reconfigurable surface. This iterative process of transmitting/receiving reference signals and adjusting the reflection matrix configuration of the RIS may be repeated any quantity of iterations until signals reflected by the reconfigurable surface exhibit sufficient performance.

Similar, iterative techniques (e.g., successive techniques) may be used to tune/configure reconfigurable surfaces to relay (e.g., reflect) downlink signals from a base station 105 to a UE 15. In some aspects, a UE 115 may be configured with time and frequency resources used for transmitting and/or receiving reference signals to and from the base station 105 via the reconfigurable surface. In some aspects, due to the fact that a reconfigurable surface may become more accurately tuned or configured after each iteration of reference signals, the UE 115 may also be configured to sequentially decrease a transmit power of each successive reference signal while configuring the reconfigurable surface.

Techniques described herein may support signaling which enables for improved reflection matrix configuration selection for reconfigurable surfaces. By enabling for improved reflection matrix configuration selection, techniques described herein may increase throughput within the wireless communications system 100 and provide for improved beamforming gain. Additionally, the techniques described herein may enable base stations 105 to circumvent obstructions which would otherwise interrupt wireless communications, thereby increasing a quantity of UEs 115 which may be communicatively coupled to the network. Furthermore, by improving reflection matrix configuration selection of passive reconfigurable surfaces (e.g., RISs), techniques described herein may reduce a power consumption which is associated with active reconfigurable surfaces (e.g., AAUs), thereby improving the overall power efficiency of the wireless communications system 100.

Figure 2:
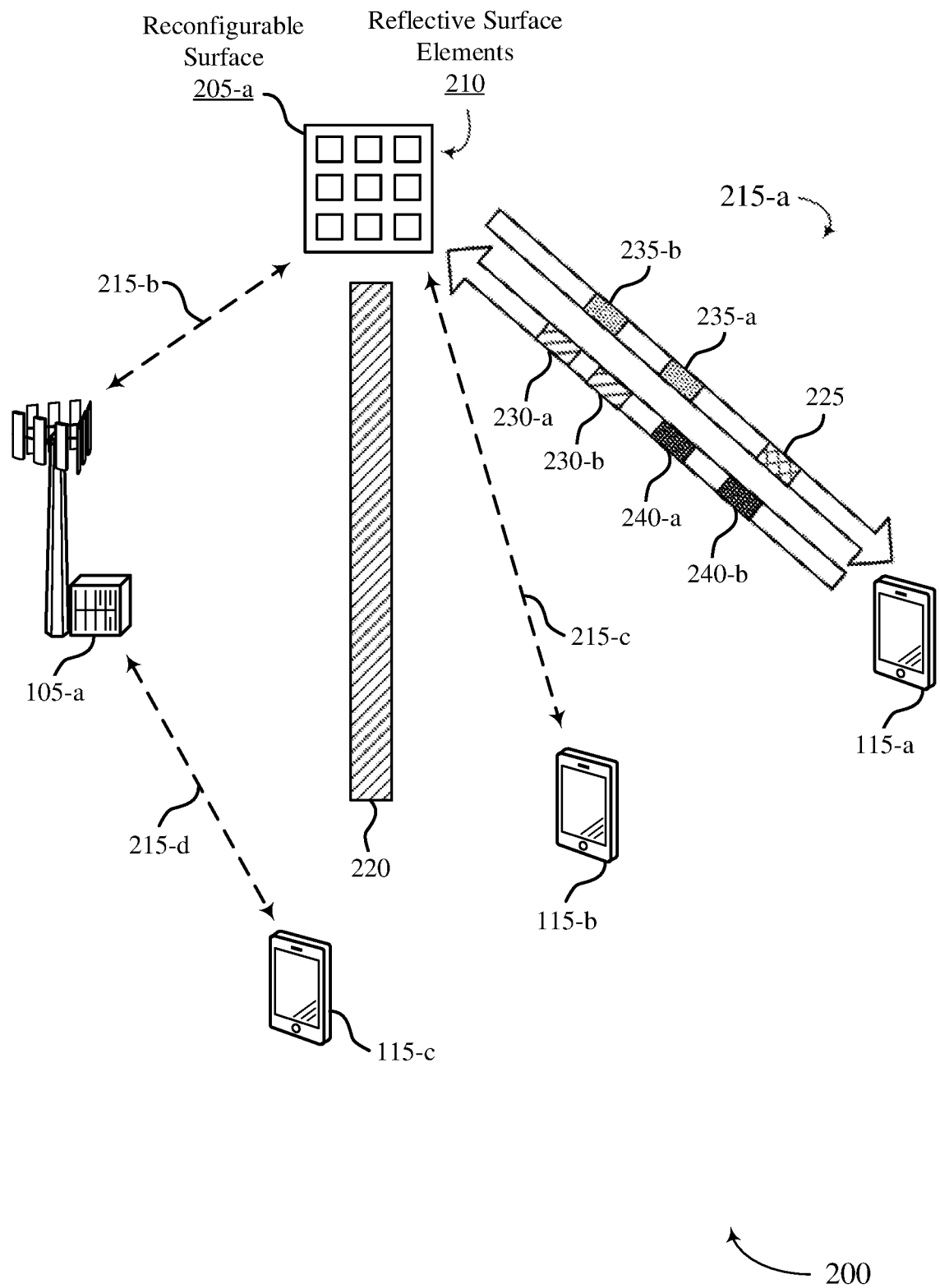
FIG. 2 illustrates an example of a wireless communications system that supports techniques for successive tuning using a reconfigurable surface in accordance with aspects of the present disclosure.

FIG. 2 illustrates an example of a wireless communications system 200 that supports techniques for successive tuning using a reconfigurable surface in accordance with aspects of the present disclosure. In some examples, wireless communications system 200 may implement aspects of wireless communications system 100. The wireless communications system 200 may include a first UE 115-a, a second UE 115-b, a third UE 115-c, a base station 105-a, and a reconfigurable surface 205-a, which may be examples of UEs 115, base stations 105, and reconfigurable surfaces as described with reference to FIG. 1.

In some aspects, the first UE 115-a and the second UE 115-b may communicate with the base station 105-a via the reconfigurable surface 205-a. In particular, the reconfigurable surface 205-a may be configured to relay (e.g., reflect) signals between the base station 105-a and the first UE 115-a and/or the second UE 115-b via a set of reflective surface elements 210. Each of the UEs 115 may communicate with the base station 105-a using one or more communication links 215. For example, the first UE 115-a may communicate with the base station 105-a via a communication link 215-a between the first UE 115-a and the reconfigurable surface 205-a and a communication link 215-b between the reconfigurable surface 205-a and the base station 105-a. Similarly, the second UE 115-b may communicate with the base station 105-a via a communication link 215-c between the second UE 115-b and the reconfigurable surface 205-a and the communication link 215-b between the reconfigurable surface 205-a and the base station 105-a. Additionally, the third UE 115-c may communicate with the base station 105-a via a communication link 215-d.

In some cases, the communication links 215 may include examples of access links (e.g., a Uu links). The communication links 215 may include bi-directional links that can include both uplink and downlink communication. For example, the first UE 115-a may transmit uplink transmissions, such as uplink control signals or uplink data signals, to the base station 105-a via the reconfigurable surface 205-a using the communication links 215-a and 215-b, and the base station 105-a may transmit downlink transmissions, such as downlink control signals or downlink data signals, to the first UE 115-a via the reconfigurable surface 205-a using the communication links 215-b and 215-a.

As noted previously herein, some wireless communications systems may utilize wireless communications devices (e.g., AAUs, RISs) which are configured to relay (e.g., reflect) signals between other wireless devices. Such devices may be used to increase throughput, improve beamforming gain, and circumvent obstructions to increase a quantity of UEs 115 which may be communicatively coupled to the network. For example, as shown in FIG. 2, an obstruction 220 may block, or otherwise interrupt, direct wireless communications between the base station 105-a and the UEs 115-a and 115-b. In such cases, wireless communications devices (e.g., AAUs, RISs) which are configured to relay (e.g., reflect) signals between other wireless devices may be used to circumvent the obstruction 220 and facilitate communications between the base station 105-a and the UEs 115-a and 115-b.

However, AAUs may result in high power consumption, and may therefore be undesirable for widespread use. Comparatively, reconfigurable surfaces (e.g., RISs) may relay (e.g., reflect) transmissions between the base station 105 and the UEs 115-a and 115-b via one or more reflective surface elements (e.g., reflective surface elements 210). As compared to AAUs, RISs are passive devices, so may result in little to no power consumption, thereby improving power efficiency of the network. However, as passive devices, conventional techniques used to generate beamforming configurations for AAUs may not be used in the context of RISs. For example, as passive devices, RISs may be unable to perform coherent combining in order to focus a beam.

Accordingly, the wireless communications system 200 may support communications between the base station 105-a, the UEs 115, and the reconfigurable surface 205-a. More specifically, the wireless communications system 100 may support techniques for successive, iterative signaling between a UEs 115-a and 115-b and the base station 105-a via the reconfigurable surface 205-a which enables for efficient precoder selection for the reconfigurable surface 205-a. By enabling efficient precoder selection in the context of reconfigurable surfaces 205, techniques described herein may provide for improved throughput and improved beamforming gain while simultaneously reducing power consumption associated with other reflective devices (e.g., AAUs).

For example, the reconfigurable surface 205-a illustrated in FIG. 2 may include an example of a RIS including a set of reflective surface elements 210. The reconfigurable surface 205-a may be "reconfigurable" in that a phase and/or angle of reflection of signals incident on each of the reflective surface elements 210, and therefore an accumulative phase and/or angle of reflection of signals incident on the reconfigurable surface 205-a, may be selectively adjusted.

The reconfigurable surface 205-*a* may be associated with a set of reflection matrix configurations (e.g., codebook of reflection matrix configurations) which are usable by the reconfigurable surface 205-*a* to reflect signals incident on the reconfigurable surface 205-*a*. In particular, each reflection matrix configuration associated with the reconfigurable surface may include a set of precoders associated with the set of reflective surface elements 210, where each reflective surface element 210 is associated with a respective precoder. For the purposes of the present disclosure, the terms "reflection matrix configurations" and "precoder configurations" may be used interchangeably to refer to configurations usable by the reconfigurable surface 205-*a* to reflect signals incident on the reconfigurable surface 205-*a*.

In this regard, the reconfigurable surface 205-*a* may be associated with a set of reflection matrix configurations (e.g., codebook of reflection matrix configurations, set of pre-configured reflection matrix configurations), where each reflection matrix configuration may be represented by a vector r including a quantity of terms $r_i$ representing precoders or reflective coefficients, and where i is equivalent to a quantity of reflective surface elements 210 of the reconfigurable surface 205-*a*. In other words, a vector r for a reconfigurable surface 205-*a* including nine reflective surface elements 210 (e.g., i=9) may include nine terms (e.g., $r_1$ through $r_9$). Due to the fact that the reconfigurable surface 205-*a* includes a passive device (e.g., RIS) which does not perform any signal amplification, each term $r_i$ may include a complex number satisfying $|r_i| \leq 1$. In some aspects, the vector r may be used to generate a diagonal matrix R, in which the diagonal elements of R include the terms $r_i$ of the vector r. In some aspects, the diagonal matrix R may be referred to as a precoder matrix of the reconfigurable surface 205-*a*.

In some aspects, the precoder (e.g., reflective coefficient) used by each respective reflective surface element 210 of the reconfigurable surface 205-*a* may be selected and/or modified by the base station 105-*a* in order to co-phase the reflection from each of the reflective surface elements 210 and increase (e.g., maximize) the reception power at the UE 115. In this regard, the precoder (e.g., reflective coefficient) used by each respective reflective surface element 210 of the reconfigurable surface 205-*a* may be selected and/or modified, which may effectively adjust the accumulative phase and/or accumulative angle of reflection of the reconfigurable surface 205-*a* as a whole. In some aspects, the phase and/or angle of reflection for each reflective surface element 210 may be adjusted by adjusting a resistance, a reactance, or both, of each respective reflective surface element 210. Accordingly, a precoder associated with each reflective surface element 210 may include a set of parameters associated with the reflective surface element 210, including an orientation of the reflective surface element 210, a resistance and/or reactance of the reflective surface element, or any combination thereof. In this regard, the reconfigurable surface 205-*b* may be configured to modify an angle of reflection of signals incident on the reconfigurable surface 205-*a* based on the precoders associated with each of the reflective surface elements 210, by modifying a reflection matrix configuration used by the reconfigurable surface 205-*a*, by transitioning from a first reflection matrix configuration to a second reflection matrix configuration, or any combination thereof.

In some aspects, the UE 115-*a* and the base station 105-*a* of the wireless communications system 200 may be configured to perform configuration procedures in order to configure the reconfigurable surface 205-*a* for uplink communications, downlink communications, or both. In particular, the UE 115-*a* and the base station 105-*b* may be configured to perform iterative configuration procedures in order to iteratively tune the reconfigurable surface 205-*a* for uplink and downlink communications.

For example, the UE 115-*a* may receive a control message 225 from the base station 105-*a*. The control message 225 may include an RRC message, a synchronization signal block (SSB) message, a downlink control information (DCI) message, or any combination thereof. In some aspects, the control message 225 may indicate one or more parameters or characteristics associated with the reconfigurable surface 205-*a*. For example, the control message may indicate a position of the reconfigurable surface 205-*a*, an orientation of the reconfigurable surface 205-*a*, or both.

Additionally or alternatively, the control message 225 may indicate a set of resources associated with a configuration procedure for configuring the reconfigurable surface 205-*a*. In particular, the control message 225 may indicate a set of time resources, frequency resources, and/or spatial resources which are usable for signaling used to configure the reconfigurable surface 205-*b* for uplink and/or downlink transmissions. For example, in the context of a configuration procedure for uplink transmissions, the control message 225 may indicate a set of transmission occasions which are usable by the first UE 115-*a* to transmit sounding reference signals (SRSs) 230 to the base station 105-*a* via the reconfigurable surface 205-*a*. By way of another example, in the context of a configuration procedure for downlink transmissions, the control message 225 may indicate a set of transmission occasions which are usable by the first UE 115-*a* to receive CSI-RSs 235 from the base station 105-*b* via the reconfigurable surface 205-*b*.

The control message 225 may indicate one or more parameters or characteristics associated with the configuration procedures used to configure the reconfigurable surface 205-*a* including, but not limited to, transmission power metrics, spatial filtering metrics, and the like. For example, in some cases, the control message 225 may indicate one or more transmission power metrics associated with transmission of SRSs 230 and/or feedback messages 240 by the UE 115-*a* during the configuration procedure.

In some aspects, the UE 115-*a* and the base station 105-*a* may be configured to perform iterative configuration procedures to configure the reconfigurable surface 205-*a* for downlink and/or uplink communications based on (e.g., in accordance with) the control message 225.

For example, when performing a configuration procedure to configure the reconfigurable surface 205-*a* for uplink communications, the base station 105-*a* may initially configure the reconfigurable surface 205-*a* with a first reflection matrix configuration (e.g., first precoder configuration), which may be represented by a vector $r_1$ and diagonal matrix $R_1$, where $R_1 = \text{diag}(r_1)$. The first reflection matrix configuration may be selected/configured without any knowledge of the channels between the respective wireless devices. The first reflection matrix configuration may be included within a set of reflection matrix configurations (e.g., codebook of reflection matrix configurations) associated with the reconfigurable surface 205-*a*. Subsequently, the UE 115-*a* may transmit a first SRS 230-*a* to the base station 105-*a* via the reconfigurable surface 205-*a*, where the first SRS 230-*a* is reflected by the reconfigurable surface 205-*a* using the first reflection matrix configuration (e.g., vector $r_1$).

Continuing with the same example, the base station 105-*a* may perform measurements on the first SRS 230-*a* which was reflected by the reconfigurable surface 205-*a* using the first reflection matrix configuration (e.g., first precoder configuration). The measurements may include, but are not limited to, received signal strength indicator (RSSI) measurements, reference signal received power (RSRP) measurements, reference signal received quality (RSRQ) measurements, SNR measurements, SINR measurements, or any combination thereof. The base station 105-*a* may perform the measurements on the first SRS 230-*a* to perform a first channel estimate ($\hat{J}_1$) of the channels between the base station 105-*a*, the reconfigurable surface 205-*a*, and the UE 115-*a*. Subsequently, the base station 105-*a* may use the first channel estimate ($\hat{J}_1$) to tune the reconfigurable surface 205-*a*. Specifically, the base station 105-*a* may use the first channel estimate ($\hat{J}_1$) to configure the reconfigurable surface 205-*a* with a second reflection matrix configuration (e.g., vector $r_2$). The second reflection matrix configuration (e.g., second precoder configuration) may be included within the set of reflection matrix configurations (e.g., codebook of reflection matrix configurations) associated with the reconfigurable surface 205-*a*.

In some aspects, the UE 115-*a* may transmit a second SRS 230-*b* to the base station 105-*a* via the reconfigurable surface 205-*a*, where the second SRS 230-*a* is reflected by the reconfigurable surface 205-*a* using the second reflection matrix configuration (e.g., vector $r_2$). Once again, the base station 105-*a* may perform measurements on the second SRS 230-*a* which was reflected by the reconfigurable surface 205-*a* using the second reflection matrix configuration. The base station 105-*a* may perform the measurements on the second SRS 230-*b* to perform a second channel estimate ($\hat{J}_2$) of the channels between the base station 105-*a*, the reconfigurable surface 205-*a*, and the UE 115-*a*. Subsequently, the base station 105-*a* may use the second channel estimate ($\hat{J}_2$) to further tune the reconfigurable surface 205-*a*. Specifically, the base station 105-*a* may use the second channel estimate ($\hat{J}_2$) to configure the reconfigurable surface 205-*a* with a third reflection matrix configuration (e.g., vector $r_3$).

This iterative process for configuring the reconfigurable surface 205-*a* for uplink transmissions may continue for any quantity of iterations. Specifically, for each iteration of the configuration procedure, the UE 115-*a* may transmit an SRS 230, the base station 105-*a* may perform a channel estimation ($\hat{J}_n$) based on the SRS 230, and may update a reflection matrix configuration used by the reconfigurable surface 205-*a* based on the channel estimation ($\hat{J}_n$). In some aspects, the reconfigurable surface 205-*a* may become more accurately tuned, and therefore exhibit improved beamforming gain, after each iteration of the configuration procedure. In some aspects, the quantity of iterations of the configuration procedure may be indicated via the control message 225.

Due to the improved beamforming gain after each iteration of the configuration procedure, the UE 115-*a* may be configured (e.g., via the control message 225) to reduce a transmission power metric associated with each sequential SRS 230. For example, the UE 115-*a* may transmit the SRS 230-*a* during the first iteration of the configuration procedure with a first transmission power metric. In this example, due to the improved beamforming gain achieved by the second reflection matrix configuration relative to the first reflection matrix configuration, the UE 115-*a* may be able to transmit the second SRS 230-*b* during the second iteration of the configuration procedure with a second transmission power metric that is reduced relative to the first transmission power metric.

An example of a configuration procedure for configuring reconfigurable surfaces 205 for uplink communications will be described in further detail in FIG. 3.

Comparatively, when performing a configuration procedure to configure the reconfigurable surface 205-*a* for downlink communications, the base station 105-*a* may initially configure the reconfigurable surface 205-*a* with a first reflection matrix configuration, which may be represented by a vector $r_1$ and diagonal matrix $R_1$, where $R_1$=diag($r_1$). The first reflection matrix configuration may be selected/configured without any knowledge of the channels between the respective wireless devices. The first reflection matrix configuration may be included within a set of reflection matrix configurations (e.g., codebook of reflection matrix configurations) associated with the reconfigurable surface 205-*a*. Subsequently, the base station 105-*a* may transmit a first CSI-RS 235-*a* to the UE 115-*a* via the reconfigurable surface 205-*a*, where the first CSI-RS 235-*a* is reflected by the reconfigurable surface 205-*a* using the first reflection matrix configuration (e.g., vector $r_1$).

Continuing with the same example, the UE 115-*a* may perform measurements on the first CSI-RS 235-*a* which was reflected by the reconfigurable surface 205-*a* using the first reflection matrix configuration (e.g., first precoder configuration). The measurements may include, but are not limited to, RSSI measurements, RSRP measurements, RSRQ measurements, SNR measurements, SINR measurements, or any combination thereof. Subsequently, the UE 115-*a* may transmit a first feedback message 240-*a* to the base station 105-*a*. The first feedback message 240-*a* may include an indication of the measurements which were performed on the first CSI-RS 235-*a*. Accordingly, the base station 105-*a* may perform a first channel estimate ($\hat{J}_1$) of the channels between the base station 105-*a*, the reconfigurable surface 205-*a*, and the UE 115-*a* based on the received first feedback message 240-*a*.

In some aspects, the base station 105-*a* may perform the first channel estimate ($\hat{J}_1$) based on the first feedback message 240-*a* to tune the reconfigurable surface 205-*a*. Specifically, the base station 105-*a* may use the first channel estimate ($\hat{J}_1$) to configure the reconfigurable surface 205-*a* with a second reflection matrix configuration (e.g., vector $r_2$). The second reflection matrix configuration may be included within the set of reflection matrix configurations (e.g., codebook of reflection matrix configurations) associated with the reconfigurable surface 205-*a*.

Upon configuring the reconfigurable surface 205-*a* with the second reflection matrix configuration, the base station 105-*a* may transmit a second CSI-RS 235-*b* to the UE 115-*a* via the reconfigurable surface 205-*a*, where the second CSI-RS 235-*b* is reflected by the reconfigurable surface 205-*a* using the second reflection matrix configuration (e.g., vector $r_2$). Once again, the UE 115-*a* may perform measurements on the second CSI-RS 235-*b* which was reflected by the reconfigurable surface 205-*a* using the second reflection matrix configuration, and may transmit a second feedback message 240-*b* which indicates the performed measurements. Subsequently, the base station 105-*a* may perform a second channel estimate ($\hat{J}_2$) of the channels between the base station 105-*a*, the reconfigurable surface 205-*a*, and the UE 115-*a* based on the second feedback message 240-*b*. In some aspects, base station 105-*a* may use the second channel estimate ($\hat{J}_2$) to further tune the reconfigurable surface 205-*a*. Specifically, the base station 105-*a* may use the second channel estimate ($\hat{J}_2$) to configure the reconfigurable surface 205-*a* with a third reflection matrix configuration (e.g., vector $r_3$). The third reflection matrix configuration may be included within the set of reflection matrix configurations (e.g., codebook of reflection matrix configurations) associated with the reconfigurable surface 205-a.

This iterative process for configuring the reconfigurable surface 205-a for downlink transmissions may continue for any quantity of iterations. Specifically, for each iteration of the configuration procedure, the base station 105-a may transmit a CSI-RS 235, the UE 115-a may perform measurements on the CSI-RS 235 and transmit a feedback message 240, and the base station 105-a may perform channel estimation ($\hat{J}_n$) based on the received feedback message 240 and update a reflection matrix configuration used by the reconfigurable surface 205-a based on the channel estimation ($\hat{J}_n$). In some aspects, the reconfigurable surface 205-a may become more accurately tuned, and therefore exhibit improved beamforming gain, after each iteration of the configuration procedure. In some aspects, the quantity of iterations of the configuration procedure may be indicated via the control message 225.

Due to the improved beamforming gain after each iteration of the configuration procedure, the UE 115-a may be configured (e.g., via the control message 225) to reduce a transmission power metric associated with each sequential feedback message 240. For example, the UE 115-a may transmit the first feedback message 240-a during the first iteration of the configuration procedure with a first transmission power metric. In this example, due to the improved beamforming gain achieved by the second reflection matrix configuration relative to the first reflection matrix configuration, the UE 115-a may be able to transmit the second feedback message 240-b during the second iteration of the configuration procedure with a second transmission power metric that is reduced relative to the first transmission power metric.

An example of a configuration procedure for configuring reconfigurable surfaces 205 for downlink communications will be described in further detail in FIG. 4.

Techniques described herein may support signaling which enables for improved reflection matrix configuration selection for reconfigurable surfaces. By enabling for improved reflection matrix configuration selection, techniques described herein may increase throughput within the wireless communications system 200 and provide for improved beamforming gain. Additionally, the techniques described herein may enable the base station 105-a to circumvent obstructions which would otherwise interrupt wireless communications, thereby increasing a quantity of UEs 115 which may be communicatively coupled to the network. Furthermore, by improving reflection matrix configuration selection of passive reconfigurable surfaces (e.g., RISs), techniques described herein may reduce a power consumption which is associated with active reconfigurable surfaces (e.g., AAUs), thereby improving the overall power efficiency of the wireless communications system 200.

Figure 3:
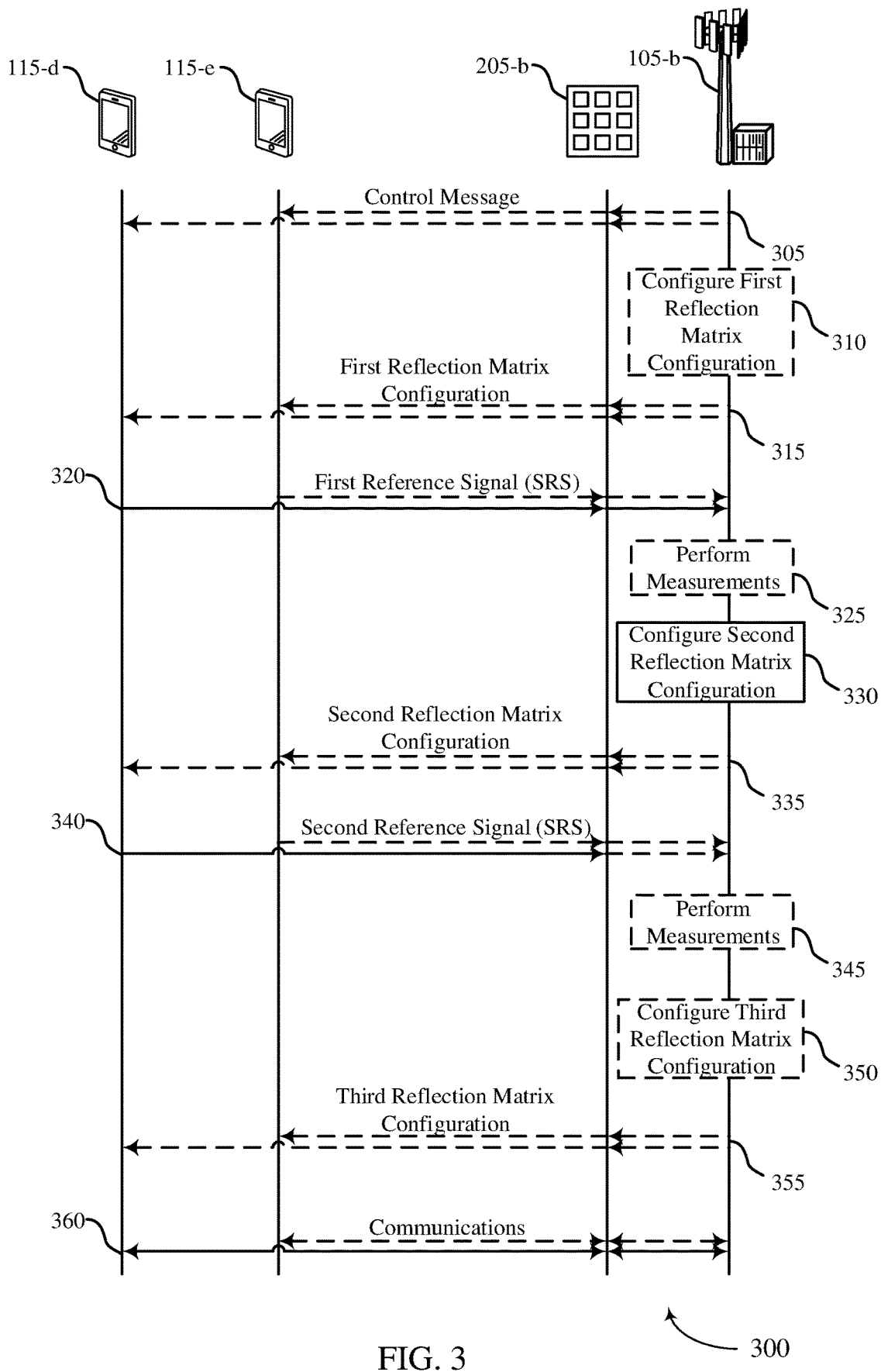
FIG. 3 illustrates an example of a process flow that supports techniques for successive tuning using a reconfigurable surface in accordance with aspects of the present disclosure.

FIG. 3 illustrates an example of a process flow 300 that supports techniques for successive tuning using a reconfigurable surface in accordance with aspects of the present disclosure. In some examples, process flow 300 may implement, or be implemented by, aspects of wireless communications system 100, wireless communications system 200, or both. In particular, the process flow 300 illustrates techniques for configuring reconfigurable surfaces 205 for uplink transmissions. For example, the process flow 300 may illustrate a UE 115-d transmitting a iterations of reference signals to a base station 105-b via a reconfigurable surface 205-b, and the base station 105-b performing measurements and configuring the reconfigurable surface 205-a based on the iterations of reference signals, as described with reference to FIGS. 1-2, among other aspects.

The process flow 300 may include a first UE 115-d, a second UE 115-e, a reconfigurable surface 205-b, and a base station 105-b, which may be examples of UEs 115, reconfigurable surfaces 205, and base stations 105, as described with reference to FIGS. 1-2. In some cases, the reconfigurable surface 205-b may include an example of a RIS including a set of reflective surface elements, as described in further detail herein with reference to FIG. 2. The reconfigurable surface 205-b may be "reconfigurable" in that an angle of reflection of signals incident on each of the reflective surface elements, and therefore an accumulative angle of reflection of signals incident on the reconfigurable surface 205-b, may be selectively adjusted. In particular, a precoder (e.g., reflective coefficient) used by each respective reflective surface element of the reconfigurable surface 205-b may be selected and/or modified, which may effectively adjust the accumulative angle of reflection of the reconfigurable surface 205-b as a whole. In this regard, the reconfigurable surface 205-b may be configured to modify an angle of reflection of signals incident on the reconfigurable surface 205-b based on the precoders associated with each of the reflective surface elements, by modifying a reflection matrix configuration used by the reconfigurable surface 205-b, by transitioning from a first reflection matrix configuration to a second reflection matrix configuration, or any combination thereof.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305, the base station 105-b may transmit a control message to the first UE 115-d, the second UE 115-e, or both. In some aspects, the base station 105-b may transmit the control message to the UEs 115-d and 115-e directly, via the reconfigurable surface 205-b, or both. The first control message may include an RRC message, an SSB message, a DCI message, or any combination thereof.

In some aspects, the control message may indicate one or more parameters or characteristics associated with the reconfigurable surface 205-b. For example, the control message may indicate a position of the reconfigurable surface, an orientation of the reconfigurable surface 205-b, or both. Additionally or alternatively, the control message may indicate a set of resources associated with a configuration procedure for configuring the reconfigurable surface 205-b. In particular, the control message may indicate a set of time resources, frequency resources, and/or spatial resources which are usable for signaling used to configure the reconfigurable surface 205-b for uplink transmissions. For example, the control message may indicate a set of transmission occasions which are usable by the first UE 115-d, the second UE 115-e, or both, to transmit reference signals to the base station 105-b via the reconfigurable surface 205-b during a configuration procedure for the reconfigurable surface 205-b.

The control message received at 305 may indicate one or more parameters or characteristics associated with the configuration procedure used to configure the reconfigurable surface for uplink transmissions including, but not limited to, transmission power metrics, spatial filtering metrics, and the like. For example, in some cases, the control message may indicate one or more transmission power metrics associated with transmission of reference signals at the UEs 115 during the configuration procedure. In particular, as the configuration procedure is performed, the reconfigurable surface 205-b may become more accurately configured/tuned, which may result in beamforming gain at the reconfigurable surface 205-b. As such, the control message may configure the UEs 115 to reduce a transmission power metric for each sequential reference signal transmitted during the configuration procedure due to the fact that the reconfigurable surface 205-b may become more finely tuned and become more efficient at reflecting the reference signals as the configuration procedure progresses.

At 310, the base station 105-b may configure the reconfigurable surface 205-b with a first reflection matrix configuration (e.g., first precoder configuration). In some aspects, the base station 105-b may configure the reconfigurable surface 205-b with the first reflection matrix configuration by transmitting wireline and/or wireless signals to the reconfigurable surface 205-b. In some cases, the base station 105-b may configure the reconfigurable surface 205-b with the first reflection matrix configuration based on transmitting the control message at 305.

The first reflection matrix configuration may be included within a set of reflection matrix configurations (e.g., codebook of reflection matrix configurations) associated with the reconfigurable surface. In some aspects, the first reflection matrix configuration may be selected without any prior knowledge of a channel between the base station 105-b and the reconfigurable surface 205-b, channels between the reconfigurable surface 205-b and the UEs 115, or both. For example, the first reflection matrix configuration may include a standard, or default, reflection matrix configuration associated with the reconfigurable surface 205-b. In such cases, the reconfigurable surface 205-b may be configured with the first reflection matrix configuration without any signaling from the base station 105-b.

In some aspects, the first reflection matrix configuration may be represented by a vector $r_1$, where $r_1$ includes a quantity of terms representing precoders or reflective coefficients for the reflective surface elements of the reconfigurable surface 205-b. In some cases, the terms of the vector $r_1$ representing the first reflection matrix configuration may be selected based on a previous (e.g., outdated) reflection matrix configuration used by the reconfigurable surface 205-b, an initial access procedure performed using the reconfigurable surface 205-b, or both. In some aspects, the quantity of terms of the vector $r_1$ may be equivalent to a quantity of reflective surface elements of the reconfigurable surface 205-b. In other words, in cases where the reconfigurable surface 205-b includes nine reflective surface elements (e.g., i=9), the vector $r_1$ may include nine terms. Due to the fact that the reconfigurable surface 205-b includes a passive device (e.g., RIS) which does not perform any signal amplification, each term $r_i$ within the vector $r_1$ may include a complex number satisfying $|r_i| \leq 1$. In some aspects, the vector $r_1$ may be used to generate a diagonal matrix $R_1$, in which the diagonal elements of $R_1$ include the terms $r_i$ of the vector $r_1$ (e.g., $R_1 = \text{diag}(r_1) = I$). In some aspects, the diagonal matrix R may be referred to as a precoder matrix of the reconfigurable surface 205-b.

At 315, the base station 105-b may transmit an indication of the first reflection matrix configuration (e.g., $r_1$, $R_1$) to the first UE 115-d, the second UE 115-e, or both. The base station 105-a may transmit the indication of the first reflection matrix configuration to the UEs 115 directly, via the reconfigurable surface 205-b, or both. Moreover, the base station 105-b may transmit the indication of the first reflection matrix configuration based on transmitting the control message at 305, configuring the reconfigurable surface 205-b with the first reflection matrix configuration at 310, or both. The indication of the first reflection matrix configuration may be transmitted via an RRC message, a DCI message, a MAC-CE message, or any combination thereof.

At 320, the first UE 115-d, the second UE 115-e, or both, may transmit a first reference signal to the base station 105-b via the reconfigurable surface 205-b. The first reference signal may be transmitted within a first transmission occasion of the configuration procedure for configuring the reconfigurable surface for uplink transmissions. In some aspects, the first reference signal may be reflected by the reconfigurable surface 205-b using the first reflection matrix configuration. In this regard, the first reference signal may be associated with (e.g., reflected by) the first reflection matrix configuration used by the reconfigurable surface 205-b to reflect signals.

The UEs 115 may be configured to transmit the first reference signal(s) at 320 based on receiving the control message at 305, receiving the indication of the first reflection matrix configuration at 315, or both. For example, the first UE 115-d may transmit the first reference signal within a first transmission occasion of a set of transmission occasions associated with the configuration procedure which was indicated in the control message received at 305. In some aspects, the first UE 115-d may transmit the first reference signal at 320 with a first transmission power metric. In some cases, the first transmission power metric may be configured (e.g., pre-configured) at the first UE 115-d, signaled to the first UE 115-d via the control message at 305, or both.

In some aspects, the first reference signal transmitted by the first UE 115-d and/or the second UE 115-e may include an SRS. In some cases, the UEs 115 may transmit the first reference signal with a first spatial filtering metric. Additionally, in some cases, the first reference signal transmitted and reflected by the reconfigurable surface 205-b at 320 may include a different format of reference signal as compared to reference signals which are not reflected by the reconfigurable surface 205-b. For example, the first reference signal transmitted and reflected by the reconfigurable surface 205-b at 320 may be less complex (e.g., simpler) and may include less information as compared to reference signals which are transmitted directly from the UEs 115 to the base station 105-b (e.g., transmitted without reflection from the reconfigurable surface 205-b). For instance, the first reference signal may be transmitted with a first spatial filtering metric which is different from a second spatial filtering metric which is used to transmit reference signals which are not reflected using the reconfigurable surface 205-b.

At 325, the base station 105-b may perform measurements on the first reference signal received from the first UE 115-d, the second UE 115-e, or both. The measurements performed on the first reference signal may include any measurements known in the art including, but not limited to, RSSI measurements, RSRP measurements, RSRQ measurements, SNR measurements, SINR measurements, or any combination thereof.

In some aspects, the base station 105-b may perform the measurements on the first reference signal in order to perform channel estimation and to determine an efficiency or effectiveness of the first reflection matrix configuration used by the reconfigurable surface 205-b. In other words, the base station 105-b may perform the measurements and perform the channel estimation at 325 in order to determine whether the reconfigurable surface 205-b may be configured with a different reflection matrix configuration which will result in improved beamforming gain relative to the first reflection matrix configuration.

For example, with respect to the first UE 115-d, the base station 105-b may perform measurements on the first reference signal received from the first UE 115-d to perform channel estimation for a channel (h) between the base station 105-b and the first UE 115-d, and a channel (g) between the first UE 115-d and the reconfigurable surface 205-b. For instance, the base station may perform channel estimation for the extended channel ($J_1$) according to $\hat{J}_1 \approx J_1 = H*R_1*G = H*G$, where $J_1$ defines the extended channel between the base station 105-b and the first UE 115-d, $\hat{J}_1$ is the estimation of the channel $J_1$, $R_1$ is the diagonal matrix of the vector $r_1$ for the first reflection matrix configuration (e.g., $R_1 = \text{diag}(r_1)$), and G and H are the diagonal matrices of the channels g and h, respectively (e.g., $G = \text{diag}(g)$, $H = \text{diag}(h)$).

As noted previously herein, the first reflection matrix configuration (e.g., $r_1$, $R_1$) used by the reconfigurable surface 205-b may be selected without any previous knowledge of the channels (e.g., channel g, channel h) between the respective wireless devices. In other words, $R_1$ for the first reflection matrix configuration may be selected independently from G and H. As such, the first reflection matrix configuration used by the reconfigurable surface 205-b may be relatively ineffective in reflecting the first reference signal to the base station 105-b (e.g., relatively small beamforming gain), which may result in relatively low receive power for the first reference signal at the base station 105-b. As such, the measurements performed at 325 (e.g., following a first iteration of the configuration procedure) may result in relatively inaccurate estimations of the channels g and h, as well as the estimation of the extended channel $J_1$.

At 330, the base station 105-b may configure the reconfigurable surface 205-b with a second reflection matrix configuration (e.g., second precoder configuration). In some aspects, the base station 105-b may configure the reconfigurable surface 205-b with the second reflection matrix configuration by transmitting wireline and/or wireless signals to the reconfigurable surface 205-b. The second reflection matrix configuration may be included within the set of reflection matrix configurations (e.g., codebook of reflection matrix configurations) associated with the reconfigurable surface 205-b. In some cases, the base station 105-b may configure the reconfigurable surface 205-b with the second reflection matrix configuration based on transmitting the control message at 305, configuring the reconfigurable surface 205-b with the first reflection matrix configuration at 310, transmitting the indication of the first reflection matrix configuration at 315, receiving the first reference signal(s) at 320, performing the measurements/channel estimation at 325, or any combination thereof.

For example, the second reflection matrix configuration may be represented by a vector $r_2$, where $r_2$ includes a quantity of terms representing precoders or reflective coefficients for the reflective surface elements of the reconfigurable surface 205-b. In this example, the base station 105-b may configure the reflective coefficients of $r_2$ (e.g., reflective coefficients of the second reflection matrix configuration) based on the first estimate of the extended channel $\hat{J}_1$ determined at 325. In other words, the base station 105-b may configure the second reflection matrix configuration based on the measurements which were performed on the first reference signal which was reflected by the reconfigurable surface 205-b using the first reflection matrix configuration. In some aspects, each term within the vector $r_2$ may include a complex number satisfying $|r_i| \leq 1$. Moreover, the vector $r_2$ may be used to generate a diagonal matrix $R_2$, in which the diagonal elements of $R_2$ include the terms $r_i$ of the vector $r_2$ (e.g., $R_2 = \text{diag}(r_2)$).

In some aspects, the base station 105-b may select/configure the reflective coefficients (e.g., phases) of the terms $r_i$ of the vector $r_2$ in such a manner as to increase (e.g., maximize) a reception power of signals received at the base station 105-b. In particular, the base station 105-b may select/configure the second reflection matrix configuration in order to increase a reception power of signals which are transmitted by the first UE 115-d and/or second UE 115-e and reflected by the reconfigurable surface 205-b. In other words, the vector $r_2$ of the second reflection matrix configuration may be selected such that $\|H*R_2*g\| = \|H*G*r_2\| = \|\hat{J}_1 r_2\| \approx \|\hat{J}_1 r_2\|$ is increased, or maximized. As such, the base station 105-b may configure the reconfigurable surface 205-b to increase an efficiency at which the reconfigurable surface 205-b reflects uplink transmissions from the UEs 115 (e.g., increase beamforming gain) relative to the first reflection matrix configuration.

At 335, the base station 105-b may transmit an indication of the second reflection matrix configuration (e.g., $r_2$, $R_2$) to the first UE 115-d, the second UE 115-e, or both. The base station 105-a may transmit the indication of the second reflection matrix configuration to the UEs 115 directly, via the reconfigurable surface 205-b, or both. Moreover, the base station 105-b may transmit the indication of the second reflection matrix configuration based on transmitting the control message at 305, receiving the first reference signal(s) at 320, performing the measurements/channel estimation at 325, configuring the reconfigurable surface 205-b with the second reflection matrix configuration at 330, or any combination thereof. The indication of the second reflection matrix configuration may be transmitted via an RRC message, a DCI message, a MAC-CE message, or any combination thereof.

At 340, the first UE 115-d, the second UE 115-e, or both, may transmit a second reference signal to the base station 105-b via the reconfigurable surface 205-b. The second reference signal may be transmitted within a second transmission occasion of the configuration procedure for configuring the reconfigurable surface for uplink transmissions. In some aspects, the second reference signal may be reflected by the reconfigurable surface 205-b using the second reflection matrix configuration. In this regard, the second reference signal may be associated with (e.g., reflected by) the second reflection matrix configuration used by the reconfigurable surface 205-b to reflect signals.

The UEs 115 may be configured to transmit the second reference signal(s) at 340 based on receiving the control message at 305, receiving the indication of the second reflection matrix configuration at 335, or both. For example, the first UE 115-d may transmit the second reference signal within a second transmission occasion of a set of transmission occasions associated with the configuration procedure which was indicated in the control message received at 305.

In some aspects, the first UE 115-d may transmit the second reference signal at 340 with a second transmission power metric. In particular, the first UE 115-d may transmit the second reference signal at 340 with a second transmission power metric which is less than the first transmission power metric with which first reference signal was transmitted at 320. The improved beamforming gain at the reconfigurable surface 205-b which is achieved via the second reflection matrix configuration may enable the first UE 115-d to reduce a transmission power without significantly decreasing a reception power at the base station 105-b. In this regard, the first UE 115-b may be configured to reduce a transmission power metric for each sequential reference signal that is transmitted during the configuration procedure due to the improved beamforming gain at the reconfigurable surface 205-b. In other words, the first UE 115-d may transmit the first reference signal at 320 with a higher transmission power metric in order to compensate for the lack of beamforming gain achieved by the first reflection matrix configuration at the reconfigurable surface 205-b. In some cases, the transmission power metrics may be configured (e.g., pre-configured) at the first UE 115-d, signaled to the first UE 115-d via the control message at 305, or both.

In some aspects, the second reference signal transmitted by the first UE 115-d and/or the second UE 115-e may include an SRS. In some cases, the UEs 115 may transmit the second reference signal with a same or different spatial filtering metric relative to the first reference signal. For example, in some cases, the first UE 115-d may transmit the first reference signal at 320 and the second reference signal at 340 with the same spatial filtering metric. For instance, the first reference signal and the second reference signal may be transmitted with a first spatial filtering metric which is different from a second spatial filtering metric which is used to transmit reference signals which are not reflected using the reconfigurable surface 205-b. In other cases, the first UE 115-d may transmit the first reference signal and the second reference signal with different spatial filtering metrics.

Additionally, as noted previously herein, the second reference signal transmitted and reflected by the reconfigurable surface 205-b at 340 may include a different format of reference signal as compared to reference signals which are not reflected by the reconfigurable surface 205-b. For example, the second reference signal transmitted and reflected by the reconfigurable surface 205-b at 340 may be less complex (e.g., simpler) and may include less information as compared to reference signals which are transmitted directly from the UEs 115 to the base station 105-b (e.g., transmitted without reflection from the reconfigurable surface 205-b).

At 345, the base station 105-b may perform measurements on the second reference signal received from the first UE 115-d, the second UE 115-e, or both. The measurements performed on the second reference signal may include any measurements known in the art including, but not limited to, RSSI measurements, RSRP measurements, RSRQ measurements, SNR measurements, SINR measurements, or any combination thereof.

In some aspects, the base station 105-b may perform the measurements on the second reference signal in order to perform channel estimation and to determine an efficiency or effectiveness of the second reflection matrix configuration used by the reconfigurable surface 205-b. In other words, the base station 105-b may perform the measurements and perform the channel estimation at 345 in order to determine whether the reconfigurable surface 205-b may be configured with a different reflection matrix configuration which will result in improved beamforming gain relative to the second reflection matrix configuration.

In some cases, due to the fact that the first reflection matrix configuration may have been selected without knowledge of the channel and the second reflection matrix configuration was specifically configured with reflective coefficients at the reconfigurable surface 205-b, the receive power at the base station 105-b may be higher for the second reference signal as compared to the first reference signal. In some cases, the increased reception power of the second reference signal (e.g., improved beamforming gain at the reconfigurable surface 205-b) may enable the base station 105-b to perform more accurate channel estimation.

For example, with respect to the first UE 115-d, the base station 105-b may perform measurements on the second reference signal received from the first UE 115-d to perform channel estimation for the channel (h) between the base station 105-b and the first UE 115-d, and the channel (g) between the first UE 115-d and the reconfigurable surface 205-b. For instance, the base station may perform channel estimation for the extended channel ($J_2$) to according to $\hat{J}_2 = J_2 = H^* R_2^* G$, where $J_2$ defines the extended channel between the base station 105-b and the first UE 115-d, $\hat{J}_2$ is the estimation of the channel $J_2$, $R_2$ is the diagonal matrix of the vector $r_r$ for the second reflection matrix configuration (e.g., $R_2 = \text{diag}(r_2)$), and G and H are the diagonal matrices of the channels g and h, respectively (e.g., $G = \text{diag}(g)$, $H = \text{diag}(h)$). In this example, the channel estimation may determine that $$\frac{\|\hat{J}_2 - J_2\|}{\|J_2\|} << \frac{\|\hat{J}_1 - J_1\|}{\|J_1\|}.$$

In this regard, the channel estimation performed based on the second reference signal (e.g., second reflection matrix configuration) may result in an improved channel estimation as compared to the channel estimation performed based on the first reference signal (e.g., first reflection matrix configuration).

In some aspects, the UEs 115 and the base station 105-b may be configured to perform any quantity of iterations of the configuration procedure illustrated in process flow 300 in order to configure the reconfigurable surface 205-b for uplink transmissions. In this regard, the UEs 115 may be configured to transmit reference signals for any quantity of iterations, where the base station 105-b is configured to perform channel estimation and re-configure the reconfigurable surface 205-b with a new reflection matrix configuration based on the received reference signals (e.g., for each iteration of the configuration procedure). Accordingly, in some cases, operations 330-345 may be performed any quantity of iterations in order to fine-tune the reflection matrix configuration which will be used by the reconfigurable surface 205-b to reflect uplink transmissions to the base station 105-b. In some aspects, the quantity of iterations of the configuration procedure may be indicated to the UEs 115 via the control message at 305.

At 350, the base station 105-b may configure the reconfigurable surface 205-b with a third reflection matrix configuration (e.g., third precoder configuration). In some aspects, the base station 105-b may configure the reconfigurable surface 205-b with the third reflection matrix configuration by transmitting wireline and/or wireless signals to the reconfigurable surface 205-b. The third reflection matrix configuration may be included within the set of reflection matrix configurations (e.g., codebook of reflection matrix configurations) associated with the reconfigurable surface 205-b. In some cases, the base station 105-b may configure the reconfigurable surface 205-b with the third reflection matrix configuration based on transmitting the control message at 305, configuring the reconfigurable surface 205-b with the first and/or second reflection matrix configurations, receiving the second reference signal at 340, performing the measurements/channel estimation at 345, or any combination thereof.

For example, the third reflection matrix configuration may be represented by a vector $r_3$, where $r_3$ includes a quantity of terms representing precoders or reflective coefficients for the reflective surface elements of the reconfigurable surface 205-b. In this example, the base station 105-b may configure the reflective coefficients of $r_3$ (e.g., reflective coefficients of the third reflection matrix configuration) based on the second estimate of the extended channel $\hat{J}_2$ determined at 345. In other words, the base station 105-b may configure the third reflection matrix configuration based on the measurements which were performed on the second reference signal which was reflected by the reconfigurable surface 205-b using the second reflection matrix configuration. In some aspects, each term within the vector $r_3$ may include a complex number satisfying $|r_i| \le 1$. Moreover, the vector $r_3$ may be used to generate a diagonal matrix $R_3$, in which the diagonal elements of $R_3$ include the terms $r_i$ of the vector $r_3$ (e.g., $R_3 = \text{diag}(r_3)$).

In some aspects, the base station 105-b may select/configure the reflective coefficients of the vector $r_3$ in such a manner as to increase (e.g., maximize) a reception power of signals received at the base station 105-b. In particular, the base station 105-b may select/configure the third reflection matrix configuration in order to increase a reception power of signals which are transmitted by the first UE 115-d and/or second UE 115-e and reflected by the reconfigurable surface 205-b. For example, in some cases, $R_3$ may be determined according to $R_3 = R' + R_2$, where $R'$ is a diagonal matrix. In this example, $R'$ may be selected such that $\|H^* R_3^* g\| = \|H^* R'^* R_2^* g\| = \|H^* R_2^* G^* r'\| \approx \|\hat{J}_2 r'\|$ is increased, or maximized.

As such, the base station 105-b may be configured to adjust the reflective coefficients of the vector $r_2$ associated with the second reflection matrix configuration by the vector $r'$ in order to obtain the fine-tuned reflective coefficients for the vector $r_3$ associated with the third reflection matrix configuration. In this regard, the base station 105-b may be configured to use the channel estimate $\hat{J}_2$ obtained using the second reflection matrix configuration in order to fine-tune the vector $r_3$ associated with the third reflection matrix configuration. Moreover, due to the fact that the channel estimate $\hat{J}_2$ obtained using the second reflection matrix configuration may be improved relative to the channel estimate $\hat{J}_1$ obtained using the first reflection matrix configuration, the third reflection matrix configuration (e.g., vector $r_3$) may result in in improved beamforming gain (e.g., improved co-phasing gain) as compared to the second reflection matrix configuration (e.g., vector $r_2$) and/or the first reflection matrix configuration (e.g., vector $r_1$).

At 355, the base station 105-b may transmit an indication of the third reflection matrix configuration (e.g., $r_3$, $R_3$) to the first UE 115-d, the second UE 115-e, or both. The base station 105-a may transmit the indication of the third reflection matrix configuration to the UEs 115 directly, via the reconfigurable surface 205-b, or both. Moreover, the base station 105-b may transmit the indication of the third reflection matrix configuration based on transmitting the control message at 305, receiving the second reference signal(s) at 340, performing the measurements/channel estimation at 345, configuring the reconfigurable surface 205-b with the third reflection matrix configuration at 350, or any combination thereof. The indication of the third reflection matrix configuration may be transmitted via an RRC message, a DCI message, a MAC-CE message, or any combination thereof.

At 360, the first UE 115-d, the second UE 115-e, or both, may communicate with the base station 105-b. In particular, the UEs 115 may communicate with the base station 105-b using the third reflection matrix configuration. In this regard, the UEs 115 may communicate with the base station 105-b at 360 based on receiving the control message at 305, transmitting the first reference signal(s) at 320, transmitting the second reference signal(s) at 340, receiving the indication of the third reflection matrix configuration at 355, or any combination thereof. For example, upon receiving the indication of the third reflection matrix configuration, the first UE 115-d may transmit an uplink transmission (e.g., physical uplink control channel (PUCCH) transmission, physical uplink shared channel (PUSCH) transmission, reference signal) to the base station 105-b, where the uplink transmission is reflected by the reconfigurable surface 205-b using the third reflection matrix configuration.

Techniques described herein may support signaling which enables for improved reflection matrix configuration selection for reconfigurable surfaces from a codebook of reflection matrix configurations. By enabling for improved precoder configuration selection, techniques described herein may increase throughput within the wireless communications system and provide for improved beamforming gain. Additionally, the techniques described herein may enable the base station 105-b to circumvent obstructions which would otherwise interrupt wireless communications, thereby increasing a quantity of UEs 115 which may be communicatively coupled to the network. Furthermore, by improving reflection matrix configuration selection of passive reconfigurable surfaces (e.g., RISs), techniques described herein may reduce a power consumption which is associated with active reconfigurable surfaces (e.g., AAUs), thereby improving the overall power efficiency of the wireless communications system.

Figure 4:
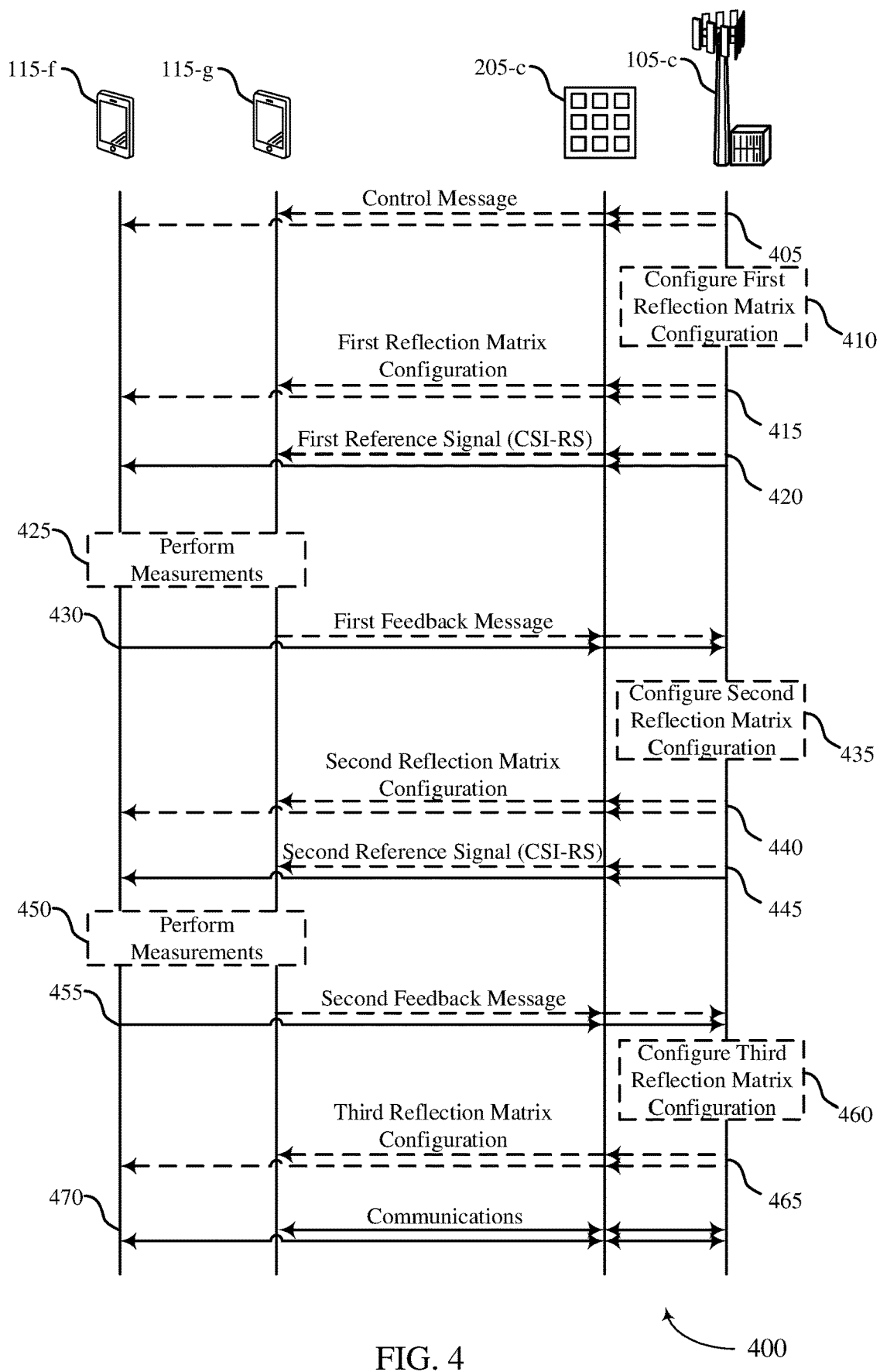
FIG. 4 illustrates an example of a process flow that supports techniques for successive tuning using a reconfigurable surface in accordance with aspects of the present disclosure.

FIG. 4 illustrates an example of a process flow 400 that supports techniques for successive tuning using a reconfigurable surface in accordance with aspects of the present disclosure. In some examples, process flow 400 may implement, or be implemented by, aspects of wireless communications system 100, wireless communications system 200, process flow 300, or any combination thereof. In particular, the process flow 400 illustrates techniques for configuring reconfigurable surfaces 205 for downlink transmissions. For example, the process flow 400 may illustrate a base station 105-c transmitting a iterations of reference signals to UEs 115 via a reconfigurable surface 205-c, receiving feedback messages from the UEs 115 responsive to the reference signals, and configuring the reconfigurable surface 205-c based on the iterations of reference signals, as described with reference to FIGS. 1-3, among other aspects.

The process flow 400 may include a first UE 115-f, a second UE 115-g, a reconfigurable surface 205-c, and a base station 105-c, which may be examples of UEs 115, reconfigurable surfaces 205, and base stations 105, as described with reference to FIGS. 1-3. In some cases, the reconfigurable surface 205-c may include an example of a RIS including a set of reflective surface elements, as described in further detail herein with reference to FIG. 2. The reconfigurable surface 205-c may be "reconfigurable" in that an angle of reflection of signals incident on each of the reflective surface elements, and therefore an accumulative angle of reflection of signals incident on the reconfigurable surface 205-c, may be selectively adjusted. In particular, a precoder (e.g., reflective coefficient) used by each respective reflective surface element of the reconfigurable surface 205-c may be selected and/or modified, which may effectively adjust the accumulative angle of reflection of the reconfigurable surface 205-c as a whole. In this regard, the reconfigurable surface 205-c may be configured to modify an angle of reflection of signals incident on the reconfigurable surface 205-c based on the precoders associated with each of the reflective surface elements, by modifying a reflection matrix configuration used by the reconfigurable surface 205-c, by transitioning from a first reflection matrix configuration to a second reflection matrix configuration, or any combination thereof.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 405, the base station 105-c may transmit a control message to the first UE 115-f, the second UE 115-g, or both. In some aspects, the base station 105-c may transmit the control message to the UEs 115-f and 115-g directly, via the reconfigurable surface 205-c, or both. The first control message may include an RRC message, an SSB message, a DCI message, or any combination thereof.

In some aspects, the control message may indicate one or more parameters or characteristics associated with the reconfigurable surface 205-c. For example, the control message may indicate a position of the reconfigurable surface, an orientation of the reconfigurable surface 205-c, or both. Additionally or alternatively, the control message may indicate a set of resources associated with a configuration procedure for configuring the reconfigurable surface 205-c. In particular, the control message may indicate a set of time resources, frequency resources, and/or spatial resources which are usable for signaling used to configure the reconfigurable surface 205-c for downlink transmissions. For example, the control message may indicate a set of transmission occasions which are usable by the base station 105-c to transmit reference signals to the UEs 115 via the reconfigurable surface 205-c during a configuration procedure for the reconfigurable surface 205-c. By way of another example, the control message may indicate a set of resources usable by the UEs 115 to transmit feedback messages responsive to the reference signals associated with the configuration procedure.

The control message received at 405 may indicate one or more parameters or characteristics associated with the configuration procedure used to configure the reconfigurable surface for downlink transmissions including, but not limited to, transmission power metrics for feedback messages transmitted by the UEs 115, spatial filtering metrics, and the like. For example, in some cases, the control message may indicate one or more transmission power metrics associated with transmission of feedback messages by the UEs 115 during the configuration procedure. In particular, as the configuration procedure is performed, the reconfigurable surface 205-c may become more accurately configured/tuned, which may result in beamforming gain at the reconfigurable surface 205-c. As such, the control message may configure the UEs 115 to reduce a transmission power metric for each sequential feedback message transmitted during the configuration procedure due to the fact that the reconfigurable surface 205-c may become more finely tuned and become more efficient at reflecting the feedback messages as the configuration procedure progresses.

At 410, the base station 105-c may configure the reconfigurable surface 205-c with a first reflection matrix configuration (e.g., first precoder configuration). In some aspects, the base station 105-c may configure the reconfigurable surface 205-c with the first reflection matrix configuration by transmitting wireline and/or wireless signals to the reconfigurable surface 205-c. In some cases, the base station 105-c may configure the reconfigurable surface 205-c with the first reflection matrix configuration based on transmitting the control message at 405.

The first reflection matrix configuration may be included within a set of reflection matrix configurations (e.g., codebook of reflection matrix configurations) associated with the reconfigurable surface 205-c. In some aspects, the first reflection matrix configuration may be selected without any prior knowledge of a channel between the base station 105-c and the reconfigurable surface 205-c, channels between the reconfigurable surface 205-c and the UEs 115, or both. For example, the first reflection matrix configuration may include a standard, or default, reflection matrix configuration associated with the reconfigurable surface 205-c. In such cases, the reconfigurable surface 205-c may be configured with the first reflection matrix configuration without any signaling from the base station 105-c.

In some aspects, the first reflection matrix configuration may be represented by a vector $r_1$, where $r_1$ includes a quantity of terms representing precoders or reflective coefficients for the reflective surface elements of the reconfigurable surface 205-c. In some cases, the terms of the vector $r_1$ representing the first reflection matrix configuration may be selected based on a previous (e.g., outdated) reflection matrix configuration used by the reconfigurable surface 205-c, an initial access procedure performed using the reconfigurable surface 205-c, or both. In some aspects, the quantity of terms of the vector $r_1$ may be equivalent to a quantity of reflective surface elements of the reconfigurable surface 205-c. In other words, in cases where the reconfigurable surface 205-c includes nine reflective surface elements (e.g., i=9), the vector $r_1$ may include nine terms. Due to the fact that the reconfigurable surface 205-c includes a passive device (e.g., RIS) which does not perform any signal amplification, each term $r_i$ within the vector $r_1$ may include a complex number satisfying $|r_i| \leq 1$. In some aspects, the vector $r_1$ may be used to generate a diagonal matrix $R_1$, in which the diagonal elements of $R_1$ include the terms $r_i$ of the vector $r_1$ (e.g., $R_1 = \text{diag}(r_1) = I$). In some aspects, the diagonal matrix R may be referred to as a precoder matrix of the reconfigurable surface 205-c.

At 415, the base station 105-c may transmit an indication of the first reflection matrix configuration (e.g., $r_1$, $R_1$) to the first UE 115-f, the second UE 115-g, or both. The base station 105-a may transmit the indication of the first reflection matrix configuration to the UEs 115 directly, via the reconfigurable surface 205-c, or both. Moreover, the base station 105-c may transmit the indication of the first reflection matrix configuration based on transmitting the control message at 405, configuring the reconfigurable surface 205-c with the first reflection matrix configuration at 410, or both. The indication of the first reflection matrix configuration may be transmitted via an RRC message, a DCI message, a MAC-CE message, or any combination thereof.

At 420, the base station 105-c may transmit a first reference signal to the first UE 115-f, the second UE 115-g, or both, via the reconfigurable surface 205-c. The first reference signal may be transmitted within a first transmission occasion of the configuration procedure for configuring the reconfigurable surface for downlink transmissions. In some aspects, the first reference signal may be reflected by the reconfigurable surface 205-c using the first reflection matrix configuration. In this regard, the first reference signal may be associated with (e.g., reflected by) the first reflection matrix configuration used by the reconfigurable surface 205-c to reflect signals.

The UEs 115 may be configured to receive the first reference signal(s) at 420 based on receiving the control message at 405, receiving the indication of the first reflection matrix configuration at 415, or both. For example, the first UE 115-f may receive the first reference signal within a first transmission occasion of a set of transmission occasions associated with the configuration procedure which was indicated in the control message received at 405.

In some aspects, the first reference signal transmitted by the base station 105-c may include a CSI-RS. In some cases, the base station 105-c may transmit the first reference signal with a first spatial filtering metric Additionally, in some cases, the first reference signal transmitted and reflected by the reconfigurable surface 205-c at 420 may include a different format of reference signal as compared to reference signals which are not reflected by the reconfigurable surface 205-c. For example, the first reference signal transmitted and reflected by the reconfigurable surface 205-c at 420 may be less complex (e.g., simpler) and may include less information as compared to reference signals which are transmitted directly from the base station 105-c to the UEs 115 (e.g., transmitted without reflection from the reconfigurable surface 205-c). For instance, the first reference signal may be transmitted with a first spatial filtering metric which is different from a second spatial filtering metric which is used to transmit reference signals which are not reflected using the reconfigurable surface 205-b.

At 425, the first UE 115-f, the second UE 115-g, or both, may perform measurements on the first reference signal received from the base station 105-c. The measurements performed on the first reference signal may include any measurements known in the art including, but not limited to, RSSI measurements, RSRP measurements, RSRQ measurements, SNR measurements, SINR measurements, or any combination thereof.

In some aspects, the UEs 115 may perform the measurements on the first reference signal in order to perform channel estimation and to determine an efficiency or effectiveness of the first reflection matrix configuration used by the reconfigurable surface 205-c. In other words, the UEs 115 may perform the measurements and perform the channel estimation at 425 in order to determine whether the reconfigurable surface 205-c may be configured with a different reflection matrix configuration which will result in improved beamforming gain relative to the first reflection matrix configuration.

At 430, the first UE 115-f, the second UE 115-g, or both, may transmit a first feedback message to the base station. The UEs 115 may transmit the first feedback message(s) at 430 based on receiving the control message at 405, receiving the indication of the first reflection matrix configuration at 415, receiving the first reference signal at 420, performing the measurements at 425, or any combination thereof. For example, the first UE 115-f may transmit a first feedback message at 430 within a set of resources allocated for feedback messages which was indicated in the control message received at 405.

In some aspects, the first feedback message may indicate one or more parameters or characteristics associated with the first reference signal (e.g., first CSI-RS). In some cases, the first feedback message may include an indication of the measurements which were performed on the first reference signals at 425. For example, the first feedback message transmitted by the first UE 115-f may include a CSI report which includes measurements performed by the first UE 115-f at 425. In some aspects, the first UE 115-f, the second UE 115-b, or both, may transmit the first feedback message at 430 with a first transmission power metric. In some cases, the first transmission power metric may be configured (e.g., pre-configured) at the UEs 115, signaled to the UEs 115 via the control message at 405, or both.

At 435, the base station 105-c may configure the reconfigurable surface 205-c with a second reflection matrix configuration (e.g., second precoder configuration). In some aspects, the base station 105-c may configure the reconfigurable surface 205-c with the second reflection matrix configuration by transmitting wireline and/or wireless signals to the reconfigurable surface 205-c. The second reflection matrix configuration may be included within the set of reflection matrix configurations (e.g., codebook of reflection matrix configurations) associated with the reconfigurable surface 205-c. In some cases, the base station 105-c may configure the reconfigurable surface 205-c with the second reflection matrix configuration based on transmitting the control message at 405, configuring the reconfigurable surface 205-c with the first reflection matrix configuration at 410, transmitting the indication of the first reflection matrix configuration at 415, transmitting the first reference signal at 420, receiving the first feedback message(s) at 430, or any combination thereof.

For example, the base station 105-c may be configured to perform channel estimation based on the first feedback message(s) received from the UEs 115 at 430. In particular, the base station 105-c may be configured to perform channel estimation for a channel (h) between the base station 105-c and the first UE 115-f, and a channel (g) between the first UE 115-f and the reconfigurable surface 205-c, as described in FIG. 3.

In some aspects, the second reflection matrix configuration which is configured at 440 may be represented by a vector $r_2$, where $r_2$ includes a quantity of terms representing precoders or reflective coefficients for the reflective surface elements of the reconfigurable surface 205-c. In this example, the base station 105-c may configure the reflective coefficients of $r_2$ (e.g., reflective coefficients of the second reflection matrix configuration) based on the first estimate of the extended channel $\hat{J}_1$ determined based on the first feedback messages at 430. In other words, the base station 105-c may configure the second reflection matrix configuration based on the first feedback messages indicating measurements which were performed by the UEs 115 on the first reference signal which was reflected by the reconfigurable surface 205-c using the first reflection matrix configuration. In some aspects, each term within the vector $r_2$ may include a complex number satisfying $|r_i| \leq 1$. Moreover, the vector $r_2$ may be used to generate a diagonal matrix $R_2$, in which the diagonal elements of $R_2$ include the terms $r_i$ of the vector $r_2$ (e.g., $R_2 = \text{diag}(r_2)$).

In some aspects, the base station 105-c may select/configure the phases of the terms $r_i$ of the vector $r_2$ in such a manner as to increase (e.g., maximize) a reception power of signals received at the UEs 115. In particular, the base station 105-c may select/configure the second reflection matrix configuration in order to increase a reception power of signals which are transmitted by the base station 105-*c* and reflected by the reconfigurable surface 205-*c*. As such, the base station 105-*c* may configure the reconfigurable surface 205-*c* to increase an efficiency at which the reconfigurable surface 205-*c* reflects downlink transmissions from the base station 105-*c* (e.g., increase beamforming gain) relative to the first reflection matrix configuration.

At 440, the base station 105-*c* may transmit an indication of the second reflection matrix configuration (e.g., $r_2$, $R_2$) to the first UE 115-*f*, the second UE 115-*g*, or both. The base station 105-*a* may transmit the indication of the second reflection matrix configuration to the UEs 115 directly, via the reconfigurable surface 205-*c*, or both. Moreover, the base station 105-*c* may transmit the indication of the second reflection matrix configuration based on transmitting the control message at 405, transmitting the first reference signal at 420, receiving the first feedback message(s) at 430, configuring the reconfigurable surface 205-*c* with the second reflection matrix configuration at 435, or any combination thereof. The indication of the second reflection matrix configuration may be transmitted via an RRC message, a DCI message, a MAC-CE message, or any combination thereof.

At 445, the base station 105-*c* may transmit a second reference signal to the first UE 115-*f*, the second UE 115-*g*, or both, via the reconfigurable surface 205-*c*. The second reference signal may be transmitted within a second transmission occasion of the configuration procedure for configuring the reconfigurable surface for downlink transmissions. In some aspects, the second reference signal may be reflected by the reconfigurable surface 205-*c* using the second reflection matrix configuration. In this regard, the second reference signal may be associated with (e.g., reflected by) the second reflection matrix configuration used by the reconfigurable surface 205-*c* to reflect downlink signals.

The UEs 115 may be configured to receive the second reference signal(s) at 445 based on receiving the control message at 405, receiving the indication of the second reflection matrix configuration at 440, or both. For example, the first UE 115-*f* may receive the second reference signal within a second transmission occasion of a set of transmission occasions associated with the configuration procedure which was indicated in the control message received at 405.

In some aspects, the second reference signal transmitted by the base station 105-*c* may include a CSI-RS. In some cases, the base station 105-*c* may transmit the second reference signal with a same or different spatial filtering metric relative to the first reference signal. For example, in some cases, the base station 105-*c* may transmit the first reference signal at 420 and the second reference signal at 445 with the same spatial filtering metric. For instance, the first reference signal and the second reference signal may be transmitted with a first spatial filtering metric which is different from a second spatial filtering metric which is used to transmit reference signals which are not reflected using the reconfigurable surface 205-*c*. In other cases, the base station 105-*c* may transmit the first reference signal and the second reference signal with different spatial filtering metrics.

Additionally, as noted previously herein, the second reference signal transmitted and reflected by the reconfigurable surface 205-*c* at 445 may include a different format of reference signal as compared to reference signals which are not reflected by the reconfigurable surface 205-*c*. For example, the second reference signal transmitted and reflected by the reconfigurable surface 205-*c* at 445 may be less complex (e.g., simpler) and may include less information as compared to reference signals which are transmitted directly from the base station 105-*c* to the UEs 115 (e.g., transmitted without reflection from the reconfigurable surface 205-*c*).

At 450, the first UE 115-*f*, the second UE 115-*g*, or both, may perform measurements on the second reference signal received from the base station 105-*c*. The measurements performed on the first reference signal may include any measurements known in the art including, but not limited to, RSSI measurements, RSRP measurements, RSRQ measurements, SNR measurements, SINR measurements, or any combination thereof.

In some aspects, the UEs 115 may perform the measurements on the second reference signal in order to perform channel estimation and to determine an efficiency or effectiveness of the second reflection matrix configuration used by the reconfigurable surface 205-*c*. In other words, the UEs 115 may perform the measurements and perform the channel estimation at 450 in order to determine whether the reconfigurable surface 205-*c* may be configured with a different reflection matrix configuration which will result in improved beamforming gain relative to the second reflection matrix configuration.

In some cases, due to the fact that the first reflection matrix configuration may have been selected without knowledge of the channel and the second reflection matrix configuration was specifically configured with reflective coefficients at the reconfigurable surface 205-*c*, the receive power at the UEs 115 may be higher for the second reference signal as compared to the first reference signal. In some cases, the increased reception power of the second reference signal (e.g., improved beamforming gain at the reconfigurable surface 205-*c*) may enable the UEs 115 (and subsequently the base station 105-*c*) to perform more accurate channel estimation.

At 455, the first UE 115-*f*, the second UE 115-*g*, or both, may transmit a second feedback message to the base station 105-*c*. The UEs 115 may transmit the second feedback message(s) at 455 based on receiving the control message at 405, receiving the indication of the second reflection matrix configuration at 440, receiving the second reference signal at 445 performing the measurements at 450, or any combination thereof. For example, the first UE 115-*f* may transmit a second feedback message at 455 within a set of resources allocated for feedback messages which was indicated in the control message received at 405.

In some aspects, the second feedback message may indicate one or more parameters or characteristics associated with the second reference signal (e.g., second CSI-RS). In some cases, the second feedback message may include an indication of the measurements which were performed on the second reference signals at 450. For example, the second feedback message transmitted by the first UE 115-*f* may include a CSI report which includes measurements performed by the first UE 115-*f* at 450.

In some aspects, the first UE 115-*f*, the second UE 115-*b*, or both, may transmit the second feedback message at 455 with a second transmission power metric. In particular, the UEs 115 may transmit the second feedback messages at 455 with a second transmission power metric which is less than the first transmission power metric with which first feedback message was transmitted at 430. The improved beamforming gain at the reconfigurable surface 205-*c* which is achieved via the second reflection matrix configuration may enable the UEs 115 to reduce a transmission power of the second feedback message without significantly decreasing a reception power at the base station 105-c. In this regard, the first UE 115-b may be configured to reduce a transmission power metric for each sequential feedback message that is transmitted during the configuration procedure due to the improved beamforming gain at the reconfigurable surface 205-c. In some cases, the transmission power metrics may be configured (e.g., pre-configured) at the UEs 115, signaled to the UEs 115 via the control message at 405, or both.

At 460, the base station 105-c may configure the reconfigurable surface 205-c with a third reflection matrix configuration (e.g., third precoder configuration). In some aspects, the base station 105-c may configure the reconfigurable surface 205-c with the third reflection matrix configuration by transmitting wireline and/or wireless signals to the reconfigurable surface 205-c. The third reflection matrix configuration may be included within the set of reflection matrix configurations (e.g., codebook of reflection matrix configurations) associated with the reconfigurable surface 205-c. In some cases, the base station 105-c may configure the reconfigurable surface 205-c with the third reflection matrix configuration based on transmitting the control message at 405, configuring the reconfigurable surface 205-c with the first and/or second reflection matrix configurations, receiving the second feedback message(s) at 455, or any combination thereof.

The base station 105-c may be configured to perform channel estimation based on the second feedback message(s) received from the UEs 115 at 455. In particular, the base station 105-c may be configured to channel estimation for a channel (h) between the base station 105-c and the first UE 115-f, and a channel (g) between the first UE 115-f and the reconfigurable surface 205-c, as described in FIG. 3.

In some aspects, the third reflection matrix configuration may be represented by a vector $r_3$, where $r_3$ includes a quantity of terms representing precoders or reflective coefficients for the reflective surface elements of the reconfigurable surface 205-c. In this example, the base station 105-c may configure the reflective coefficients of $r_3$ (e.g., reflective coefficients of the third reflection matrix configuration) based on the second estimate of the extended channel $\hat{f}_2$ determined based on the second feedback messages received at 455. In other words, the base station 105-c may configure the third reflection matrix configuration based on the measurements that the UEs 115 performed on the second reference signals which was reflected by the reconfigurable surface 205-c using the second reflection matrix configuration. In some aspects, each term within the vector $r_3$ may include a complex number satisfying $|r_i| \leq 1$. Moreover, the vector $r_3$ may be used to generate a diagonal matrix $R_3$, in which the diagonal elements of $R_3$ include the terms $r_i$ of the vector $r_3$ (e.g., $R_3 = \text{diag}(r_3)$).

In some aspects, the base station 105-c may select/configure the reflective coefficients of the vector $r_3$ in such a manner as to increase (e.g., maximize) a reception power of downlink signals received by the UEs 115. In particular, the base station 105-c may select/configure the third reflection matrix configuration in order to increase a reception power of downlink signals which are transmitted by the base station 105-b and reflected by the reconfigurable surface 205-c. For example, in some cases, $R_3$ may be determined according to $R_3 = R' + R_2$, where $R'$ is a diagonal matrix. In this example, $R'$ may be selected such that $\|H^* R_3^* g\| = \|H^* R'^* R_2^* g\| = \|H^* R_2^* G^* r'\| \approx \|\hat{J}_2 r'\|$ is increased, or maximized.

As such, the base station 105-c may be configured to adjust the reflective coefficients of the vector $r_2$ associated with the second reflection matrix configuration by the vector $r'$ in order to obtain the fine-tuned reflective coefficients for the vector $r_3$ associated with the third reflection matrix configuration. In this regard, the base station 105-c may be configured to use the channel estimate $J_2$ obtained using the second reflection matrix configuration in order to fine-tune the vector $r_3$ associated with the third reflection matrix configuration. Moreover, due to the fact that the channel estimate $J_2$ obtained using the second reflection matrix configuration is improved relative to the channel estimate J obtained using the first reflection matrix configuration, the third reflection matrix configuration (e.g., vector $r_3$) may result in in improved beamforming gain (e.g., improved co-phasing gain) as compared to the second reflection matrix configuration (e.g., vector $r_2$) and/or the first reflection matrix configuration (e.g., vector $r_1$).

At 465, the base station 105-c may transmit an indication of the third reflection matrix configuration (e.g., $r_3$, $R_3$) to the first UE 115-f, the second UE 115-g, or both. The base station 105-a may transmit the indication of the third reflection matrix configuration to the UEs 115 directly, via the reconfigurable surface 205-c, or both. Moreover, the base station 105-c may transmit the indication of the third reflection matrix configuration based on transmitting the control message at 405, transmitting the second reference signal(s) at 450, receiving the second feedback message(s) at 455, configuring the reconfigurable surface 205-c with the third reflection matrix configuration at 460, or any combination thereof. The indication of the third reflection matrix configuration may be transmitted via an RRC message, a DCI message, a MAC-CE message, or any combination thereof.

At 470, the first UE 115-f, the second UE 115-g, or both, may communicate with the base station 105-c. In particular, the UEs 115 may communicate with the base station 105-c using the third reflection matrix configuration. In this regard, the UEs 115 may communicate with the base station 105-c at 470 based on receiving the control message at 405, receiving the reference signal(s) at 420 and/or 445, transmitting the feedback messages at 430 and/or 455, receiving the indication of the third reflection matrix configuration at 465, or any combination thereof. For example, upon receiving the indication of the third reflection matrix configuration, the first UE 115-f may receive a downlink transmission (e.g., physical downlink control channel (PDCCH) transmission, physical downlink shared channel (PDSCH) transmission, reference signal) from the base station 105-c, where the downlink transmission is reflected by the reconfigurable surface 205-c using the third reflection matrix configuration.

Techniques described herein may support signaling which enables for improved reflection matrix configuration selection for reconfigurable surfaces from a codebook of reflection matrix configurations. By enabling for improved reflection matrix configuration selection, techniques described herein may increase throughput within the wireless communications system and provide for improved beamforming gain. Additionally, the techniques described herein may enable the base station 105-c to circumvent obstructions which would otherwise interrupt wireless communications, thereby increasing a quantity of UEs 115 which may be communicatively coupled to the network. Furthermore, by improving reflection matrix configuration selection of passive reconfigurable surfaces (e.g., RISs), techniques described herein may reduce a power consumption which is associated with active reconfigurable surfaces (e.g., AAUs), thereby improving the overall power efficiency of the wireless communications system.

Figure 5:
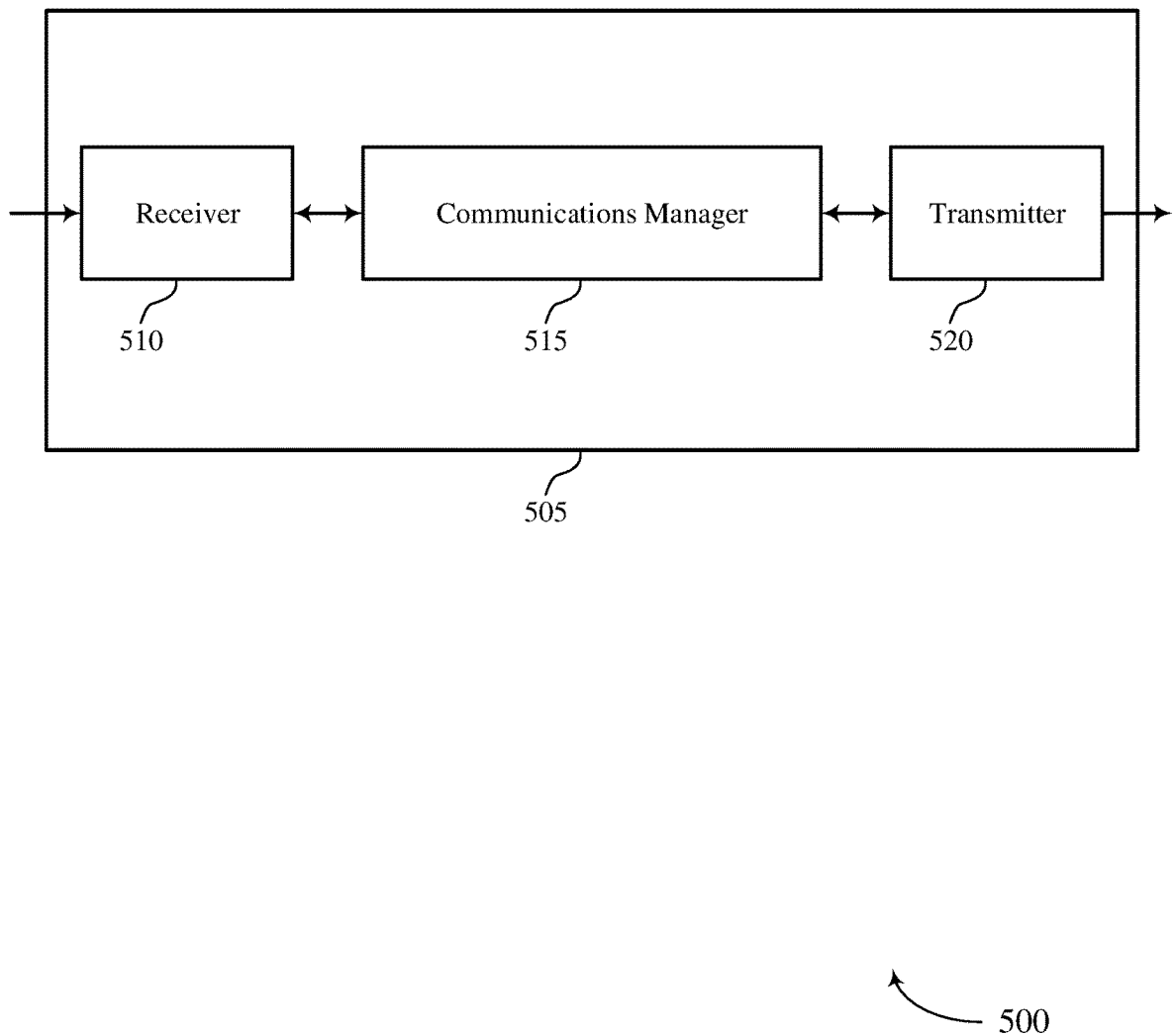
FIGS. 5 and 6 show block diagrams of devices that support techniques for successive tuning using a reconfigurable surface in accordance with aspects of the present disclosure.

FIG. 5 shows a block diagram 500 of a device 505 that supports techniques for successive tuning using a reconfigurable surface in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for successive tuning using a reconfigurable surface, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit, to a base station via a reconfigurable surface at a first transmission occasion, a first reference signal associated with a first reflection matrix configuration used by the reconfigurable surface to reflect signals, transmit, to the base station via the reconfigurable surface at a second transmission occasion, a second reference signal associated with a second reflection matrix configuration used by the reconfigurable surface to reflect signals, the second reflection matrix configuration different from the first reflection matrix configuration, and communicate with the base station via the reconfigurable surface based on transmitting the first reference signal, the second reference signal, or both. The communications manager 515 may also receive, from a base station via a reconfigurable surface at a first transmission occasion, a first reference signal reflected by the reconfigurable surface using a first reflection matrix configuration, receive, from the base station via the reconfigurable surface at a second transmission occasion, a second reference signal reflected by the reconfigurable surface using a second reflection matrix configuration, transmit, to the base station based on receiving the first reference signal, a first feedback message indicating a first set of parameters associated with the first reference signal received at the UE, transmit, to the base station based on receiving the second reference signal, a second feedback message indicating a second set of parameters associated with the second reference signal received at the UE, and communicate with the base station via the reconfigurable surface based on transmitting the second feedback message. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
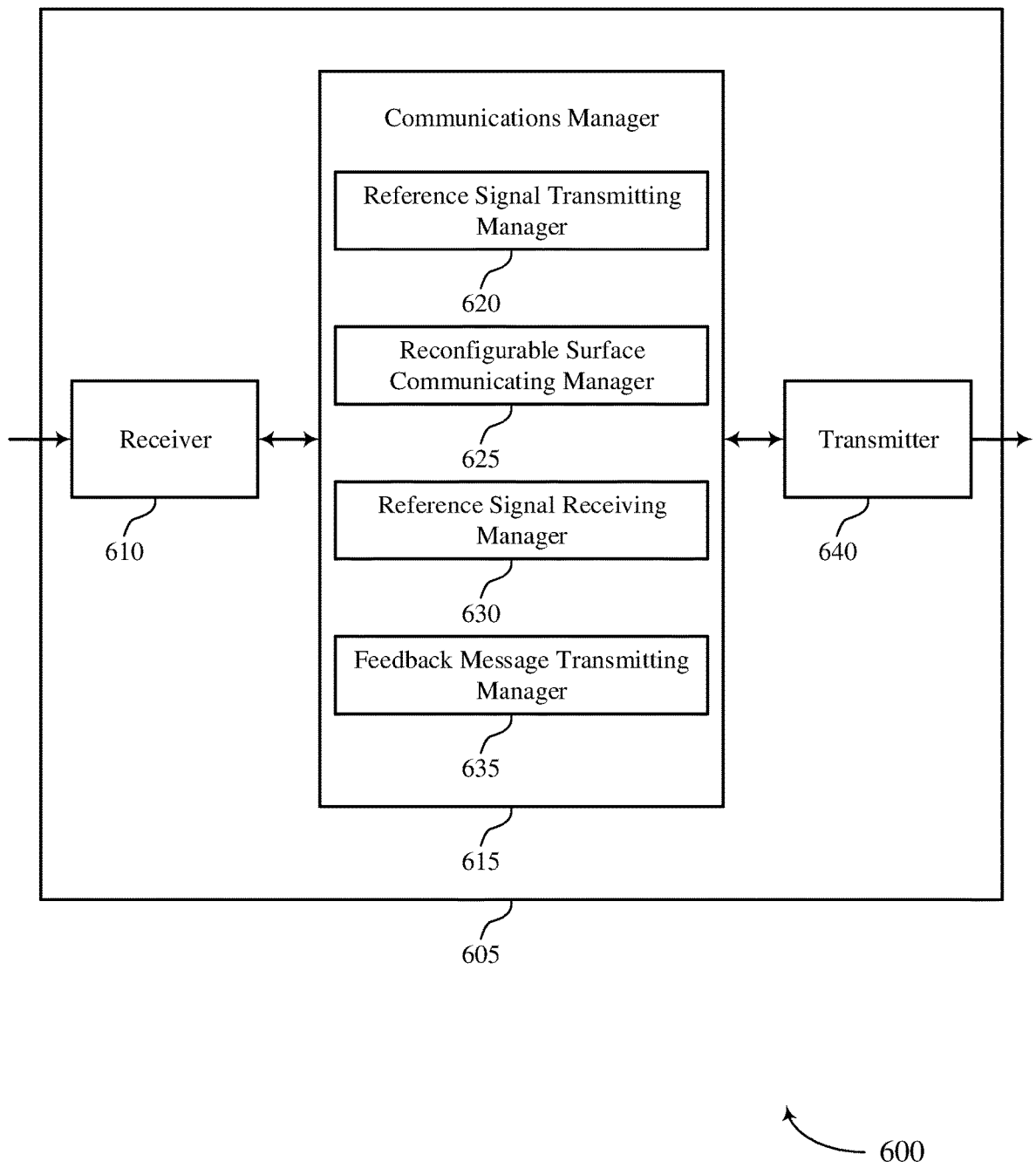

FIG. 6 shows a block diagram 600 of a device 605 that supports techniques for successive tuning using a reconfigurable surface in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to techniques for successive tuning using a reconfigurable surface, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a reference signal transmitting manager 620, a reconfigurable surface communicating manager 625, a reference signal receiving manager 630, and a feedback message transmitting manager 635. The communications manager 615 may be an example of aspects of the communications manager 810 described herein.

The reference signal transmitting manager 620 may transmit, to a base station via a reconfigurable surface at a first transmission occasion, a first reference signal associated with a first reflection matrix configuration used by the reconfigurable surface to reflect signals and transmit, to the base station via the reconfigurable surface at a second transmission occasion, a second reference signal associated with a second reflection matrix configuration used by the reconfigurable surface to reflect signals, the second reflection matrix configuration different from the first reflection matrix configuration.

The reconfigurable surface communicating manager 625 may communicate with the base station via the reconfigurable surface based on transmitting the first reference signal, the second reference signal, or both.

The reference signal receiving manager 630 may receive, from a base station via a reconfigurable surface at a first transmission occasion, a first reference signal reflected by the reconfigurable surface using a first reflection matrix configuration and receive, from the base station via the reconfigurable surface at a second transmission occasion, a second reference signal reflected by the reconfigurable surface using a second reflection matrix configuration.

The feedback message transmitting manager 635 may transmit, to the base station based on receiving the first reference signal, a first feedback message indicating a first set of parameters associated with the first reference signal received at the UE and transmit, to the base station based on receiving the second reference signal, a second feedback message indicating a second set of parameters associated with the second reference signal received at the UE.

The reconfigurable surface communicating manager 625 may communicate with the base station via the reconfigurable surface based on transmitting the second feedback message.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
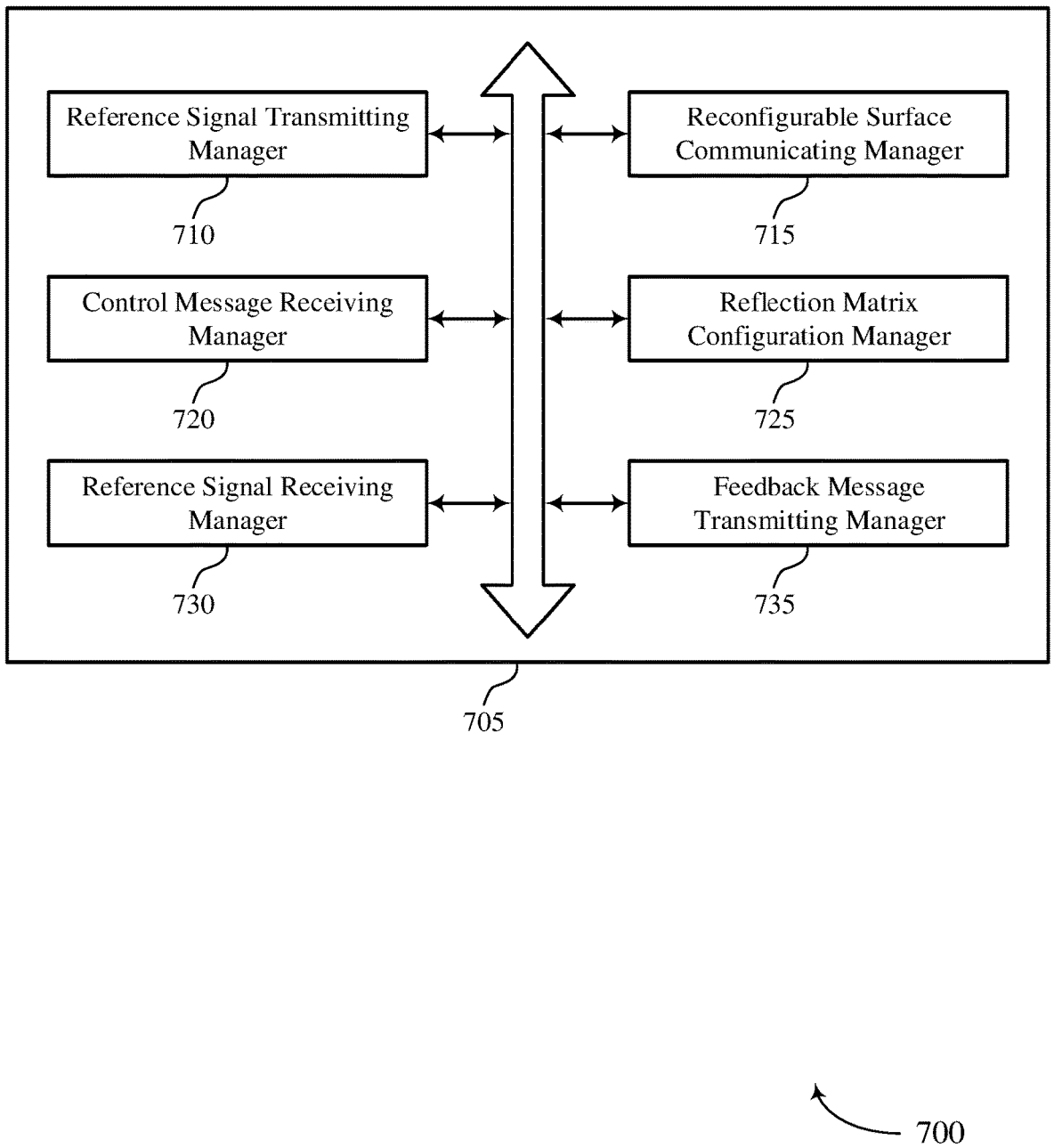
FIG. 7 shows a block diagram of a communications manager that supports techniques for successive tuning using a reconfigurable surface in accordance with aspects of the present disclosure.

FIG. 7 shows a block diagram 700 of a communications manager 705 that supports techniques for successive tuning using a reconfigurable surface in accordance with aspects of the present disclosure. The communications manager 705 may be an example of aspects of a communications manager 515, a communications manager 615, or a communications manager 810 described herein. The communications manager 705 may include a reference signal transmitting manager 710, a reconfigurable surface communicating manager 715, a control message receiving manager 720, a reflection matrix configuration manager 725, a reference signal receiving manager 730, and a feedback message transmitting manager 735. Each of these modules may communicate, directly or indirectly, with one another (e.g., via one or more buses).

The reference signal transmitting manager 710 may transmit, to a base station via a reconfigurable surface at a first transmission occasion, a first reference signal associated with a first reflection matrix configuration used by the reconfigurable surface to reflect signals.

In some examples, the reference signal transmitting manager 710 may transmit, to the base station via the reconfigurable surface at a second transmission occasion, a second reference signal associated with a second reflection matrix configuration used by the reconfigurable surface to reflect signals, the second reflection matrix configuration different from the first reflection matrix configuration.

In some cases, the first reference signal is transmitted to the base station via the reconfigurable surface with a first transmission power metric, and where the second reference signal is transmitted to the base station via the reconfigurable surface with a second transmission power metric which is less than the first transmission power metric.

In some cases, the first reference signal, the second reference signal, or both, includes a first format which is different than a second format associated with a third reference signal transmitted by the UE to the base station without reflection by the reconfigurable surface. In some cases, the first reference signal, the second reference signal, or both, are transmitted by the UE with a first spatial filtering metric, and where the third reference signal is transmitted by the UE with a second spatial filtering metric different from the first spatial filtering metric. In some cases, the first reference signal, the second reference signal, or both, includes a sounding reference signal.

The reconfigurable surface communicating manager 715 may communicate with the base station via the reconfigurable surface based on transmitting the first reference signal, the second reference signal, or both. In some examples, the reconfigurable surface communicating manager 715 may communicate with the base station via the reconfigurable surface based on transmitting the second feedback message.

In some examples, the reconfigurable surface communicating manager 715 may transmit, to the base station via the reconfigurable surface, an uplink transmission reflected by the reconfigurable surface using a third reflection matrix configuration different from the first reflection matrix configuration and the second reflection matrix configuration. In some examples, the reconfigurable surface communicating manager 715 may receive, from the base station via the reconfigurable surface, a downlink transmission reflected by the reconfigurable surface using a third reflection matrix configuration different from the first reflection matrix configuration and the second reflection matrix configuration.

The reference signal receiving manager 730 may receive, from a base station via a reconfigurable surface at a first transmission occasion, a first reference signal reflected by the reconfigurable surface using a first reflection matrix configuration. In some examples, the reference signal receiving manager 730 may receive, from the base station via the reconfigurable surface at a second transmission occasion, a second reference signal reflected by the reconfigurable surface using a second reflection matrix configuration.

In some cases, the first reference signal, the second reference signal, or both, includes a first format which is different than a second format associated with a third reference signal transmitted by the base station to the UE without reflection by the reconfigurable surface. In some cases, the first reference signal, the second reference signal, or both, includes a channel state information reference signal.

The feedback message transmitting manager 735 may transmit, to the base station based on receiving the first reference signal, a first feedback message indicating a first set of parameters associated with the first reference signal received at the UE. In some examples, the feedback message transmitting manager 735 may transmit, to the base station based on receiving the second reference signal, a second feedback message indicating a second set of parameters associated with the second reference signal received at the UE. In some cases, the first feedback message is transmitted to the base station via the reconfigurable surface with a first transmission power metric, and where the second feedback message is transmitted to the base station via the reconfigurable surface with a second transmission power metric which is less than the first transmission power metric.

The control message receiving manager 720 may receive, from the base station, a control message including a set of resources associated with a configuration procedure for configuring the reconfigurable surface, where transmitting the first reference signal at the first transmission occasion, transmitting the second reference signal at the second transmission occasion, or both, is based on receiving the control message. In some examples, the control message receiving manager 720 may receive, from the base station, a control message indicating one or more transmission power metrics associated with transmission of reference signals during a configuration procedure for configuring the reconfigurable surface, where transmitting the first reference signal with the first transmission power metric, transmitting the second reference signal with the second transmission power metric, or both, is based is based on receiving the control message.

In some examples, the control message receiving manager 720 may receive, from the base station, a control message indicating a position of the reconfigurable surface, an orientation of the reconfigurable surface, or both, where transmitting the first reference signal, transmitting the second reference signal, or both, is based on receiving the control message. In some examples, the control message receiving manager 720 may receive, from the base station, a control message including a set of resources associated with a configuration procedure for configuring the reconfigurable surface, where receiving the first reference signal at the first transmission occasion, receiving the second reference signal at the second transmission occasion, or both, is based on receiving the control message.

In some examples, the control message receiving manager 720 may receive, from the base station, a control message indicating one or more transmission power metrics associated with transmission of feedback messages during a configuration procedure for configuring the reconfigurable surface, where transmitting the first feedback message with the first transmission power metric, transmitting the second feedback message with the second transmission power metric, or both, is based is based on receiving the control message. In some examples, the control message receiving manager 720 may receive, from the base station, a control message indicating a position of the reconfigurable surface, an orientation of the reconfigurable surface, or both, where receiving the first reference signal, receiving the second reference signal, or both, is based on receiving the control message.

The reflection matrix configuration manager 725 may receive, from the base station via the reconfigurable surface based on transmitting the second reference signal, an indication of a third reflection matrix configuration different from the first reflection matrix configuration and the second reflection matrix configuration, where communicating with the base station via the reconfigurable surface is based on receiving the indication of the third reflection matrix configuration. In some examples, the reflection matrix configuration manager 725 may receive, from the base station via the reconfigurable surface based on transmitting the second feedback message, an indication of a third reflection matrix configuration different from the first reflection matrix configuration and the second reflection matrix configuration, where communicating with the base station via the reconfigurable surface is based on receiving the indication of the third reflection matrix configuration.

In some cases, the reconfigurable surface includes a set of reflective surface elements, and where each of the first reflection matrix configuration and the second reflection matrix configuration includes a set of precoders associated with the set of reflective surface elements. In some cases, the reconfigurable surface is configured to modify an angle of reflection of signals incident on the reconfigurable surface based on the set of precoders associated with the set of reflective surface elements. In some cases, the reconfigurable surface is configured to modify an angle of reflection of signals incident on the reconfigurable surface by modifying a reflection matrix configuration of a set of reflection matrix configurations, transitioning from the first reflection matrix configuration to the second reflection matrix configuration, or both. In some cases, the reconfigurable surface includes a set of reflective surface elements, and where each of the first reflection matrix configuration and the second reflection matrix configuration includes a set of precoders associated with the set of reflective surface elements.

Figure 8:
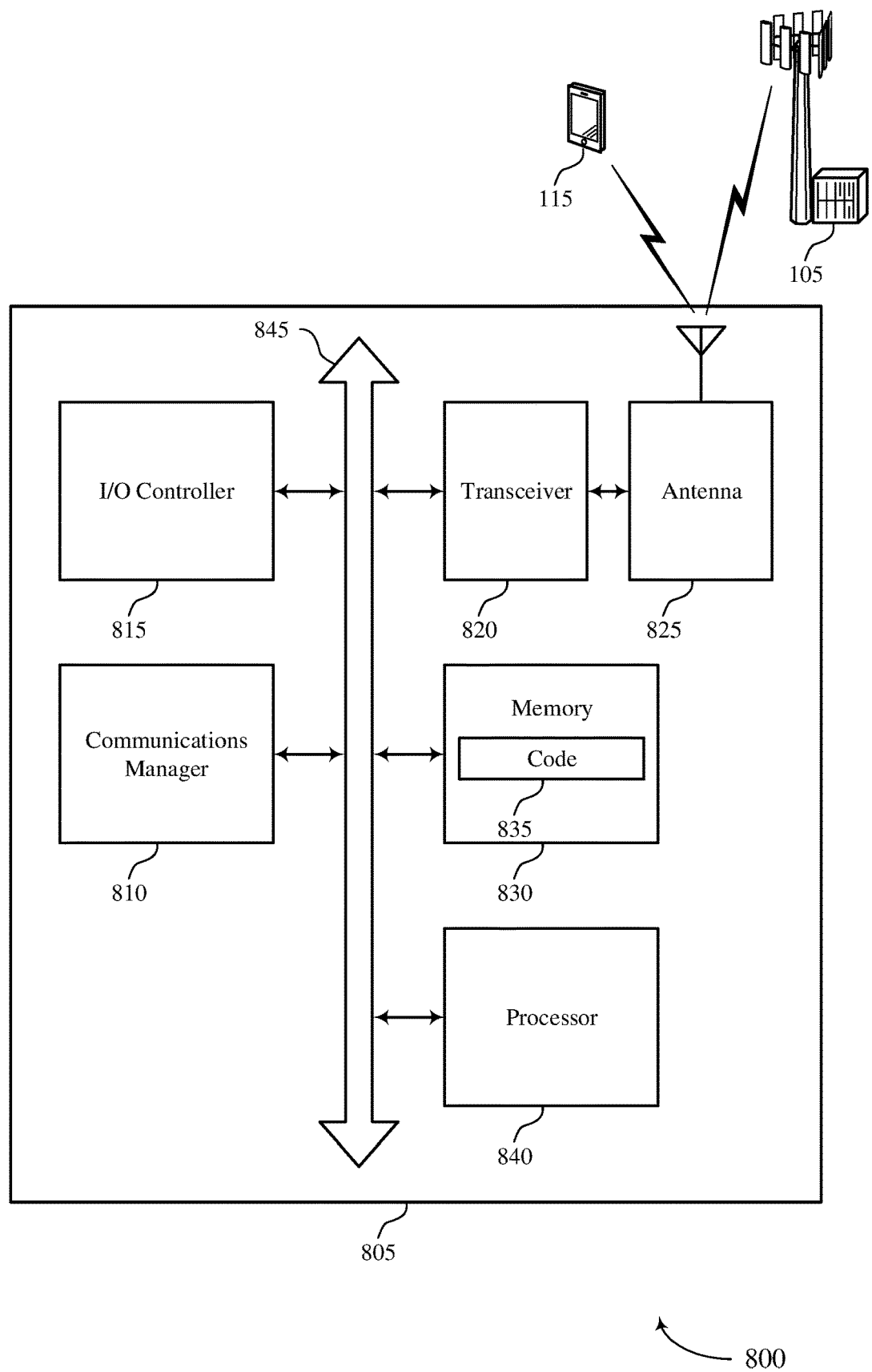
FIG. 8 shows a diagram of a system including a device that supports techniques for successive tuning using a reconfigurable surface in accordance with aspects of the present disclosure.

FIG. 8 shows a diagram of a system 800 including a device 805 that supports techniques for successive tuning using a reconfigurable surface in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit, to a base station via a reconfigurable surface at a first transmission occasion, a first reference signal associated with a first reflection matrix configuration used by the reconfigurable surface to reflect signals, transmit, to the base station via the reconfigurable surface at a second transmission occasion, a second reference signal associated with a second reflection matrix configuration used by the reconfigurable surface to reflect signals, the second reflection matrix configuration different from the first reflection matrix configuration, and communicate with the base station via the reconfigurable surface based on transmitting the first reference signal, the second reference signal, or both. The communications manager 810 may also receive, from a base station via a reconfigurable surface at a first transmission occasion, a first reference signal reflected by the reconfigurable surface using a first reflection matrix configuration, receive, from the base station via the reconfigurable surface at a second transmission occasion, a second reference signal reflected by the reconfigurable surface using a second reflection matrix configuration, transmit, to the base station based on receiving the first reference signal, a first feedback message indicating a first set of parameters associated with the first reference signal received at the UE, transmit, to the base station based on receiving the second reference signal, a second feedback message indicating a second set of parameters associated with the second reference signal received at the UE, and communicate with the base station via the reconfigurable surface based on transmitting the second feedback message.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for successive tuning using a reconfigurable surface).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
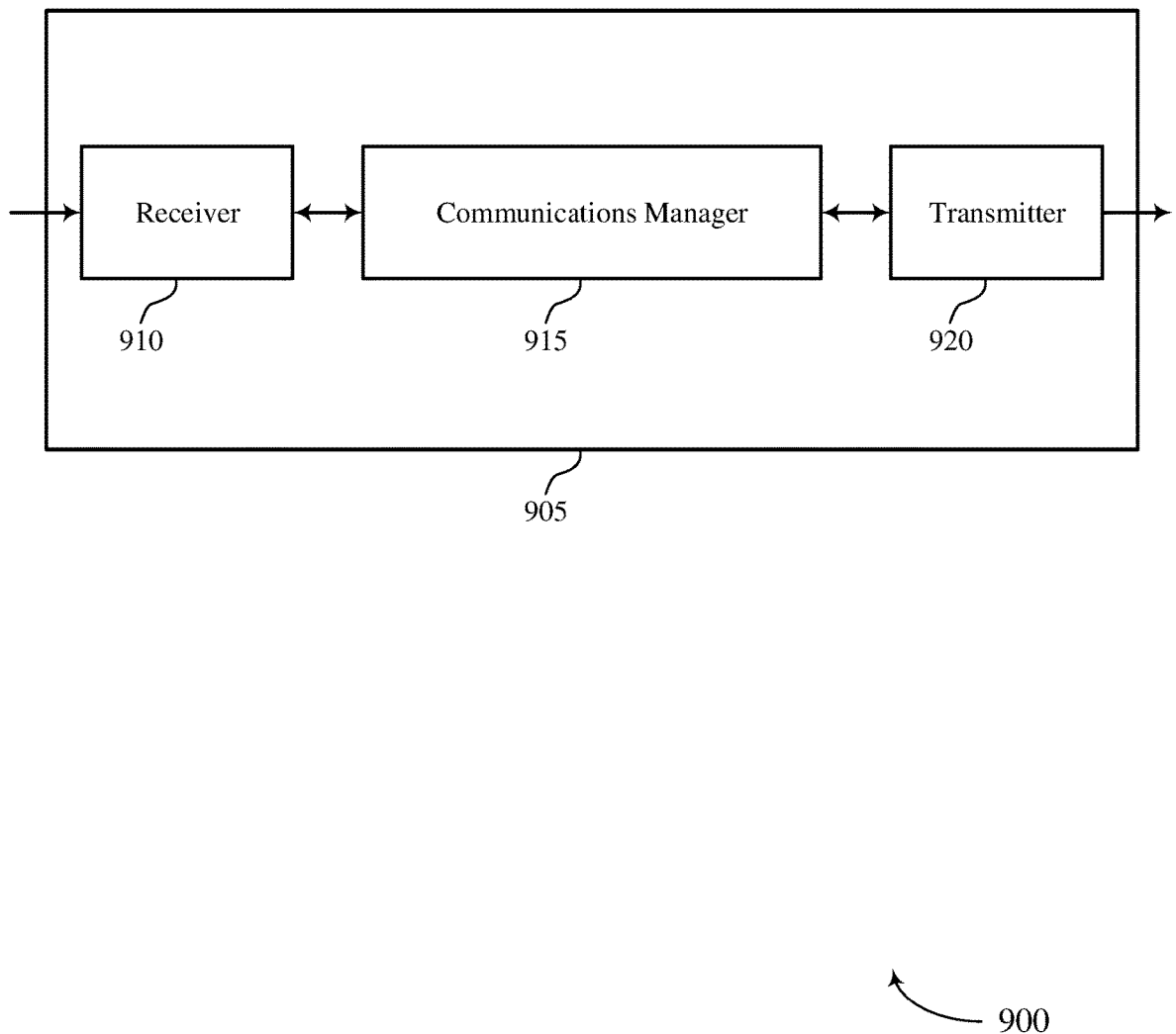
FIGS. 9 and 10 show block diagrams of devices that support techniques for successive tuning using a reconfigurable surface in accordance with aspects of the present disclosure.

FIG. 9 shows a block diagram 900 of a device 905 that supports techniques for successive tuning using a reconfigurable surface in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to techniques for successive tuning using a reconfigurable surface, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a UE via a reconfigurable surface at a first transmission occasion, a first reference signal reflected by the reconfigurable surface using a first reflection matrix configuration, receive, from the UE via the reconfigurable surface at a second transmission occasion, a second reference signal reflected by the reconfigurable surface using the second reflection matrix configuration, configure the reconfigurable surface with a second reflection matrix configuration based on receiving the first reference signal, configure the reconfigurable surface with a third reflection matrix configuration based on receiving the second reference signal, and communicate with the UE via the reconfigurable surface based on the third reflection matrix configuration. The communications manager 915 may also transmit, to a UE via a reconfigurable surface at a first transmission occasion, a first reference signal reflected by the reconfigurable surface using a first reflection matrix configuration, transmit, to the UE via the reconfigurable surface at a second transmission occasion, a second reference signal reflected by the reconfigurable surface using a second reflection matrix configuration, receive, from the UE based on transmitting the first reference signal, a first feedback message indicating a first set of parameters associated with the first reference signal received at the UE, receive, from the UE based on transmitting the second reference signal, a second feedback message indicating a second set of parameters associated with the second reference signal received at the UE, and communicate with the UE via the reconfigurable surface based on receiving the second feedback message. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
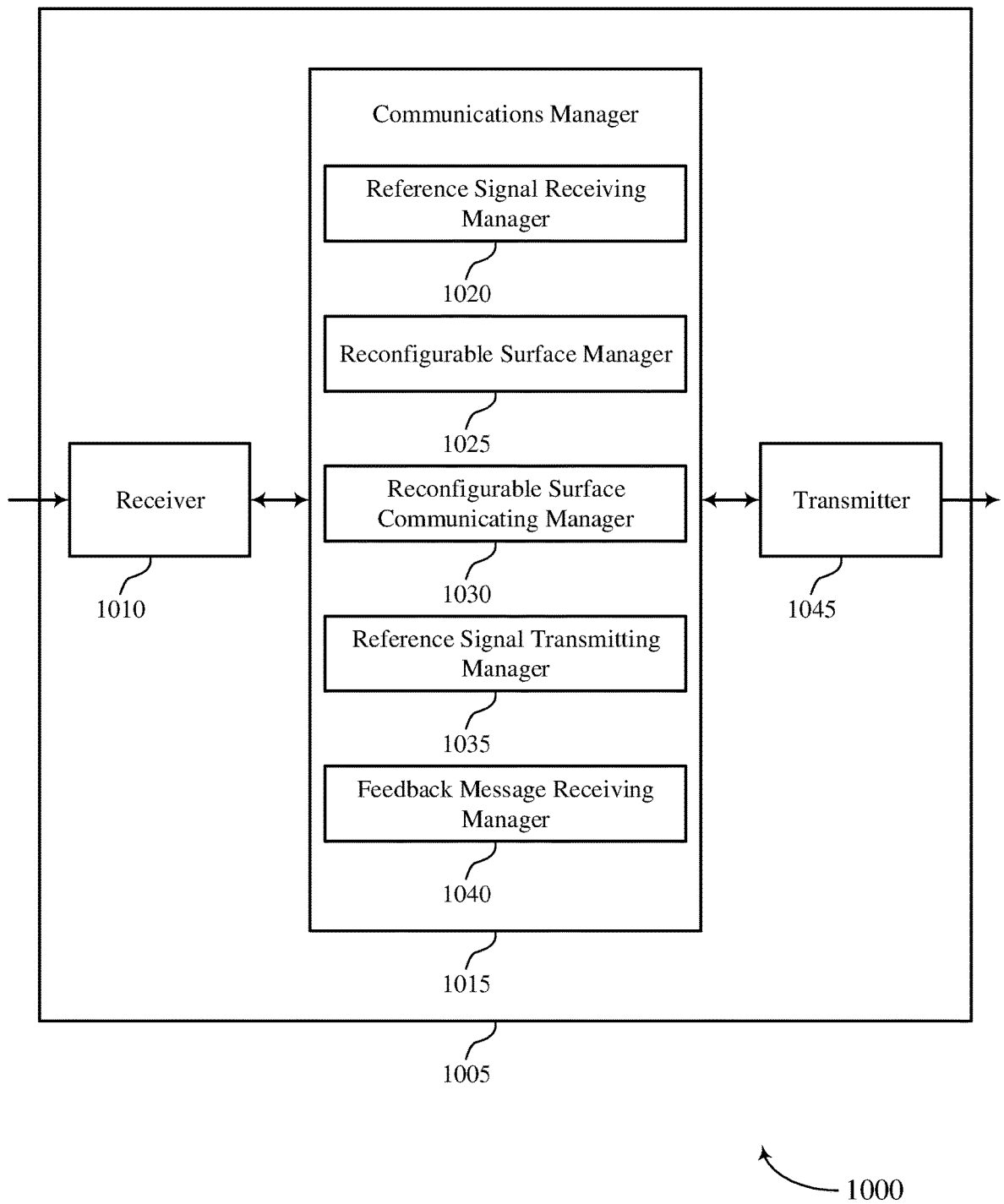

FIG. 10 shows a block diagram 1000 of a device 1005 that supports techniques for successive tuning using a reconfigurable surface in accordance with aspects of the present disclosure. The device 1005 may be an example of aspects of a device 905, or a base station 105 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for successive tuning using a reconfigurable surface, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a reference signal receiving manager 1020, a reconfigurable surface manager 1025, a reconfigurable surface communicating manager 1030, a reference signal transmitting manager 1035, and a feedback message receiving manager 1040. The communications manager 1015 may be an example of aspects of the communications manager 1210 described herein.

The reference signal receiving manager 1020 may receive, from a UE via a reconfigurable surface at a first transmission occasion, a first reference signal reflected by the reconfigurable surface using a first reflection matrix configuration and receive, from the UE via the reconfigurable surface at a second transmission occasion, a second reference signal reflected by the reconfigurable surface using the second reflection matrix configuration.

The reconfigurable surface manager 1025 may configure the reconfigurable surface with a second reflection matrix configuration based on receiving the first reference signal and configure the reconfigurable surface with a third reflection matrix configuration based on receiving the second reference signal.

The reconfigurable surface communicating manager 1030 may communicate with the UE via the reconfigurable surface based on the third reflection matrix configuration.

The reference signal transmitting manager 1035 may transmit, to a UE via a reconfigurable surface at a first transmission occasion, a first reference signal reflected by the reconfigurable surface using a first reflection matrix configuration and transmit, to the UE via the reconfigurable surface at a second transmission occasion, a second reference signal reflected by the reconfigurable surface using a second reflection matrix configuration.

The feedback message receiving manager 1040 may receive, from the UE based on transmitting the first reference signal, a first feedback message indicating a first set of parameters associated with the first reference signal received at the UE and receive, from the UE based on transmitting the second reference signal, a second feedback message indicating a second set of parameters associated with the second reference signal received at the UE.

The reconfigurable surface communicating manager 1030 may communicate with the UE via the reconfigurable surface based on receiving the second feedback message.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
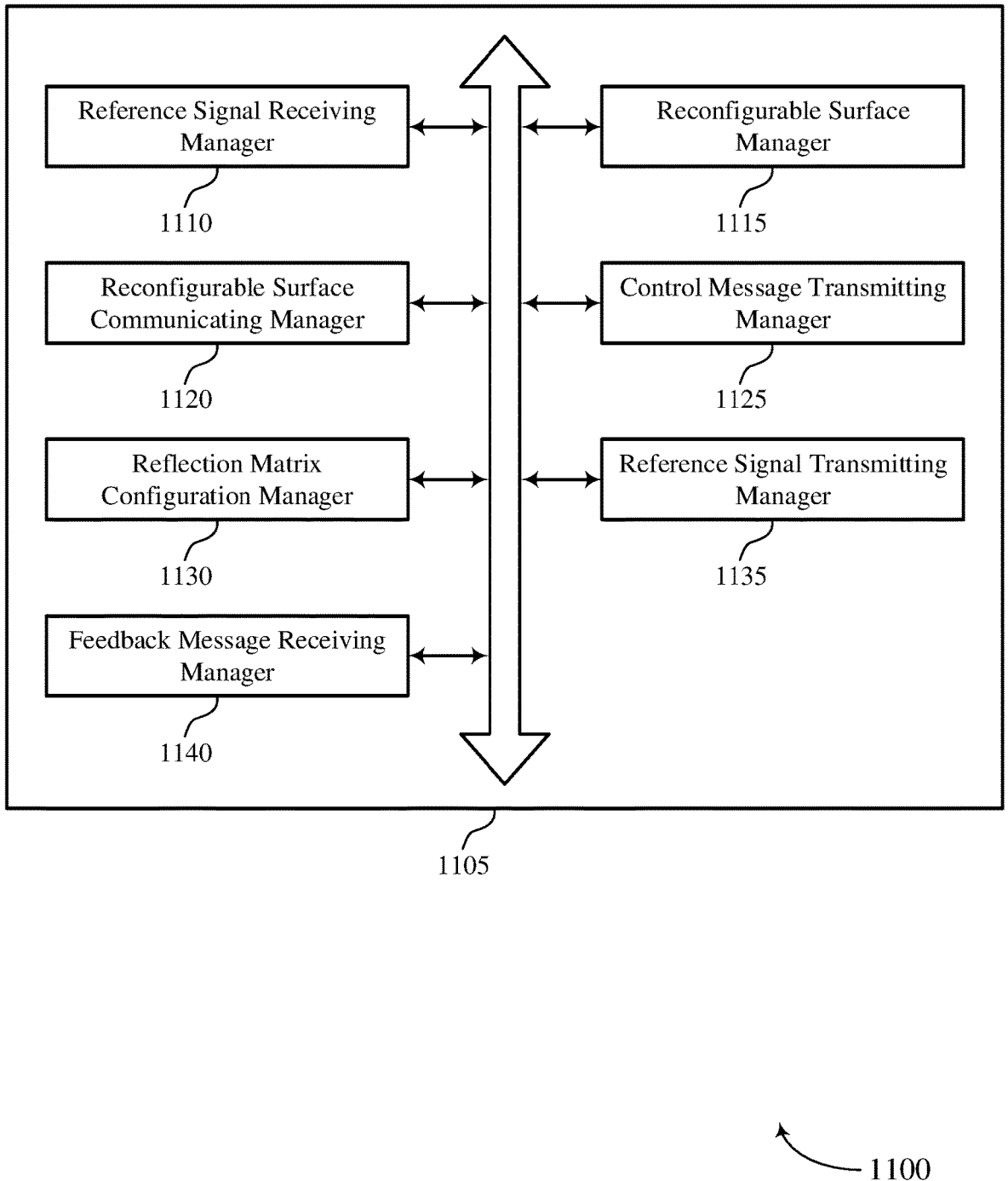
FIG. 11 shows a block diagram of a communications manager that supports techniques for successive tuning using a reconfigurable surface in accordance with aspects of the present disclosure.

FIG. 11 shows a block diagram 1100 of a communications manager 1105 that supports techniques for successive tuning using a reconfigurable surface in accordance with aspects of the present disclosure. The communications manager 1105 may be an example of aspects of a communications manager 915, a communications manager 1015, or a communications manager 1210 described herein. The communications manager 1105 may include a reference signal receiving manager 1110, a reconfigurable surface manager 1115, a reconfigurable surface communicating manager 1120, a control message transmitting manager 1125, a reflection matrix configuration manager 1130, a reference signal transmitting manager 1135, and a feedback message receiving manager 1140. Each of these modules may communicate, directly or indirectly, with one another (e.g., via one or more buses).

The reference signal receiving manager 1110 may receive, from a UE via a reconfigurable surface at a first transmission occasion, a first reference signal reflected by the reconfigurable surface using a first reflection matrix configuration. In some examples, the reference signal receiving manager 1110 may receive, from the UE via the reconfigurable surface at a second transmission occasion, a second reference signal reflected by the reconfigurable surface using the second reflection matrix configuration.

In some cases, the first reference signal is received from the UE via the reconfigurable surface with a first transmission power metric, and where the second reference signal is received from the UE via the reconfigurable surface with a second transmission power metric which is less than the first transmission power metric. In some cases, the first reference signal, the second reference signal, or both, includes a first format which is different than a second format associated with a third reference signal transmitted by the UE to the base station without reflection by the reconfigurable surface. In some cases, the first reference signal, the second reference signal, or both, includes a sounding reference signal.

The reconfigurable surface manager 1115 may configure the reconfigurable surface with a second reflection matrix configuration based on receiving the first reference signal. In some examples, the reconfigurable surface manager 1115 may configure the reconfigurable surface with a third reflection matrix configuration based on receiving the second reference signal.

The reconfigurable surface communicating manager 1120 may communicate with the UE via the reconfigurable surface based on the third reflection matrix configuration. In some examples, the reconfigurable surface communicating manager 1120 may communicate with the UE via the reconfigurable surface based on receiving the second feedback message. In some examples, the reconfigurable surface communicating manager 1120 may receive, from the UE via the reconfigurable surface, an uplink transmission reflected by the reconfigurable surface using the third reflection matrix configuration different from the first reflection matrix configuration and the second reflection matrix configuration. In some examples, the reconfigurable surface communicating manager 1120 may transmit, to the UE via the reconfigurable surface, a downlink transmission reflected by the reconfigurable surface using a third reflection matrix configuration different from the first reflection matrix configuration and the second reflection matrix configuration.

The reference signal transmitting manager 1135 may transmit, to a UE via a reconfigurable surface at a first transmission occasion, a first reference signal reflected by the reconfigurable surface using a first reflection matrix configuration. In some examples, the reference signal transmitting manager 1135 may transmit, to the UE via the reconfigurable surface at a second transmission occasion, a second reference signal reflected by the reconfigurable surface using a second reflection matrix configuration.

In some cases, the first reference signal, the second reference signal, or both, includes a first format which is different than a second format associated with a third reference signal transmitted by the UE to the base station without reflection by the reconfigurable surface. In some cases, the first reference signal, the second reference signal, or both, includes a channel state information reference signal.

The feedback message receiving manager 1140 may receive, from the UE based on transmitting the first reference signal, a first feedback message indicating a first set of parameters associated with the first reference signal received at the UE. In some examples, the feedback message receiving manager 1140 may receive, from the UE based on transmitting the second reference signal, a second feedback message indicating a second set of parameters associated with the second reference signal received at the UE.

In some cases, the first feedback message is received from the UE via the reconfigurable surface with a first transmission power metric, and where the second feedback message is received from the UE via the reconfigurable surface with a second transmission power metric which is less than the first transmission power metric.

The control message transmitting manager 1125 may transmit, to the UE, a control message including a set of resources associated with a configuration procedure for configuring the reconfigurable surface, where receiving the first reference signal at the first transmission occasion, receiving the second reference signal at the second transmission occasion, or both, is based on transmitting the control message. In some examples, the control message transmitting manager 1125 may transmit, to the UE, a control message indicating one or more transmission power metrics associated with transmission of reference signals during a configuration procedure for configuring the reconfigurable surface, where receiving the first reference signal with the first transmission power metric, receiving the second reference signal with the second transmission power metric, or both, is based is based on transmitting the control message.

In some examples, the control message transmitting manager 1125 may transmit, to the UE, a control message indicating a position of the reconfigurable surface, an orientation of the reconfigurable surface, or both, where receiving the first reference signal, receiving the second reference signal, or both, is based on transmitting the control message. In some examples, the control message transmitting manager 1125 may transmit, to the UE, a control message including a set of resources associated with a configuration procedure for configuring the reconfigurable surface, where transmitting the first reference signal at the first transmission occasion, transmitting the second reference signal at the second transmission occasion, or both, is based on transmitting the control message.

In some examples, the control message transmitting manager 1125 may transmit, to the UE, a control message indicating one or more transmission power metrics associated with transmission of reference signals during a configuration procedure for configuring the reconfigurable surface, where receiving the first reference signal with the first transmission power metric, receiving the second reference signal with the second transmission power metric, or both, is based is based on transmitting the control message. In some examples, the control message transmitting manager 1125 may transmit, to the UE, a control message indicating a position of the reconfigurable surface, an orientation of the reconfigurable surface, or both, where transmitting the first reference signal, transmitting the second reference signal, or both, is based on transmitting the control message.

The reflection matrix configuration manager 1130 may transmit, to the UE via the reconfigurable surface based on receiving the second reference signal, an indication of the third reflection matrix configuration different from the first reflection matrix configuration and the second reflection matrix configuration, where communicating with the UE via the reconfigurable surface is based on transmitting the indication of the third reflection matrix configuration. In some examples, the reflection matrix configuration manager 1130 may transmit, to the UE via the reconfigurable surface based on receiving the second feedback message, an indication of a third reflection matrix configuration different from the first reflection matrix configuration and the second reflection matrix configuration, where communicating with the UE via the reconfigurable surface is based on transmitting the indication of the third reflection matrix configuration.

In some cases, the reconfigurable surface includes a set of reflective surface elements, and where each of the first reflection matrix configuration and the second reflection matrix configuration includes a set of precoders associated with the set of reflective surface elements. In some cases, the reconfigurable surface is configured to modify an angle of reflection of signals incident on the reconfigurable surface based on the set of precoders associated with the set of reflective surface elements. In some cases, the reconfigurable surface is configured to modify an angle of reflection of signals incident on the reconfigurable surface by modifying a reflection matrix configuration of a set of reflection matrix configurations, transitioning from the first reflection matrix configuration to the second reflection matrix configuration, or both.

Figure 12:
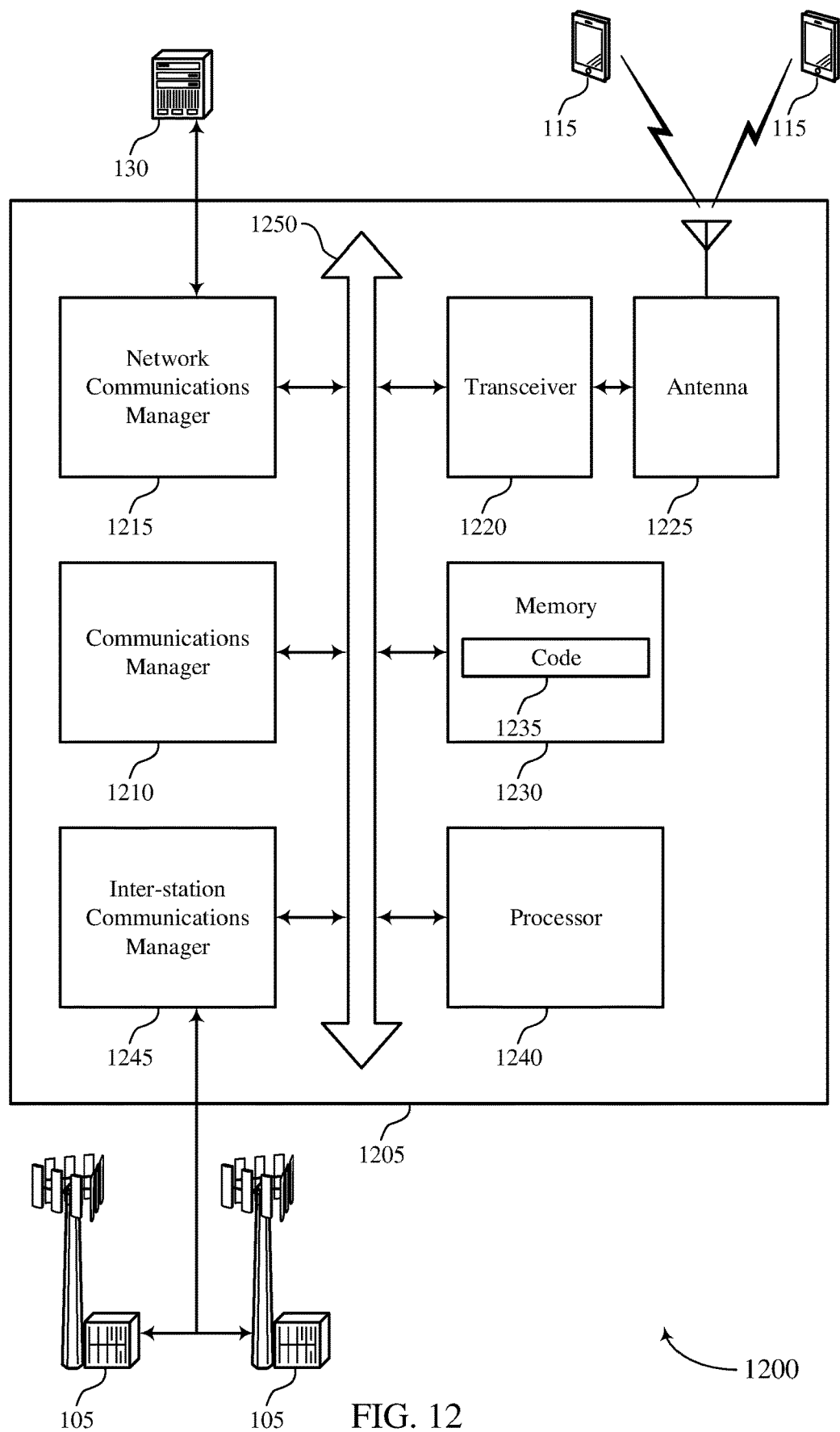
FIG. 12 shows a diagram of a system including a device that supports techniques for successive tuning using a reconfigurable surface in accordance with aspects of the present disclosure.

FIG. 12 shows a diagram of a system 1200 including a device 1205 that supports techniques for successive tuning using a reconfigurable surface in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a UE via a reconfigurable surface at a first transmission occasion, a first reference signal reflected by the reconfigurable surface using a first reflection matrix configuration, receive, from the UE via the reconfigurable surface at a second transmission occasion, a second reference signal reflected by the reconfigurable surface using the second reflection matrix configuration, configure the reconfigurable surface with a second reflection matrix configuration based on receiving the first reference signal, configure the reconfigurable surface with a third reflection matrix configuration based on receiving the second reference signal, and communicate with the UE via the reconfigurable surface based on the third reflection matrix configuration. The communications manager 1210 may also transmit, to a UE via a reconfigurable surface at a first transmission occasion, a first reference signal reflected by the reconfigurable surface using a first reflection matrix configuration, transmit, to the UE via the reconfigurable surface at a second transmission occasion, a second reference signal reflected by the reconfigurable surface using a second reflection matrix configuration, receive, from the UE based on transmitting the first reference signal, a first feedback message indicating a first set of parameters associated with the first reference signal received at the UE, receive, from the UE based on transmitting the second reference signal, a second feedback message indicating a second set of parameters associated with the second reference signal received at the UE, and communicate with the UE via the reconfigurable surface based on receiving the second feedback message.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting techniques for successive tuning using a reconfigurable surface).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
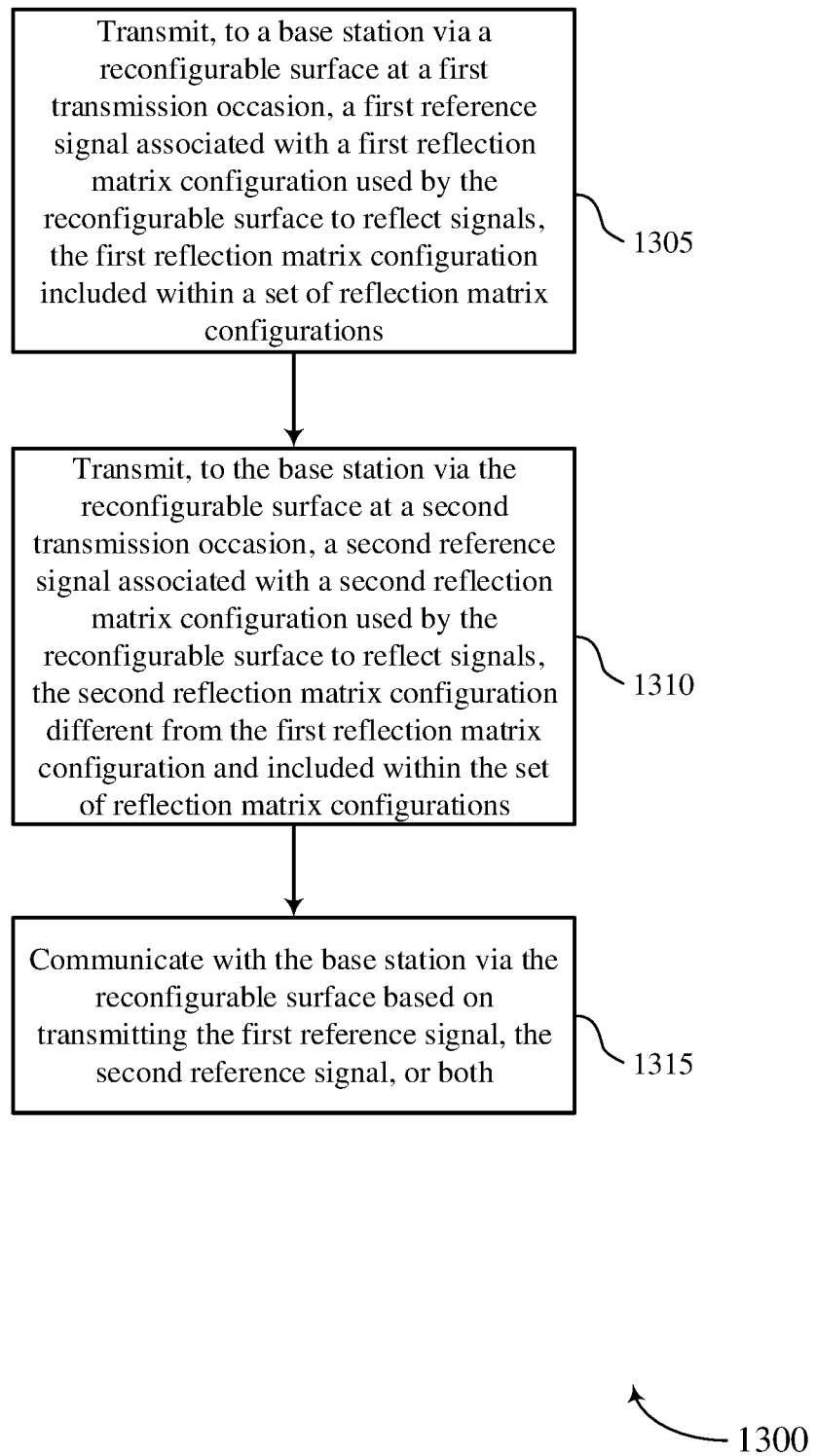
FIGS. 13 through 16 show flowcharts illustrating methods that support techniques for successive tuning using a reconfigurable surface in accordance with aspects of the present disclosure.

FIG. 13 shows a flowchart illustrating a method 1300 that supports techniques for successive tuning using a reconfigurable surface in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may transmit, to a base station via a reconfigurable surface at a first transmission occasion, a first reference signal associated with a first reflection matrix configuration used by the reconfigurable surface to reflect signals, the first reflection matrix configuration included within a set of reflection matrix configurations. The operations of 1305 may be performed according to the methods described herein. In some examples, aspects of the operations of 1305 may be performed by a reference signal transmitting manager as described with reference to FIGS. 5 through 8.

At 1310, the UE may transmit, to the base station via the reconfigurable surface at a second transmission occasion, a second reference signal associated with a second reflection matrix configuration used by the reconfigurable surface to reflect signals, the second reflection matrix configuration different from the first reflection matrix configuration and included within the set of reflection matrix configurations. The operations of 1310 may be performed according to the methods described herein. In some examples, aspects of the operations of 1310 may be performed by a reference signal transmitting manager as described with reference to FIGS. 5 through 8.

At 1315, the UE may communicate with the base station via the reconfigurable surface based on transmitting the first reference signal, the second reference signal, or both. The operations of 1315 may be performed according to the methods described herein. In some examples, aspects of the operations of 1315 may be performed by a reconfigurable surface communicating manager as described with reference to FIGS. 5 through 8.

Figure 14:
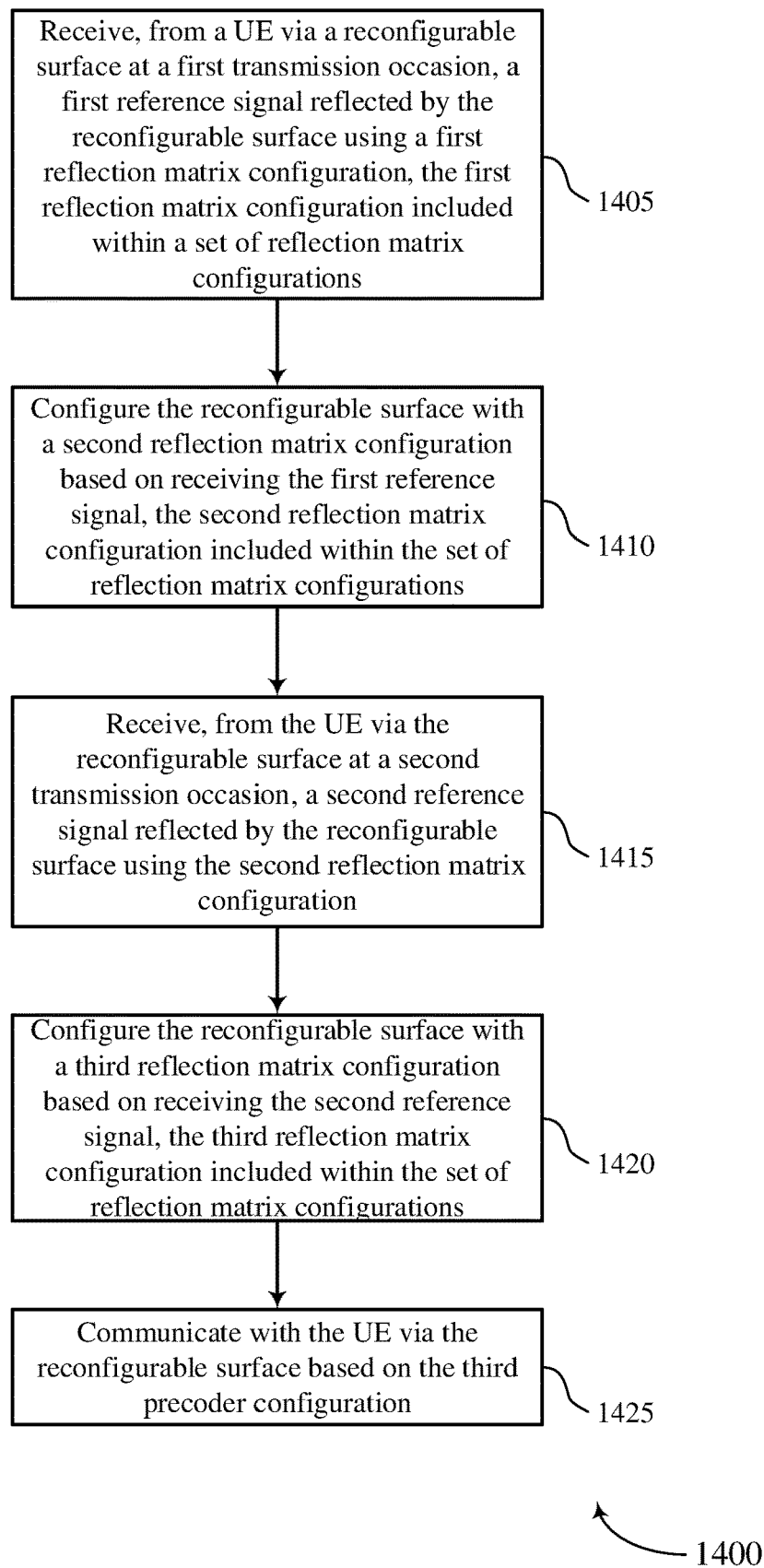

FIG. 14 shows a flowchart illustrating a method 1400 that supports techniques for successive tuning using a reconfigurable surface in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may receive, from a UE via a reconfigurable surface at a first transmission occasion, a first reference signal reflected by the reconfigurable surface using a first reflection matrix configuration, the first reflection matrix configuration included within a set of reflection matrix configurations. The operations of 1405 may be performed according to the methods described herein. In some examples, aspects of the operations of 1405 may be performed by a reference signal receiving manager as described with reference to FIGS. 9 through 12.

At 1410, the base station may configure the reconfigurable surface with a second reflection matrix configuration based on receiving the first reference signal, the second reflection matrix configuration included within the set of reflection matrix configurations. The operations of 1410 may be performed according to the methods described herein. In some examples, aspects of the operations of 1410 may be performed by a reconfigurable surface manager as described with reference to FIGS. 9 through 12.

At 1415, the base station may receive, from the UE via the reconfigurable surface at a second transmission occasion, a second reference signal reflected by the reconfigurable surface using the second reflection matrix configuration. The operations of 1415 may be performed according to the methods described herein. In some examples, aspects of the operations of 1415 may be performed by a reference signal receiving manager as described with reference to FIGS. 9 through 12.

At 1420, the base station may configure the reconfigurable surface with a third reflection matrix configuration based on receiving the second reference signal, the first reflection matrix configuration included within a set of reflection matrix configurations. The operations of 1420 may be performed according to the methods described herein. In some examples, aspects of the operations of 1420 may be performed by a reconfigurable surface manager as described with reference to FIGS. 9 through 12.

At 1425, the base station may communicate with the UE via the reconfigurable surface based on the third reflection matrix configuration. The operations of 1425 may be performed according to the methods described herein. In some examples, aspects of the operations of 1425 may be performed by a reconfigurable surface communicating manager as described with reference to FIGS. 9 through 12.

Figure 15:
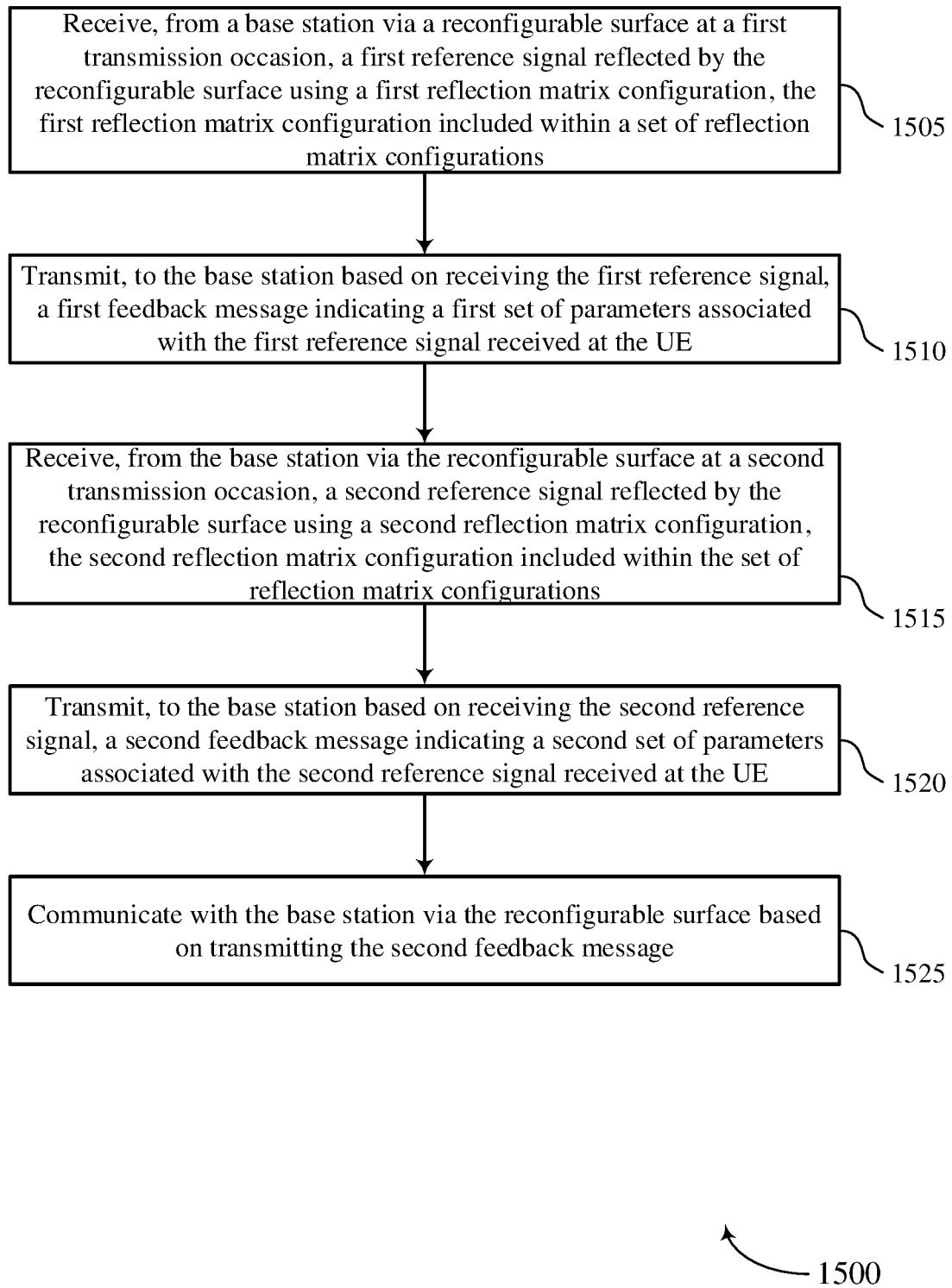

FIG. 15 shows a flowchart illustrating a method 1500 that supports techniques for successive tuning using a reconfigurable surface in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station via a reconfigurable surface at a first transmission occasion, a first reference signal reflected by the reconfigurable surface using a first reflection matrix configuration, the first reflection matrix configuration included within a set of reflection matrix configurations. The operations of 1505 may be performed according to the methods described herein. In some examples, aspects of the operations of 1505 may be performed by a reference signal receiving manager as described with reference to FIGS. 5 through 8.

At 1510, the UE may transmit, to the base station based on receiving the first reference signal, a first feedback message indicating a first set of parameters associated with the first reference signal received at the UE. The operations of 1510 may be performed according to the methods described herein. In some examples, aspects of the operations of 1510 may be performed by a feedback message transmitting manager as described with reference to FIGS. 5 through 8.

At 1515, the UE may receive, from the base station via the reconfigurable surface at a second transmission occasion, a second reference signal reflected by the reconfigurable surface using a second reflection matrix configuration, the second reflection matrix configuration included within the set of reflection matrix configurations. The operations of 1515 may be performed according to the methods described herein. In some examples, aspects of the operations of 1515 may be performed by a reference signal receiving manager as described with reference to FIGS. 5 through 8.

At 1520, the UE may transmit, to the base station based on receiving the second reference signal, a second feedback message indicating a second set of parameters associated with the second reference signal received at the UE. The operations of 1520 may be performed according to the methods described herein. In some examples, aspects of the operations of 1520 may be performed by a feedback message transmitting manager as described with reference to FIGS. 5 through 8.

At 1525, the UE may communicate with the base station via the reconfigurable surface based on transmitting the second feedback message. The operations of 1525 may be performed according to the methods described herein. In some examples, aspects of the operations of 1525 may be performed by a reconfigurable surface communicating manager as described with reference to FIGS. 5 through 8.

Figure 16:
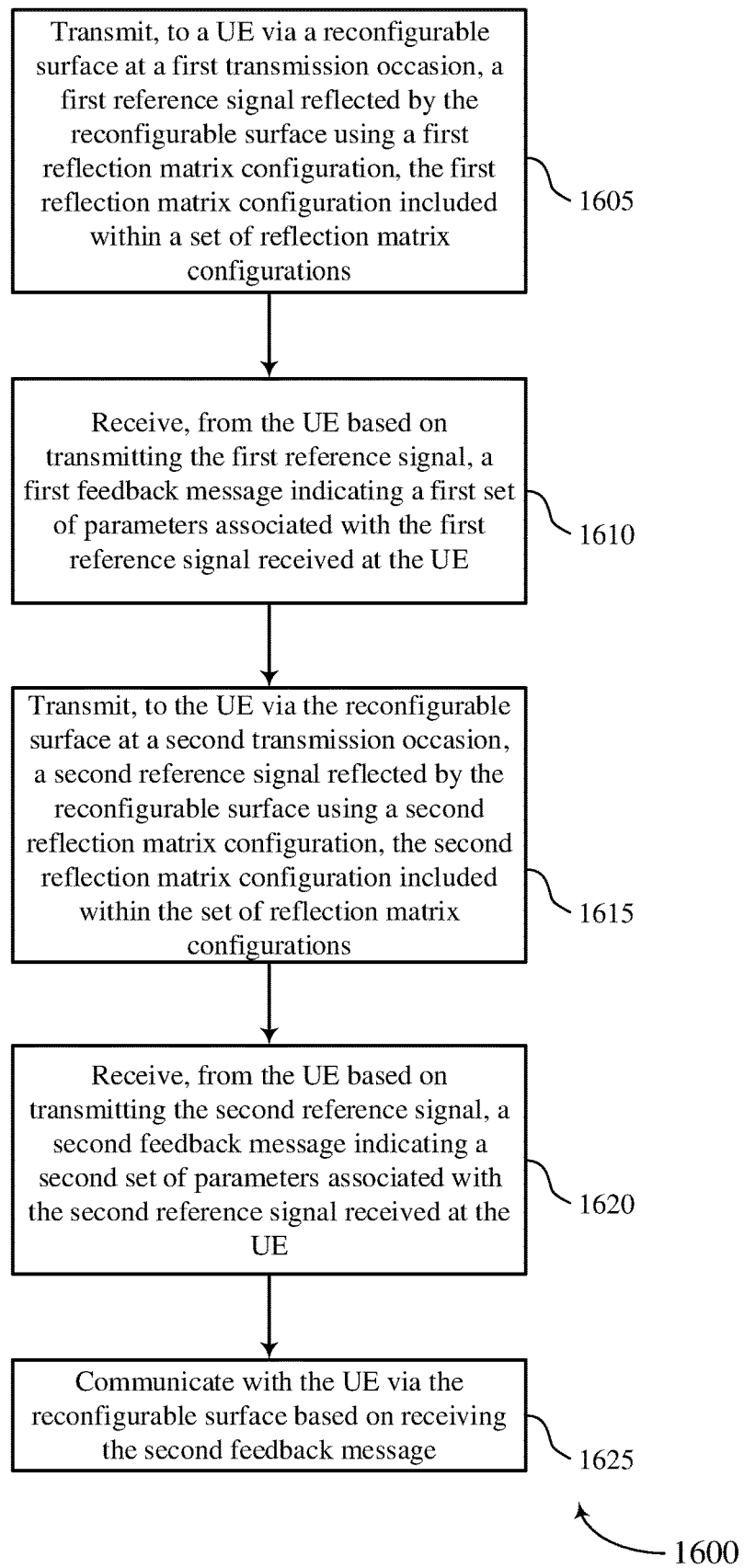

FIG. 16 shows a flowchart illustrating a method 1600 that supports techniques for successive tuning using a reconfigurable surface in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE via a reconfigurable surface at a first transmission occasion, a first reference signal reflected by the reconfigurable surface using a first reflection matrix configuration, the first reflection matrix configuration included within a set of reflection matrix configurations. The operations of 1605 may be performed according to the methods described herein. In some examples, aspects of the operations of 1605 may be performed by a reference signal transmitting manager as described with reference to FIGS. 9 through 12.

At 1610, the base station may receive, from the UE based on transmitting the first reference signal, a first feedback message indicating a first set of parameters associated with the first reference signal received at the UE. The operations of 1610 may be performed according to the methods described herein. In some examples, aspects of the operations of 1610 may be performed by a feedback message receiving manager as described with reference to FIGS. 9 through 12.

At 1615, the base station may transmit, to the UE via the reconfigurable surface at a second transmission occasion, a second reference signal reflected by the reconfigurable surface using a second reflection matrix configuration, the second reflection matrix configuration included within the set of reflection matrix configurations. The operations of 1615 may be performed according to the methods described herein. In some examples, aspects of the operations of 1615 may be performed by a reference signal transmitting manager as described with reference to FIGS. 9 through 12.

At 1620, the base station may receive, from the UE based on transmitting the second reference signal, a second feedback message indicating a second set of parameters associated with the second reference signal received at the UE. The operations of 1620 may be performed according to the methods described herein. In some examples, aspects of the operations of 1620 may be performed by a feedback message receiving manager as described with reference to FIGS. 9 through 12.

At 1625, the base station may communicate with the UE via the reconfigurable surface based on receiving the second feedback message. The operations of 1625 may be performed according to the methods described herein. In some examples, aspects of the operations of 1625 may be performed by a reconfigurable surface communicating manager as described with reference to FIGS. 9 through 12.

The following provides an overview of aspects of the present disclosure:

Aspect 1: A method for wireless communication at a UE, comprising: transmitting, to a base station via a reconfigurable surface at a first transmission occasion, a first reference signal associated with a first reflection matrix configuration used by the reconfigurable surface to reflect signals, the first reflection matrix configuration included within a set of reflection matrix configurations; transmitting, to the base station via the reconfigurable surface at a second transmission occasion, a second reference signal associated with a second reflection matrix configuration used by the reconfigurable surface to reflect signals, the second reflection matrix reflection matrix configuration different from the first reflection matrix configuration and included within the set of reflection matrix configurations; and communicating with the base station via the reconfigurable surface based at least in part on transmitting the first reference signal, the second reference signal, or both.

Aspect 2: The method of aspect 1, further comprising: receiving, from the base station, a control message comprising a set of resources associated with a configuration procedure for configuring the reconfigurable surface, wherein transmitting the first reference signal at the first transmission occasion, transmitting the second reference signal at the second transmission occasion, or both, is based at least in part on receiving the control message.

Aspect 3: The method of any of aspects 1 through 2, wherein the first reference signal is transmitted to the base station via the reconfigurable surface with a first transmission power metric, and the second reference signal is transmitted to the base station via the reconfigurable surface with a second transmission power metric which is less than the first transmission power metric.

Aspect 4: The method of aspect 3, further comprising: receiving, from the base station, a control message indicating one or more transmission power metrics associated with transmission of reference signals during a configuration procedure for configuring the reconfigurable surface, wherein transmitting the first reference signal with the first transmission power metric, transmitting the second reference signal with the second transmission power metric, or both, is based is based at least in part on receiving the control message.

Aspect 5: The method of any of aspects 1 through 4, wherein communicating with the base station via the reconfigurable surface comprises: transmitting, to the base station via the reconfigurable surface, an uplink transmission reflected by the reconfigurable surface using a third reflection matrix configuration different from the first reflection matrix configuration and the second reflection matrix configuration, the third reflection matrix configuration included within the set of reflection matrix configurations.

Aspect 6: The method of any of aspects 1 through 5, further comprising: receiving, from the base station via the reconfigurable surface based at least in part on transmitting the second reference signal, an indication of a third reflection matrix configuration different from the first reflection matrix configuration and the second reflection matrix configuration, wherein the third reflection matrix configuration is included within the set of reflection matrix configurations, wherein communicating with the base station via the reconfigurable surface is based at least in part on receiving the indication of the third reflection matrix configuration.

Aspect 7: The method of any of aspects 1 through 6, further comprising: receiving, from the base station, a control message indicating a position of the reconfigurable surface, an orientation of the reconfigurable surface, or both, wherein transmitting the first reference signal, transmitting the second reference signal, or both, is based at least in part on receiving the control message.

Aspect 8: The method of any of aspects 1 through 7, wherein the reconfigurable surface comprises a plurality of reflective surface elements, and each of the first reflection matrix configuration and the second reflection matrix configuration comprises a plurality of precoders associated with the plurality of reflective surface elements.

Aspect 9: The method of aspect 8, wherein the reconfigurable surface is configured to modify an angle of reflection of signals incident on the reconfigurable surface based on the plurality of precoders associated with the plurality of reflective surface elements.

Aspect 10: The method of any of aspects 1 through 9, wherein the reconfigurable surface is configured to modify an angle of reflection of signals incident on the reconfigurable surface by modifying a reflection matrix configuration of the set of reflection matrix configurations, transitioning from the first reflection matrix configuration to the second reflection matrix configuration, or both.

Aspect 11: The method of any of aspects 1 through 10, wherein the first reference signal, the second reference signal, or both, comprises a first format which is different than a second format associated with a third reference signal transmitted by the UE to the base station without reflection by the reconfigurable surface.

Aspect 12: The method of aspect 11, wherein the first reference signal, the second reference signal, or both, are transmitted by the UE with a first spatial filtering metric, and the third reference signal is transmitted by the UE with a second spatial filtering metric different from the first spatial filtering metric.

Aspect 13: The method of any of aspects 1 through 12, wherein the first reference signal, the second reference signal, or both, comprises a sounding reference signal.

Aspect 14: A method for wireless communication at a base station, comprising: receiving, from a UE via a reconfigurable surface at a first transmission occasion, a first reference signal reflected by the reconfigurable surface using a first reflection matrix configuration, the first reflection matrix configuration included within a set of reflection matrix configurations; configuring the reconfigurable surface with a second reflection matrix configuration based at least in part on receiving the first reference signal, the second reflection matrix configuration included within the set of reflection matrix configurations; receiving, from the UE via the reconfigurable surface at a second transmission occasion, a second reference signal reflected by the reconfigurable surface using the second reflection matrix configuration; configuring the reconfigurable surface with a third reflection matrix configuration based at least in part on receiving the second reference signal, the third reflection matrix configuration included within the set of reflection matrix configurations; and communicating with the UE via the reconfigurable surface based at least in part on the third reflection matrix configuration.

Aspect 15: The method of aspect 14, further comprising: transmitting, to the UE, a control message comprising a set of resources associated with a configuration procedure for configuring the reconfigurable surface, wherein receiving the first reference signal at the first transmission occasion, receiving the second reference signal at the second transmission occasion, or both, is based at least in part on transmitting the control message.

Aspect 16: The method of any of aspects 14 through 15, wherein the first reference signal is received from the UE via the reconfigurable surface with a first transmission power metric, and the second reference signal is received from the UE via the reconfigurable surface with a second transmission power metric which is less than the first transmission power metric.

Aspect 17: The method of aspect 16, further comprising: transmitting, to the UE, a control message indicating one or more transmission power metrics associated with transmission of reference signals during a configuration procedure for configuring the reconfigurable surface, wherein receiving the first reference signal with the first transmission power metric, receiving the second reference signal with the second transmission power metric, or both, is based is based at least in part on transmitting the control message.

Aspect 18: The method of any of aspects 14 through 17, wherein communicating with the UE via the reconfigurable surface comprises: receiving, from the UE via the reconfigurable surface, an uplink transmission reflected by the reconfigurable surface using the third reflection matrix configuration different from the first reflection matrix configuration and the second reflection matrix configuration.

Aspect 19: The method of any of aspects 14 through 18, further comprising: transmitting, to the UE via the reconfigurable surface based at least in part on receiving the second reference signal, an indication of the third reflection matrix configuration different from the first reflection matrix configuration and the second reflection matrix configuration, wherein communicating with the UE via the reconfigurable surface is based at least in part on transmitting the indication of the third reflection matrix configuration.

Aspect 20: The method of any of aspects 14 through 19, further comprising: transmitting, to the UE, a control message indicating a position of the reconfigurable surface, an orientation of the reconfigurable surface, or both, wherein receiving the first reference signal, receiving the second reference signal, or both, is based at least in part on transmitting the control message.

Aspect 21: The method of any of aspects 14 through 20, wherein the reconfigurable surface comprises a plurality of reflective surface elements, and each of the first reflection matrix configuration and the second reflection matrix configuration comprises a plurality of precoders associated with the plurality of reflective surface elements.

Aspect 22: The method of aspect 21, wherein the reconfigurable surface is configured to modify an angle of reflection of signals incident on the reconfigurable surface based on the plurality of precoders associated with the plurality of reflective surface elements.

Aspect 23: The method of any of aspects 14 through 22, wherein the reconfigurable surface is configured to modify an angle of reflection of signals incident on the reconfigurable surface by modifying a reflection matrix configuration of the set of reflection matrix configurations, transitioning from the first reflection matrix configuration to the second reflection matrix configuration, or both.

Aspect 24: The method of any of aspects 14 through 23, wherein the first reference signal, the second reference signal, or both, comprises a first format which is different than a second format associated with a third reference signal transmitted by the UE to the base station without reflection by the reconfigurable surface.

Aspect 25: The method of any of aspects 14 through 24, wherein the first reference signal, the second reference signal, or both, comprises a sounding reference signal.

Aspect 26: A method for wireless communication at a UE, comprising: receiving, from a base station via a reconfigurable surface at a first transmission occasion, a first reference signal reflected by the reconfigurable surface using a first reflection matrix configuration, the first reflection matrix configuration included within a set of reflection matrix configurations; transmitting, to the base station based at least in part on receiving the first reference signal, a first feedback message indicating a first set of parameters associated with the first reference signal received at the UE; receiving, from the base station via the reconfigurable surface at a second transmission occasion, a second reference signal reflected by the reconfigurable surface using a second reflection matrix configuration, the second reflection matrix configuration included within the set of reflection matrix configurations; transmitting, to the base station based at least in part on receiving the second reference signal, a second feedback message indicating a second set of parameters associated with the second reference signal received at the UE; and communicating with the base station via the reconfigurable surface based at least in part on transmitting the second feedback message.

Aspect 27: The method of aspect 26, further comprising: receiving, from the base station, a control message comprising a set of resources associated with a configuration procedure for configuring the reconfigurable surface, wherein receiving the first reference signal at the first transmission occasion, receiving the second reference signal at the second transmission occasion, or both, is based at least in part on receiving the control message.

Aspect 28: The method of any of aspects 26 through 27, wherein the first feedback message is transmitted to the base station via the reconfigurable surface with a first transmission power metric, and the second feedback message is transmitted to the base station via the reconfigurable surface with a second transmission power metric which is less than the first transmission power metric.

Aspect 29: The method of aspect 28, further comprising: receiving, from the base station, a control message indicating one or more transmission power metrics associated with transmission of feedback messages during a configuration procedure for configuring the reconfigurable surface, wherein transmitting the first feedback message with the first transmission power metric, transmitting the second feedback message with the second transmission power metric, or both, is based is based at least in part on receiving the control message.

Aspect 30: The method of any of aspects 26 through 29, wherein communicating with the base station via the reconfigurable surface comprises: receiving, from the base station via the reconfigurable surface, a downlink transmission reflected by the reconfigurable surface using a third reflection matrix configuration different from the first reflection matrix configuration and the second reflection matrix configuration, the third reflection matrix configuration included within the set of reflection matrix configurations.

Aspect 31: The method of any of aspects 26 through 30, further comprising: receiving, from the base station via the reconfigurable surface based at least in part on transmitting the second feedback message, an indication of a third reflection matrix configuration different from the first reflection matrix configuration and the second reflection matrix configuration, wherein the third reflection matrix configuration is included within the set of reflection matrix configurations, wherein communicating with the base station via the reconfigurable surface is based at least in part on receiving the indication of the third reflection matrix configuration.

Aspect 32: The method of any of aspects 26 through 31, further comprising: receiving, from the base station, a control message indicating a position of the reconfigurable surface, an orientation of the reconfigurable surface, or both, wherein receiving the first reference signal, receiving the second reference signal, or both, is based at least in part on receiving the control message.

Aspect 33: The method of any of aspects 26 through 32, wherein the reconfigurable surface comprises a plurality of reflective surface elements, and each of the first reflection matrix configuration and the second reflection matrix configuration comprises a plurality of precoders associated with the plurality of reflective surface elements.

Aspect 34: The method of aspect 33, wherein the reconfigurable surface is configured to modify an angle of reflection of signals incident on the reconfigurable surface based on the plurality of precoders associated with the plurality of reflective surface elements.

Aspect 35: The method of any of aspects 26 through 34, wherein the reconfigurable surface is configured to modify an angle of reflection of signals incident on the reconfigurable surface by modifying a reflection matrix configuration of the set of reflection matrix configurations, transitioning from the first reflection matrix configuration to the second reflection matrix configuration, or both.

Aspect 36: The method of any of aspects 26 through 35, wherein the first reference signal, the second reference signal, or both, comprises a first format which is different than a second format associated with a third reference signal transmitted by the base station to the UE without reflection by the reconfigurable surface.

Aspect 37: The method of any of aspects 26 through 36, wherein the first reference signal, the second reference signal, or both, comprises a channel state information reference signal.

Aspect 38: A method for wireless communication at a base station, comprising: transmitting, to a UE via a reconfigurable surface at a first transmission occasion, a first reference signal reflected by the reconfigurable surface using a first reflection matrix configuration, the first reflection matrix configuration included within a set of reflection matrix configurations; receiving, from the UE based at least in part on transmitting the first reference signal, a first feedback message indicating a first set of parameters associated with the first reference signal received at the UE; transmitting, to the UE via the reconfigurable surface at a second transmission occasion, a second reference signal reflected by the reconfigurable surface using a second reflection matrix configuration, the second reflection matrix configuration included within the set of reflection matrix configurations; receiving, from the UE based at least in part on transmitting the second reference signal, a second feedback message indicating a second set of parameters associated with the second reference signal received at the UE; and communicating with the UE via the reconfigurable surface based at least in part on receiving the second feedback message.

Aspect 39: The method of aspect 38, further comprising: transmitting, to the UE, a control message comprising a set of resources associated with a configuration procedure for configuring the reconfigurable surface, wherein transmitting the first reference signal at the first transmission occasion, transmitting the second reference signal at the second transmission occasion, or both, is based at least in part on transmitting the control message.

Aspect 40: The method of any of aspects 38 through 39, wherein the first feedback message is received from the UE via the reconfigurable surface with a first transmission power metric, and the second feedback message is received from the UE via the reconfigurable surface with a second transmission power metric which is less than the first transmission power metric.

Aspect 41: The method of aspect 40, further comprising: transmitting, to the UE, a control message indicating one or more transmission power metrics associated with transmission of reference signals during a configuration procedure for configuring the reconfigurable surface, wherein receiving the first reference signal with the first transmission power metric, receiving the second reference signal with the second transmission power metric, or both, is based is based at least in part on transmitting the control message.

Aspect 42: The method of any of aspects 38 through 41, wherein communicating with the UE via the reconfigurable surface comprises: transmitting, to the UE via the reconfigurable surface, a downlink transmission reflected by the reconfigurable surface using a third reflection matrix configuration different from the first reflection matrix configuration and the second reflection matrix configuration, the third reflection matrix configuration included within the set of reflection matrix configurations.

Aspect 43: The method of any of aspects 38 through 42, further comprising: transmitting, to the UE via the reconfigurable surface based at least in part on receiving the second feedback message, an indication of a third reflection matrix configuration different from the first reflection matrix configuration and the second reflection matrix configuration, wherein the third reflection matrix configuration is included within the set of reflection matrix configurations, wherein communicating with the UE via the reconfigurable surface is based at least in part on transmitting the indication of the third reflection matrix configuration.

Aspect 44: The method of any of aspects 38 through 43, further comprising: transmitting, to the UE, a control message indicating a position of the reconfigurable surface, an orientation of the reconfigurable surface, or both, wherein transmitting the first reference signal, transmitting the second reference signal, or both, is based at least in part on transmitting the control message.

Aspect 45: The method of any of aspects 38 through 44, wherein the reconfigurable surface comprises a plurality of reflective surface elements, and each of the first reflection matrix configuration and the second reflection matrix configuration comprises a plurality of precoders associated with the plurality of reflective surface elements.

Aspect 46: The method of aspect 45, wherein the reconfigurable surface is configured to modify an angle of reflection of signals incident on the reconfigurable surface based on the plurality of precoders associated with the plurality of reflective surface elements.

Aspect 47: The method of any of aspects 38 through 46, wherein the reconfigurable surface is configured to modify an angle of reflection of signals incident on the reconfigurable surface by modifying a reflection matrix configuration of the set of reflection matrix configurations, transitioning from the first reflection matrix configuration to the second reflection matrix configuration, or both.

Aspect 48: The method of any of aspects 38 through 47, wherein the first reference signal, the second reference signal, or both, comprises a first format which is different than a second format associated with a third reference signal transmitted by the UE to the base station without reflection by the reconfigurable surface.

Aspect 49: The method of any of aspects 38 through 48, wherein the first reference signal, the second reference signal, or both, comprises a channel state information reference signal.

Aspect 50: An apparatus for wireless communication at a UE, comprising a processor; memory coupled with the processor; and instructions stored in the memory and executable by the processor to cause the apparatus to perform a method of any of aspects 1 through 13.

Aspect 51: An apparatus for wireless communication at a UE, comprising at least one means for performing a method of any of aspects 1 through 13.

Aspect 52: A non-transitory computer-readable medium storing code for wireless communication at a UE, the code comprising instructions executable by a processor to perform a method of any of aspects 1 through 13.

Aspect 53: An apparatus for wireless communication at a base station, comprising a processor; memory coupled with the processor; and instructions stored in the memory and executable by the processor to cause the apparatus to perform a method of any of aspects 14 through 25.

Aspect 54: An apparatus for wireless communication at a base station, comprising at least one means for performing a method of any of aspects 14 through 25.

Aspect 55: A non-transitory computer-readable medium storing code for wireless communication at a base station, the code comprising instructions executable by a processor to perform a method of any of aspects 14 through 25.

Aspect 56: An apparatus for wireless communication at a UE, comprising a processor; memory coupled with the processor; and instructions stored in the memory and executable by the processor to cause the apparatus to perform a method of any of aspects 26 through 37.

Aspect 57: An apparatus for wireless communication at a UE, comprising at least one means for performing a method of any of aspects 26 through 37.

Aspect 58: A non-transitory computer-readable medium storing code for wireless communication at a UE, the code comprising instructions executable by a processor to perform a method of any of aspects 26 through 37.

Aspect 59: An apparatus for wireless communication at a base station, comprising a processor; memory coupled with the processor; and instructions stored in the memory and executable by the processor to cause the apparatus to perform a method of any of aspects 38 through 49.

Aspect 60: An apparatus for wireless communication at a base station, comprising at least one means for performing a method of any of aspects 38 through 49.

Aspect 61: A non-transitory computer-readable medium storing code for wireless communication at a base station, the code comprising instructions executable by a processor to perform a method of any of aspects 38 through 49.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   transmitting, to a base station via a reconfigurable surface at a first transmission occasion, a first reference signal associated with a first reflection matrix configuration used by the reconfigurable surface to reflect signals, the first reflection matrix configuration included within a set of reflection matrix configurations;
   transmitting, to the base station via the reconfigurable surface at a second transmission occasion, a second reference signal associated with a second reflection matrix configuration used by the reconfigurable surface to reflect signals, the second reflection matrix configuration different from the first reflection matrix configuration and included within the set of reflection matrix configurations; and
   communicating with the base station via the reconfigurable surface based at least in part on transmitting the first reference signal, the second reference signal, or both.

2. The method of claim 1, further comprising:
   receiving, from the base station, a control message comprising a set of resources associated with a configuration procedure for configuring the reconfigurable surface, wherein transmitting the first reference signal at the first transmission occasion, transmitting the second reference signal at the second transmission occasion, or both, is based at least in part on receiving the control message.

3. The method of claim 1, wherein the first reference signal is transmitted to the base station via the reconfigurable surface with a first transmission power metric, and wherein the second reference signal is transmitted to the base station via the reconfigurable surface with a second transmission power metric which is less than the first transmission power metric.

4. The method of claim 3, further comprising:
   receiving, from the base station, a control message indicating one or more transmission power metrics associated with transmission of reference signals during a configuration procedure for configuring the reconfigurable surface, wherein transmitting the first reference signal with the first transmission power metric, transmitting the second reference signal with the second transmission power metric, or both, is based is based at least in part on receiving the control message.

5. The method of claim 1, wherein communicating with the base station via the reconfigurable surface comprises:
transmitting, to the base station via the reconfigurable surface, an uplink transmission reflected by the reconfigurable surface using a third reflection matrix configuration different from the first reflection matrix configuration and the second reflection matrix configuration, the third reflection matrix configuration included within the set of reflection matrix configurations.

6. The method of claim 1, further comprising:
receiving, from the base station via the reconfigurable surface based at least in part on transmitting the second reference signal, an indication of a third reflection matrix configuration different from the first reflection matrix configuration and the second reflection matrix configuration, wherein the third reflection matrix configuration is included within the set of reflection matrix configurations, wherein communicating with the base station via the reconfigurable surface is based at least in part on receiving the indication of the third reflection matrix configuration.

7. The method of claim 1, further comprising:
receiving, from the base station, a control message indicating a position of the reconfigurable surface, an orientation of the reconfigurable surface, or both, wherein transmitting the first reference signal, transmitting the second reference signal, or both, is based at least in part on receiving the control message.

8. The method of claim 1, wherein the reconfigurable surface comprises a plurality of reflective surface elements, and wherein each of the first reflection matrix configuration and the second reflection matrix configuration comprises a plurality of precoders associated with the plurality of reflective surface elements.

9. The method of claim 8, wherein the reconfigurable surface is configured to modify an angle of reflection of signals incident on the reconfigurable surface based on the plurality of precoders associated with the plurality of reflective surface elements.

10. The method of claim 1, wherein the reconfigurable surface is configured to modify an angle of reflection of signals incident on the reconfigurable surface by modifying a reflection matrix configuration of the set of reflection matrix configurations, transitioning from the first reflection matrix configuration to the second reflection matrix configuration, or both.

11. The method of claim 1, wherein the first reference signal, the second reference signal, or both, comprises a first format which is different than a second format associated with a third reference signal transmitted by the UE to the base station without reflection by the reconfigurable surface.

12. The method of claim 11, wherein the first reference signal, the second reference signal, or both, are transmitted by the UE with a first spatial filtering metric, and wherein the third reference signal is transmitted by the UE with a second spatial filtering metric different from the first spatial filtering metric.

13. The method of claim 1, wherein the first reference signal, the second reference signal, or both, comprises a sounding reference signal.

14. A method for wireless communication at a base station, comprising:
receiving, from a user equipment (UE) via a reconfigurable surface at a first transmission occasion, a first reference signal reflected by the reconfigurable surface using a first reflection matrix configuration, the first reflection matrix configuration included within a set of reflection matrix configurations;
configuring the reconfigurable surface with a second reflection matrix configuration based at least in part on receiving the first reference signal, the second reflection matrix configuration included within the set of reflection matrix configurations;
receiving, from the UE via the reconfigurable surface at a second transmission occasion, a second reference signal reflected by the reconfigurable surface using the second reflection matrix configuration;
configuring the reconfigurable surface with a third reflection matrix configuration based at least in part on receiving the second reference signal, the third reflection matrix configuration included within the set of reflection matrix configurations; and
communicating with the UE via the reconfigurable surface based at least in part on the third reflection matrix configuration.

15. The method of claim 14, further comprising:
transmitting, to the UE, a control message comprising a set of resources associated with a configuration procedure for configuring the reconfigurable surface, wherein receiving the first reference signal at the first transmission occasion, receiving the second reference signal at the second transmission occasion, or both, is based at least in part on transmitting the control message.

16. The method of claim 14, wherein the first reference signal is received from the UE via the reconfigurable surface with a first transmission power metric, and wherein the second reference signal is received from the UE via the reconfigurable surface with a second transmission power metric which is less than the first transmission power metric.

17. A method for wireless communication at a user equipment (UE), comprising:
receiving, from a base station via a reconfigurable surface at a first transmission occasion, a first reference signal reflected by the reconfigurable surface using a first reflection matrix configuration, the first reflection matrix configuration included within a set of reflection matrix configurations;
transmitting, to the base station based at least in part on receiving the first reference signal, a first feedback message indicating a first set of parameters associated with the first reference signal received at the UE;
receiving, from the base station via the reconfigurable surface at a second transmission occasion, a second reference signal reflected by the reconfigurable surface using a second reflection matrix configuration, the second reflection matrix configuration included within the set of reflection matrix configurations;
transmitting, to the base station based at least in part on receiving the second reference signal, a second feedback message indicating a second set of parameters associated with the second reference signal received at the UE; and
communicating with the base station via the reconfigurable surface based at least in part on transmitting the second feedback message.

18. The method of claim 17, further comprising:

receiving, from the base station, a control message comprising a set of resources associated with a configuration procedure for configuring the reconfigurable surface, wherein receiving the first reference signal at the first transmission occasion, receiving the second reference signal at the second transmission occasion, or both, is based at least in part on receiving the control message.

19. The method of claim 17, wherein the first feedback message is transmitted to the base station via the reconfigurable surface with a first transmission power metric, and wherein the second feedback message is transmitted to the base station via the reconfigurable surface with a second transmission power metric which is less than the first transmission power metric.

20. The method of claim 19, further comprising:

receiving, from the base station, a control message indicating one or more transmission power metrics associated with transmission of feedback messages during a configuration procedure for configuring the reconfigurable surface, wherein transmitting the first feedback message with the first transmission power metric, transmitting the second feedback message with the second transmission power metric, or both, is based is based at least in part on receiving the control message.

21. The method of claim 17, wherein communicating with the base station via the reconfigurable surface comprises:

receiving, from the base station via the reconfigurable surface, a downlink transmission reflected by the reconfigurable surface using a third reflection matrix configuration different from the first reflection matrix configuration and the second reflection matrix configuration, the third reflection matrix configuration included within the set of reflection matrix configurations.

22. The method of claim 17, further comprising:

receiving, from the base station via the reconfigurable surface based at least in part on transmitting the second feedback message, an indication of a third reflection matrix configuration different from the first reflection matrix configuration and the second reflection matrix configuration, wherein the third reflection matrix configuration is included within the set of reflection matrix configurations, wherein communicating with the base station via the reconfigurable surface is based at least in part on receiving the indication of the third reflection matrix configuration.

23. The method of claim 17, further comprising:

receiving, from the base station, a control message indicating a position of the reconfigurable surface, an orientation of the reconfigurable surface, or both, wherein receiving the first reference signal, receiving the second reference signal, or both, is based at least in part on receiving the control message.

24. The method of claim 17, wherein the reconfigurable surface comprises a plurality of reflective surface elements, and wherein each of the first reflection matrix configuration and the second reflection matrix configuration comprises a plurality of precoders associated with the plurality of reflective surface elements.

25. The method of claim 24, wherein the reconfigurable surface is configured to modify an angle of reflection of signals incident on the reconfigurable surface based on the plurality of precoders associated with the plurality of reflective surface elements.

26. The method of claim 17, wherein the reconfigurable surface is configured to modify an angle of reflection of signals incident on the reconfigurable surface by modifying a reflection matrix configuration of the set of reflection matrix configurations, transitioning from the first reflection matrix configuration to the second reflection matrix configuration, or both.

27. The method of claim 17, wherein the first reference signal, the second reference signal, or both, comprises a first format which is different than a second format associated with a third reference signal transmitted by the base station to the UE without reflection by the reconfigurable surface.

28. The method of claim 17, wherein the first reference signal, the second reference signal, or both, comprises a channel state information reference signal.

29. A method for wireless communication at a base station, comprising:

transmitting, to a user equipment (UE) via a reconfigurable surface at a first transmission occasion, a first reference signal reflected by the reconfigurable surface using a first reflection matrix configuration, the first reflection matrix configuration included within a set of reflection matrix configurations;

receiving, from the UE based at least in part on transmitting the first reference signal, a first feedback message indicating a first set of parameters associated with the first reference signal received at the UE;

transmitting, to the UE via the reconfigurable surface at a second transmission occasion, a second reference signal reflected by the reconfigurable surface using a second reflection matrix configuration, the second reflection matrix configuration included within the set of reflection matrix configurations;

receiving, from the UE based at least in part on transmitting the second reference signal, a second feedback message indicating a second set of parameters associated with the second reference signal received at the UE; and communicating with the UE via the reconfigurable surface based at least in part on receiving the second feedback message.

30. The method of claim 29, further comprising:

transmitting, to the UE, a control message comprising a set of resources associated with a configuration procedure for configuring the reconfigurable surface, wherein transmitting the first reference signal at the first transmission occasion, transmitting the second reference signal at the second transmission occasion, or both, is based at least in part on transmitting the control message.

* * * * *